(12) United States Patent
Aznag et al.

(10) Patent No.: US 12,153,271 B2
(45) Date of Patent: Nov. 26, 2024

(54) TELECOMMUNICATIONS ENCLOSURE AND RELATED COMPONENTS

(71) Applicant: CommScope Connectivity Belgium BVBA, Kessel-Lo (BE)

(72) Inventors: Mohamed Aznag, Scherpenheuvel (BE); Pieter Doultremont, Kermt-Hasselt (BE); Maarten Aerts, Kessel-Lo (BE); Maddy Nadine Frederickx, Aarschot (BE); Deon Craig Sylvester, Sensenruth (BE); Peter Jerome Istas, Sint-Truiden (BE); El Moïz Mohammed Michel Ghammam, Brussels (BE); Samory De Zitter, Ghent (BE); William Alan Carrico, Raleigh, NC (US); Jos Paul G. Vandepoel, Halen (BE); Wouter Annaert, Leuven (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 238 days.

(21) Appl. No.: 17/717,759

(22) Filed: Apr. 11, 2022

(65) Prior Publication Data

US 2022/0317402 A1    Oct. 6, 2022

Related U.S. Application Data

(63) Continuation of application No. 16/626,196, filed as application No. PCT/EP2018/066842 on Jun. 23, 2018, now Pat. No. 11,300,745.

(60) Provisional application No. 62/622,644, filed on Jan. 26, 2018, provisional application No. 62/524,240, filed on Jun. 23, 2017.

(51) Int. Cl.
*G02B 6/44* (2006.01)

(52) U.S. Cl.
CPC ......... *G02B 6/4444* (2013.01); *G02B 6/4446* (2013.01)

(58) Field of Classification Search
CPC .......................... G02B 6/4446; H02G 15/013
See application file for complete search history.

(56) References Cited

U.S. PATENT DOCUMENTS

| | | | |
|---|---|---|---|
| 5,758,004 A | 5/1998 | Alarcon et al. | |
| 6,046,406 A | 4/2000 | Milanowski et al. | |
| 6,536,618 B1 | 3/2003 | Hwang et al. | |
| 7,038,137 B2 | 5/2006 | Grubish et al. | |
| 9,719,614 B2 | 8/2017 | Blaser et al. | |
| 10,012,814 B2 | 7/2018 | Hill et al. | |
| 2009/0309313 A1 | 12/2009 | Knorr et al. | |

(Continued)

FOREIGN PATENT DOCUMENTS

| | | |
|---|---|---|
| DE | 20 2006 006 020 U1 | 6/2006 |
| DE | 10 2012 112 510 A1 | 6/2014 |

(Continued)

OTHER PUBLICATIONS

International Search Report and Written Opinion of the International Searching Authority for International Patent Application No. PCT/EP2018/066842 mailed Oct. 2, 2018, 16 pages.

*Primary Examiner* — Eric Wong
(74) *Attorney, Agent, or Firm* — Merchant & Gould P.C

(57) ABSTRACT

A telecommunications enclosure is disclosed. In one example the enclosure includes a gel block actuator that is capable of applying compressive load and positive tensile load to the gel block.

14 Claims, 80 Drawing Sheets

(56) References Cited

U.S. PATENT DOCUMENTS

| | | | |
|---|---|---|---|
| 2013/0020771 | A1 | 1/2013 | Vanhentenrijk et al. |
| 2013/0170810 | A1 | 7/2013 | Badar et al. |
| 2015/0168664 | A1* | 6/2015 | Coenegracht ........ G02B 6/4446 385/135 |
| 2016/0204592 | A1 | 7/2016 | Coenegracht et al. |
| 2018/0157002 | A1 | 6/2018 | Bishop et al. |
| 2019/0219785 | A1 | 7/2019 | Radelet et al. |
| 2019/0237901 | A1* | 8/2019 | Schoenfeld .......... H01R 13/512 |
| 2020/0192043 | A1 | 6/2020 | Geens et al. |

FOREIGN PATENT DOCUMENTS

| | | |
|---|---|---|
| EP | 0 442 941 B1 | 1/1995 |
| EP | 0 587 616 B1 | 7/1996 |
| EP | 2 523 288 A1 | 11/2012 |
| WO | 95/24756 A1 | 9/1995 |
| WO | 2014/005916 A2 | 1/2014 |
| WO | 2014/005917 A2 | 1/2014 |
| WO | 2014/005918 A2 | 1/2014 |
| WO | 2014/005919 A2 | 1/2014 |
| WO | 2014/095462 A1 | 6/2014 |
| WO | 2014/128138 A2 | 8/2014 |
| WO | 2015/090907 A1 | 6/2015 |

* cited by examiner

60

66

166

166

166

166

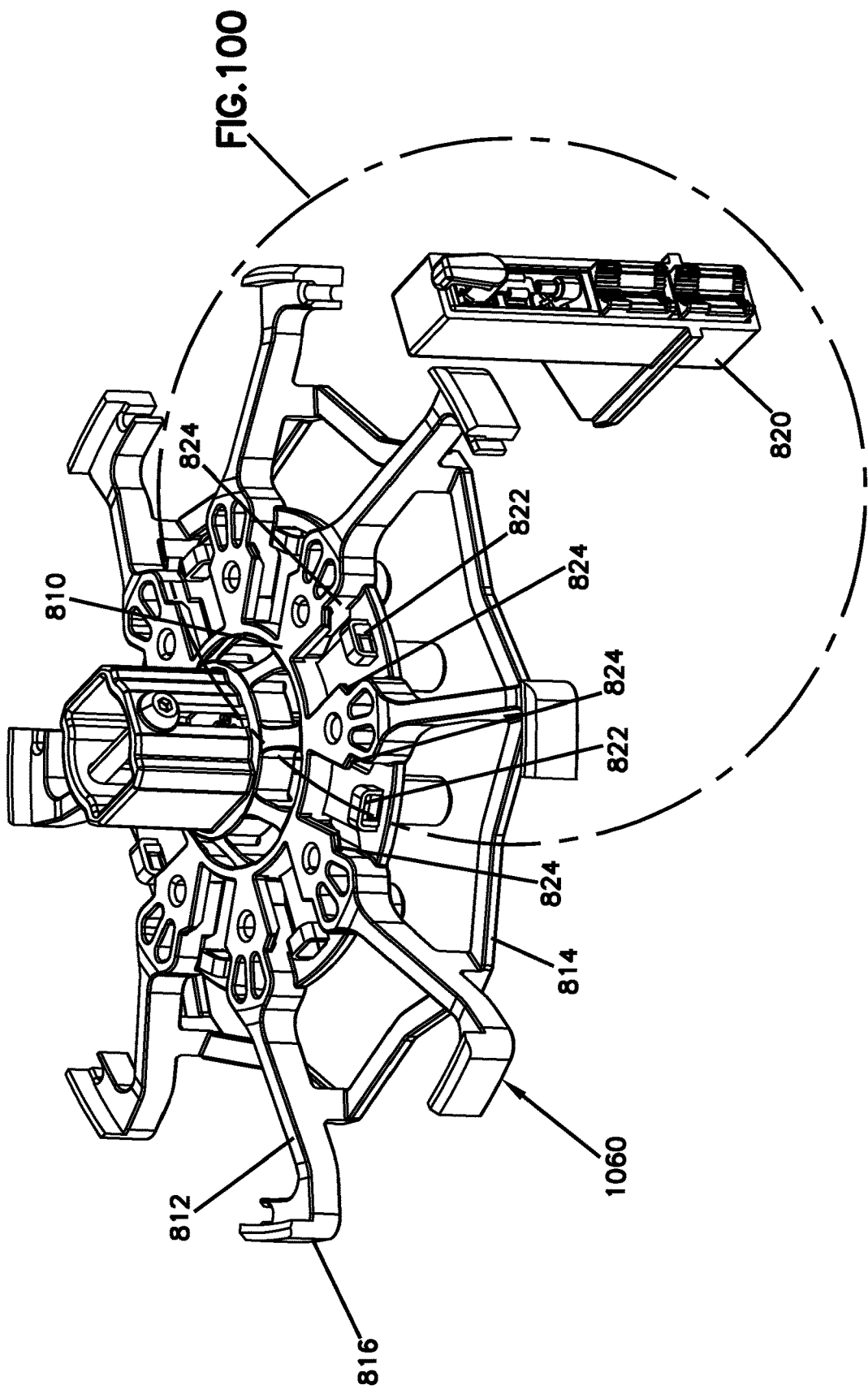

TELECOMMUNICATIONS ENCLOSURE AND RELATED COMPONENTS

CROSS-REFERENCE TO RELATED APPLICATIONS

This application is a Continuation of U.S. patent application Ser. No. 16/626,196, filed on Dec. 23, 2019, now U.S. Pat. No. 11,300,745, which is a National Stage Application of PCT/EP2018/066842, filed on Jun. 23, 2018, which claims the benefit of U.S. Patent Application Ser. No. 62/524,240, filed on Jun. 23, 2017, and claims the benefit of U.S. Patent Application Ser. No. 62/622,644, filed on Jan. 26, 2018, the disclosures of which are incorporated herein by reference in their entireties. To the extent appropriate, a claim of priority is made to each of the above disclosed applications.

TECHNICAL FIELD

The present disclosure relates generally to sealed telecommunications enclosures.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers.

It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures.

Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. PCT Patent Publication Nos. WO 2014/095462 and WO 2014/005916 disclose enclosures having gel blocks with individually removable gel sealing modules. While pressurized cable seals have generally proven to be effective, improvements in this area are still needed.

SUMMARY

One aspect of the present disclosure relates to an enclosure having a sealing unit with a gel block capable of being placed under tension to facilitate removal of the gel block from the enclosure.

Another aspect of the present disclosure relates to a method for removing a gel block from a gel-block mounting sleeve of a housing. The gel block is moved along an axis relative to the gel-block mounting sleeve during removal of the gel block from the gel-block mounting sleeve. The method includes placing the gel block in axial tension along the axis while the gel block is in the gel-block mounting sleeve to at least partially break or reduce adhesion between a radially outwardly facing surface of the gel and a radially inwardly facing surface of the gel-block mounting sleeve. The method also includes removing the gel block from the gel-block mounting sleeve by moving the gel block along the axis relative to the gel-block mounting sleeve after the gel has been placed in tension. In the above example, the gel can be maintained in tension as the gel block is removed from the gel-block mounting sleeve. In any of the above examples, the gel can be placed in tension by an actuator that is also used to apply axial compressive load to the gel to enhance sealing of the gel within the gel-block mounting sleeve. In any of the above examples, the actuator can include at least one spring or a plurality of springs for applying axial compressive load to the gel in the form of compressive spring pressure. In any of the above examples, the gel can define at least one axially extending cable sealing port. In any of the above examples, the gel can define a plurality of axially extending cable ports. In any of the above examples, the gel block can include a plurality of individual gel sealing modules that cooperate to define the gel block. In any of the above examples, the actuator can include inner and outer pressurization structures between which the gel block is pressurized during sealing. In any of the above examples, the gel sealing modules can be attached to inner and outer pressurization structures of an actuator by snap-fit connections capable of transferring tensile load from the pressurization structures to the gel sealing modules. In certain examples, the snap-fit connections can be made by snap-fit interface components which snap together in an axial orientation. In certain examples, the snap-fit interface components can include posts and snap-fit collars. In certain examples, the gel sealing modules are individually and separately removable from between inner and outer pressurization structures and at least a plurality of their removable gel sealing modules are cable sealing modules each including: at least first and second gel portions that meet at a separable interface at which at least one cable port is defined, the first and second gel portions being capable of being separated from one another when the cable sealing module is not between the inner and outer pressurization structures to allow a cable to be inserted laterally into the cable port; and end caps between which cable ports extend, end caps each including first end cap portions attached to opposite ends of the first gel portion and second end cap portions attached to opposite ends of the second gel portion, the first and second end cap portions separating from one another when the first and second gel portions are separated from one another. In certain examples, living hinges or other flexible connections can be used to interconnect the separate portions of the cable sealing modules.

Another aspect of the present disclosure relates to a cable sealing module for mounting between pressurization structures of an actuator of a sealing unit. The cable sealing module includes at least first and second gel portions that meet at a separable interface at which at least one cable port is defined. First and second gel portions are capable of being separated from one another when the cable sealing module is not between the pressurization structures to allow a cable to be laterally inserted into the cable port. The cable sealing module also includes end caps between which an axis of the cable port extends. The end caps each include first end cap portions attached to opposite ends of the first gel portion and second end cap portions attached to opposite ends of the second gel portion. The first and second end cap portions separate from one another when the first and second gel portions are separated from one another. The cable sealing module also includes snap-fit structures integrated with the end caps for coupling in a snap-fit connection with the pressurization structures of the actuator. In the above example, the snap-fit structures can include posts or collars. In any of the above examples, the snap-fit structures can include posts having enlarged heads, posts projection outwardly from the end caps in an orientation parallel to the axis of the cable port. In any of the above examples, the separable portions of the cable sealing module can be coupled together by a living hinge their flexible means that allows the portions to be separated from one another at the separable interface while preventing the separable portions from being completely detached from one another. In still other examples, the separable portions of the cable sealing modules can be completely detachable from one another.

A further aspect of the present disclosure relates to an enclosure including a housing including a gel-block mounting sleeve. The enclosure also includes a gel sealing unit including: a gel sealing block that mounts within the gel-block mounting sleeve; and an actuator capable of applying compressive load to the gel sealing block during sealing, and capable of applying tensile load to the gel sealing block to facilitate removal of the gel sealing block from the gel-block mounting sleeve. In one example, the actuator includes at least one spring for applying the compressive load to the gel sealing block in the form of compressive spring pressure. In any of the above examples, the actuator can include pressurization structures between which the gel seal block mounts, wherein the gel sealing block is pressurized between the pressurization structures during sealing, when the gel sealing block is coupled to the pressurization structures by a coupled interface that allows the pressurization structures to apply tension to the gel sealing block prior to removal of the gel sealing block from the gel-block mounting sleeve, and wherein during tensioning positioning of the pressurization structure is absolutely controlled by a trigger arrangement of the actuator without influence from the at least one spring. In any of the above examples, the trigger arrangement can apply compressive load for forcing the pressurization structures together through at least one spring and can positively engage the pressurization structures during tensioning such that axial movement of a threaded component of the trigger arrangement is converted into an equal axial increase in a spacing between the pressurization structures. In any of the above examples, the trigger arrangement can engage a positive stop corresponding to at least one of the pressurization structures to provide positive movement of the pressurization structures during tensioning after the one or more springs have been de-compressed. In any of the above examples, the gel block can include a plurality of individual gel sealing modules that cooperate to define the gel block. In any of the above examples, the gel sealing modules can be attached to the inner and outer pressurization structures by snap-fit connections capable of transferring tensile load from the pressurization structures to the gel sealing modules. In any of the above examples, the snap-fit connections are made by snap-fit interface components which snap together in an axial orientation. In any of the above examples, the snap-fit interface components can include posts and snap-fit collars. In any of the above examples, the gel sealing modules can be individually and separately removable from between the pressurization structures and at least the plurality of the removable gel sealing modules are cable sealing modules each including: at least first and second gel portions that meet at a separable interface which at least one cable port is defined, the first and second gel portions being capable of being separated from one another when the cable sealing module is not between the pressurization structures to allow a cable to be laterally inserted into the cable port; and end caps between which the cable port extends, the end caps each including first end cap portions attached to opposite ends of the first gel portion and second end cap portions attached to opposite ends of the second gel portion, the first and second end cap portions separating from one another when the first and second gel portions are separated from one another. In any of the above examples, the end caps can include snap-fit structures for coupling in a snap-fit connection with the pressurization structures. In any of the above examples, the housing can include a dome coupled to a base, wherein the gel-block mounting sleeve is defined within the base. In any of the above examples, the base can include a first end that couples to the dome and an opposite second end, and the gel sealing block can be inserted into the gel-block mounting sleeve through the second end of the base. In any of the above examples, the pressurization structures can include inner and outer pressurization structures, wherein the inner pressurization structures coupled to an anchoring bracket that is carried with the inner pressurization structure when the gel sealing block is inserted into and remove from the base, wherein the anchoring bracket can be axially inserted into the base with the gel sealing block when in a first rotational position relative to the base, and wherein once the gel sealing block and the anchoring bracket have been inserted into the base, the gel sealing block and the anchoring bracket can be rotated relative to the base to a second rotational position where the anchoring bracket is axially affixed within the base. In certain examples, the anchoring bracket is prevented from rotating from the second rotational position back to the first rotational position by a fastener, a snap-fit structure, a clip, a latch, a slide latch, or other structure. A further aspect of the present disclosure relates to an enclosure having a housing including a dome coupled to a base. The base includes a first end that couples to the dome and an opposite second end. The base defines a gel-block mounting sleeve. The enclosure also includes a gel sealing unit including a gel sealing block that mounts within the gel-block mounting sleeve by inserting the gel block through the second end of the base. The enclosure further includes an actuator capable of applying compressive load to the gel sealing block during sealing. The actuator includes inner and outer pressurization structures between which the gel sealing block mounts. The inner pressurization structure is coupled to an anchoring bracket that is carried with the inner pressurization structure when the gel sealing block is inserted into and removed from the base. The anchoring bracket can be axially inserted into the base with the gel sealing block when in a first rotational position relative to the base. Once the gel sealing block and the anchoring block have been inserted into the base, the gel sealing block and the anchoring bracket can be rotated relative to the base to a second rotational position where the anchoring bracket is axially fixed within the base. It will be appreciated that the term "axially fixed" means that movement in the axial direction is generally limited or prevented, but a small amount of substantially non-functional movement may occur. In certain examples, the anchoring bracket is prevented from rotating from the second rotational position back to the first rotational position by a fastener, or a snap-fit structure, or a clip, or a pivoting latch, or a slide latch, or other type of latch, or other structure. In certain examples, fiber optic organizers coupled to the anchoring bracket is carried with the gel sealing unit during insertion into the base, the fiber optic organizer preferably including a plurality of pivotal fiber management trays such as splice trays.

A further aspect of the present disclosure relates to a gel sealing unit including a gel sealing block and an actuator capable of applying compressive load to the gel sealing block during sealing. The actuator includes pressurization structures between which the gel sealing block mounts. The actuator includes a trigger arrangement for transferring compressive load to the pressurization structures. At least one of the pressurization structures is axially moved along a first axis relative to the other of the pressurization structures when the trigger arrangement is actuated. The trigger arrangement includes a handle that is rotated about a second axis angled relative to the first axis to cause relative movement between the pressurization structures along the first axis. In certain examples, the first and second axes are perpendicular. In any of the above examples, trigger arrangement can include an angled gear arrangement for transferring torque from the handle to a rotatable component of the trigger arrangement that rotates about the first axis. In any of the above examples, the angled gear arrangement can include angled bevel gears. In any of the above examples, the angled bevel gears that include right angle bevel gears. In any of the above examples, the rotatable component can include a nut threaded on a threaded first shaft of the trigger arrangement wherein the threaded first shaft is aligned along the first axis and is configured to be placed in tension when compressive load is applied to the pressurization structures by the trigger arrangement, wherein a first angled bevel gear in integrated with or coupled to the nut, wherein the handle is mounted on a second shaft aligned with the second axis and is rotated about the second axis by turning the handle, and wherein the second shaft is coupled to a second angled bevel gear that intermeshes with the first angled bevel gear.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventions and inventive concepts upon which the examples disclosed herein are based.

BRIEF DESCRIPTION OF THE DRAWINGS

FIG. 99 is a perspective view showing another mounting configuration for securing a cable anchoring unit or a cable anchor unit adapter to an anchoring bracket in accordance with the principles of the present disclosure;

DETAILED DESCRIPTION

Figure 1:
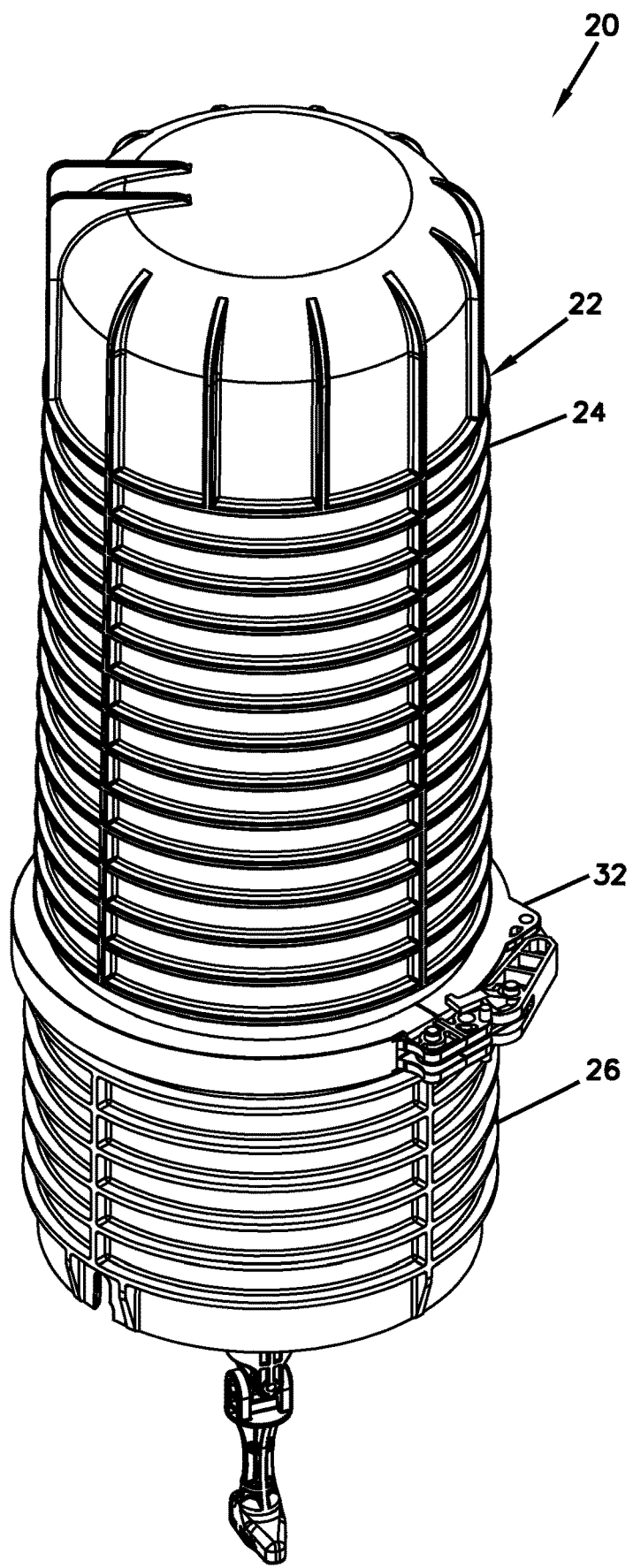
FIG. 1 illustrates a telecommunications enclosure in accordance with the principles of the present disclosure.
Figure 2:
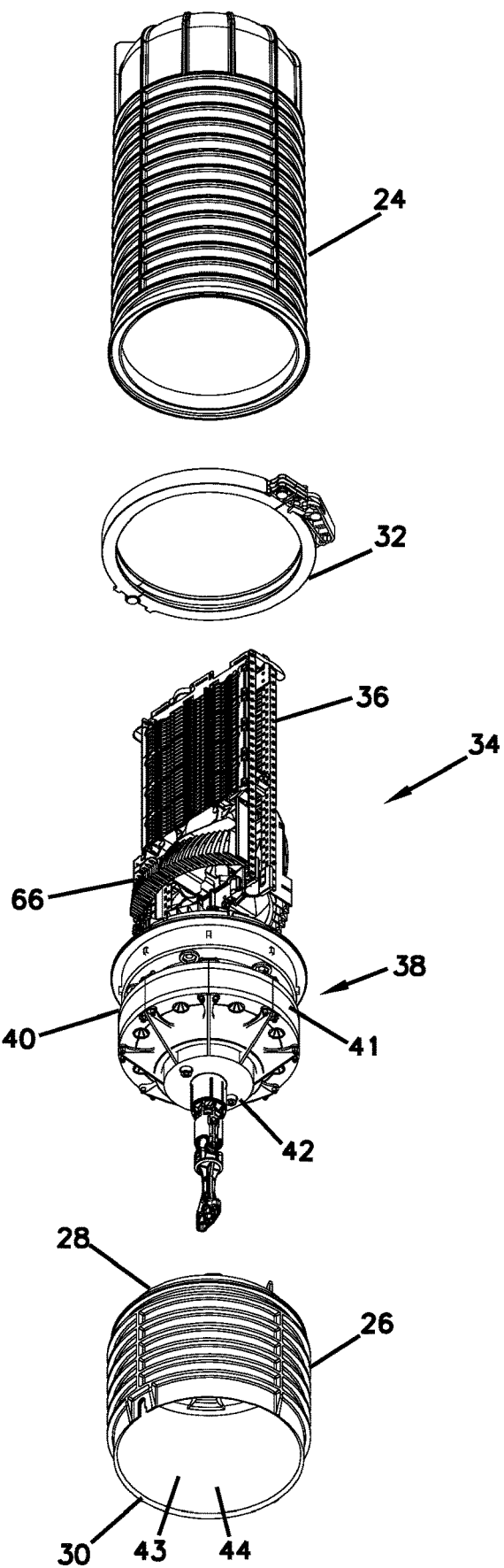
FIG. 2 is an exploded view of the telecommunications enclosure of FIG. 1.

FIG. 1 illustrates a telecommunications enclosure 20 including a housing 22. In one example, the housing 22 includes a dome 24 that attaches to a base 26. The base 26 can include a first end 28 adapted for connection to the dome 24 and a second end 30. In one example, the first end 28 can connect to the dome 24 by means such as a clamp 32. An environmental seal 25 (shown at FIG. 3 as an O-ring) can be provided between the base 26 and the dome 24 to provide environmental sealing. As shown at FIG. 2, a telecommunications assembly unit 34 is adapted to be housed within the housing 22. The telecommunications assembly unit 34 includes a fiber optic manager 36 coupled to a gel sealing unit 38. The gel sealing unit 38 includes a gel sealing block 40 that mounts within an actuator 42. When the telecommunications assembly unit 34 is housed within the housing 22, the gel sealing block 40 fits within a gel-block mounting sleeve 44 confined within the base 26, and the fiber optic manager 36 is enclosed within the dome 24. It will be appreciated that the telecommunications assembly unit 34 can be loaded into the base 26 through the second end 30 of the base 26. Once the gel sealing block 40 is within the gel-block mounting sleeve 44, the gel sealing block 40 can be axially compressed by the actuator 42 to provide sealing. Sealing can include sealing of any cables routed through the cable ports defined by the gel sealing block 40, and can also include peripheral sealing 46 defined between a radially outwardly facing gel surface 41 of the gel sealing block 40 and a radially inwardly facing surface 43 of the gel-block mounting sleeve 44. The peripheral sealing can be also called a circumferential sealing can extend circumferentially around the gel sealing block 40.

Typically, after insertion of the gel sealing block 40 within the gel-block mounting sleeve 44, the actuator 42 is actuated to pressurize the gel sealing block 40 axially causing the gel of the gel sealing block 40 to flow to fill any voids and to press/expand radially outwardly against the inwardly facing radial surface 43 of the gel-block mounting sleeve 44 to provide an effective peripheral seal. After time, relatively strong adhesion can develop between the radially outwardly facing surface 41 of the gel sealing block 40 and the radially inwardly facing surface 43 of the gel-block mounting sleeve 44. This type of adhesion can make it difficult to remove the gel sealing block 40 from the base 26 at a later date. Aspects of the present disclosure relate to a gel sealing unit 38 which is configured to be capable of applying compressive spring load to the gel sealing block 40 to effect sealing, and also capable of applying tensile load to the gel sealing block 40 to cause the gel sealing block 40 to radially constrict such that adhesion between the outer surface of the gel sealing block 40 and the inner surface of the gel-block mounting sleeve 44 is broken or weakened. In this way, removal of the gel sealing unit 38 from the base 26 is facilitated.

Figure 3:
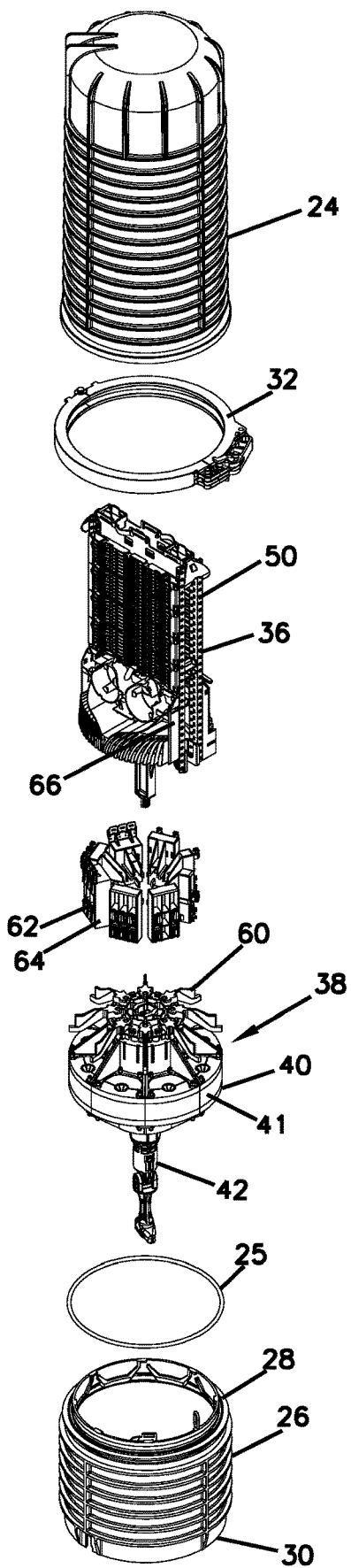
FIG. 3 is a further exploded view of the telecommunications enclosure of FIG. 1.
Figure 4:
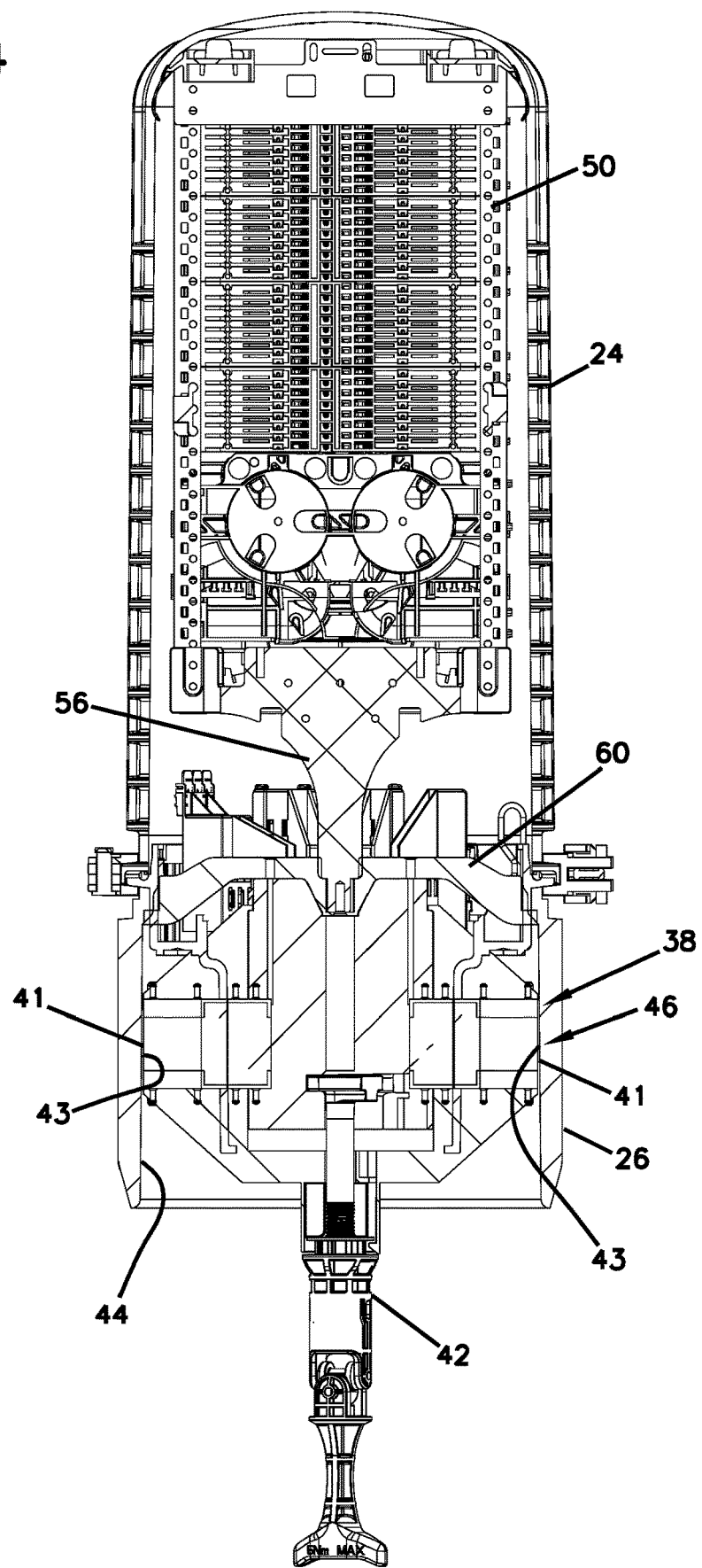
FIG. 4 is a cross-sectional view of the telecommunications enclosure of FIG. 1.

Referring to FIGS. 2-4, the fiber manager 36 includes a fiber management tower 50 capable of pivotally supporting a plurality of fiber management trays 61 (one tray is shown at FIGS. 38-43, but typically a plurality of stacked and overlaid pivotal trays are provided at opposite sides of the fiber management tower 50). For example, sets of fiber management trays can be pivotally mounted in a stacked relationship on opposite first and second major sides 51, 53 of the fiber management tower 50. The trays can be snapped into receptacles 63 at the major sides 51, 53 of the tower 50. The fiber management trays can be adapted to hold fiber optic components such as fiber optic splices, wavelength division multiplexers, passive optical splitters, and the like. In certain examples, fiber routing to the trays can be provided at opposite minor sides 54, 55 of the tower 50. The fiber management tower 50 can include a lower support extension 56 (e.g., a projection) that couples to an anchoring bracket 60 configured to be locked or fixed within an interior of the base 26. When the anchoring bracket 60 is fixed relative to the base 26, the anchoring bracket 60 is prevented from axially moving relative to the base 26. The anchoring bracket 60 can also be coupled to the gel sealing unit 38. Thus, the anchoring bracket 60 can provide a means for axially fixing/supporting the entire telecommunications assembly unit 34 within the interior of the housing 22. In one particular example, the anchoring bracket 60 can interconnect with the base 26 by a twist-to-lock configuration.

In certain examples, cable anchoring units 62 can be mounted on the gel sealing unit 38 and/or to the anchoring bracket 60. In certain examples, the cable anchoring units 62 can mount within/to intermediate adapters 64 that attach to the gel sealing unit 38 and/or the anchoring bracket 60 by means such as a snap-fit connection. The adapter 64 can be configured to receive a plurality of cable anchoring units 62, or can be configured to receive single cable anchoring units. It will be appreciated that different styles and types of cable anchoring units 62 can be fitted in the adapter 64 so as to be compatible with different type sizes and types of cables routed through the gel sealing unit 38. In other examples, cable anchoring units 62 may be mounted directly to the anchoring bracket 60 without the use of intermediate adapters 64. It will be appreciated that the anchoring bracket 60 can include snap-fit structures, hooks, tabs, rails, slot openings, or other structures for allowing adapters and/or cable anchoring structures and/or adapters to be readily attached to the anchoring bracket 60. In certain examples, the anchoring bracket 60 can have a spoked configuration with a plurality of arms that project radially outwardly from a central hub. Similarly, in certain examples, pressurization structures of the actuator 42 can also have a spoked configuration with arms that project radially outwardly from the central hub.

In certain examples, fiber management tubes are routed between the cable anchoring structures 62 and the fiber management tower 50. In certain examples, it is preferred for these fibers to be routed within protective tubes (e.g., buffer tubes, furcation tubes, etc.) between the cable anchoring structures 62 and the fiber management tower 50. In certain examples, the protective tubes can be held within tube mounts (e.g., tube holders or like structures). It is preferred for the tube mounts to be configured to efficiently utilize space within the housing 22 for tube routing. In certain examples, the base 26 and the dome 24 are circular or cylindrical in shape. In certain examples, tube mounts 66 having curvatures that generally conform to the shape of the base 26 and/or the dome 24. The tube mounts 66 can be provided at the major sides 51, 53 of the fiber management tower 50 (see FIGS. 38-50). Preferably, the tube mounts 66 can be provided at a base of the fiber management tower 50. In certain examples, fiber management spools or bend radius limiters 67 can be provided above the tube mounts 66 for facilitating routing fibers without violating minimum bend radius requirements of the optical fibers. The bend radius limiters 67 or spools can be used to readily route fibers in a figure-eight shape or partial figure-eight shape to smoothly transition fibers to either of the minor sides 54, 55 of the fiber management tower 50 regardless of where the fibers are routed through the tube mount 66. In certain examples, tube mount 66 can include an overall body defining a plurality of tube holders 69 in the form of open sided grooves/slots sized to frictionally hold tubes therein. The tube holders can be arranged in a row or rows. In certain examples, a mid-plane MP bisects the major sides 51, 53 of the fiber management tower 50, and the tube holders 69 are depicted as curved slots. Curved slots 69a on one side of the mid-plane MP are configured to curve toward the minor side 54 of the tower 50 as the slots extend upwardly from bottom ends 71 to top ends 73 of the slots. In contrast, curved slots 69b on the opposite side of the mid-plane MP are configured to curve toward the minor side 55 of the tower 50 as the slots extend upwardly from bottom ends 71 to top ends 73 of the slots. In certain examples, an overall shape of the body of the tube mount 66 is curved along curves along a curvature 75 that extends about a central axis 79 of the base 26. The curvature 75 extends along a length L of the body, and the holders 69 are spaced along the length L. In certain examples, an outer face 77 of the body of the tube mount 66 has a convex curvature that extends generally about the central axis 79 across a width of the major sides 51, 53, and an inner face of the body of the tube mount 66 has a concave curvature that extends about the central axis 79 across the width of the major sides 51, 53. In certain examples, the outer face 77 of the body of the tube mount 66 can also have a convex curvature that extends from bottom side to a top side of the body of the tube mount 66. The curved arrangement of the tube mount assists in effectively utilizing space within the housing 22 for fiber routing. Markings 81 can be provided on the outer face 77 to indicate preferred termination/ending locations for the tubes to leave room for tube expansion.

FIGS. 51-60 show an alternative tube mount 166 having an overall body shape that is curved along curves along a curvature 175 that extends about a central axis 79 of the base 26. The curvature 175 extends along a length L of the body, and tube holders 169 are spaced along the length L. The length L extends across a width of the corresponding major side of the tower 50. The tower 50 can also be referred to as a tray mount. Tube mount 166 can be positioned at the bottom of each of the major sides 51, 53. The tube holders 169 are depicted as closed channels. The closed channels can be defined by flexible arms 171 that can be flexed apart to allow tubes to be inserted in the channels.

Figure 5:
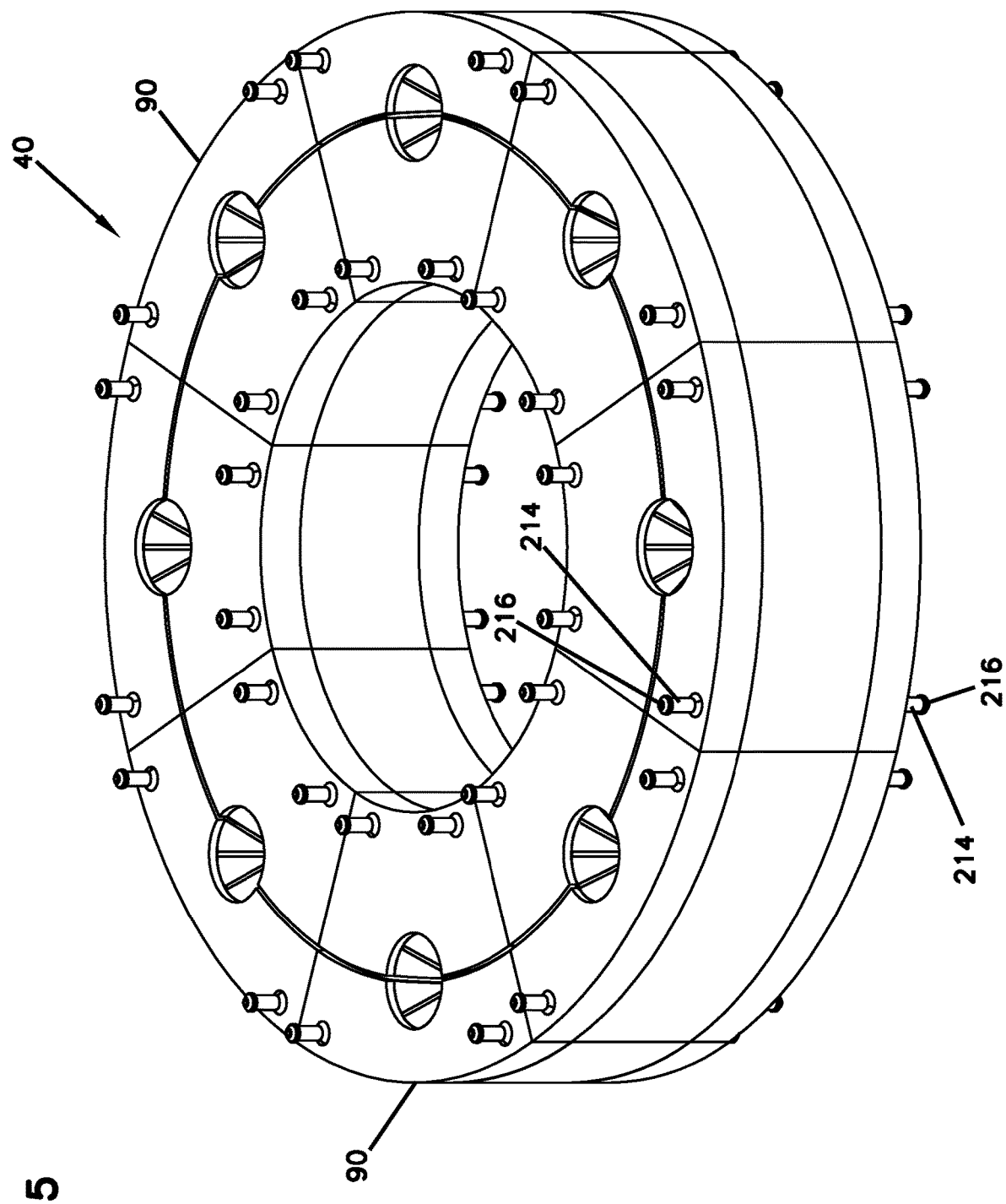
FIG. 5 is a perspective view of an example gel sealing block used to seal the telecommunications enclosure of FIG. 1.

Referring to FIG. 5, the gel sealing block 40 includes a plurality of individual gel sealing modules 90 that cooperate to define the gel block 40. While gel sealing modules are all depicted having the same configuration and each define a single cable port, it will be appreciated that gel sealing modules having the same form factor but different port configurations can be used and can be mixed and matched in a given gel block. Example cable sealing modules can include 1, 2, 3, 4, 5, 6 or more cable ports. Additionally, cable sealing modules having different port shapes (e.g., round, obround, race-track shaped, etc.) can be used. Blank sealing modules with no ports can also be used.

Figure 6:
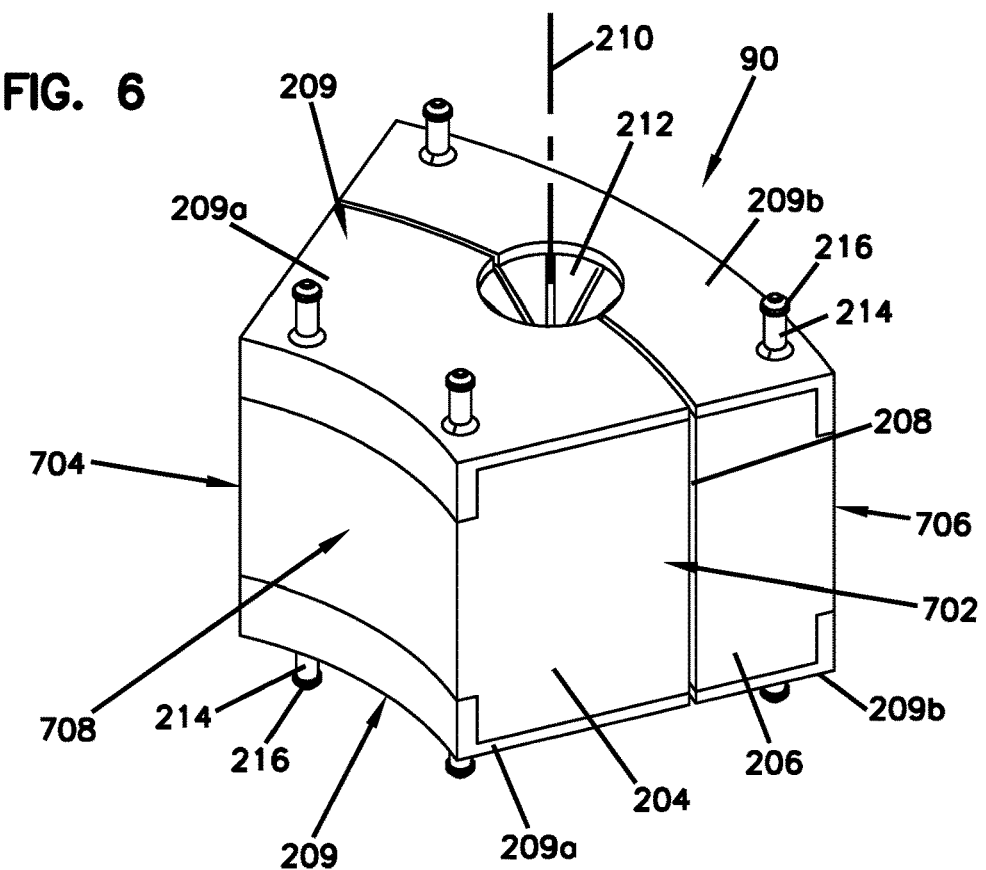
FIG. 6 is a perspective view of a cable sealing module of the gel sealing block of FIG. 5.
Figure 7:
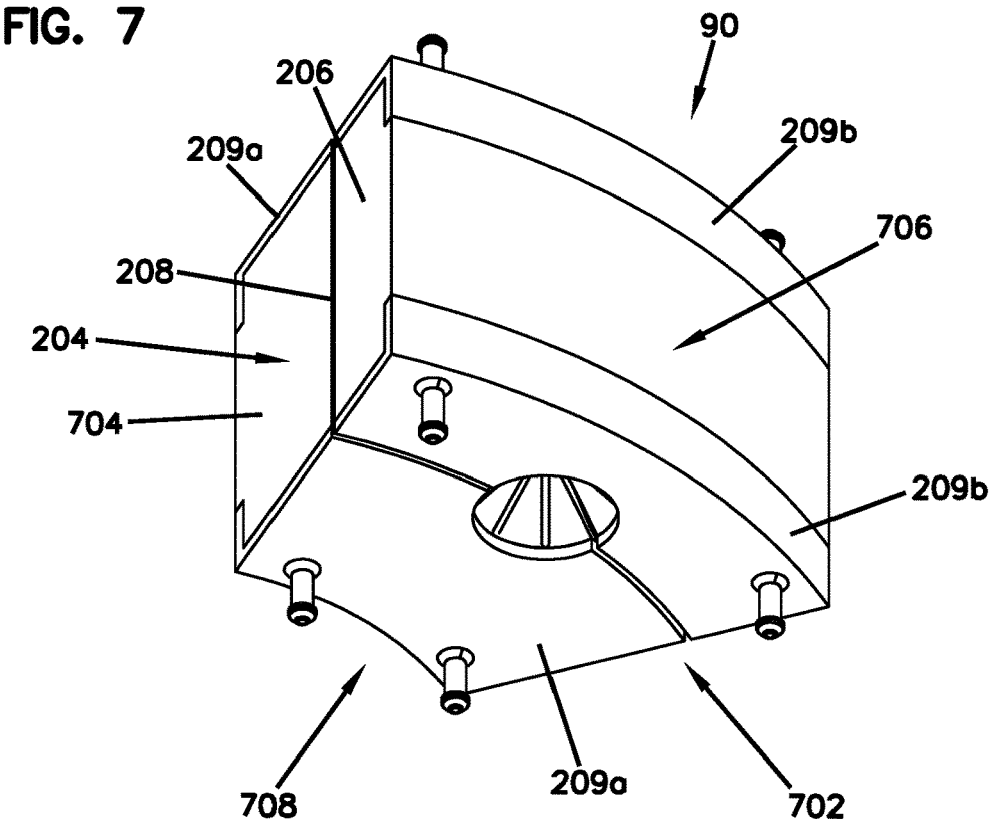
FIG. 7 is another perspective view of the cable sealing module of FIG. 6.
Figure 8:
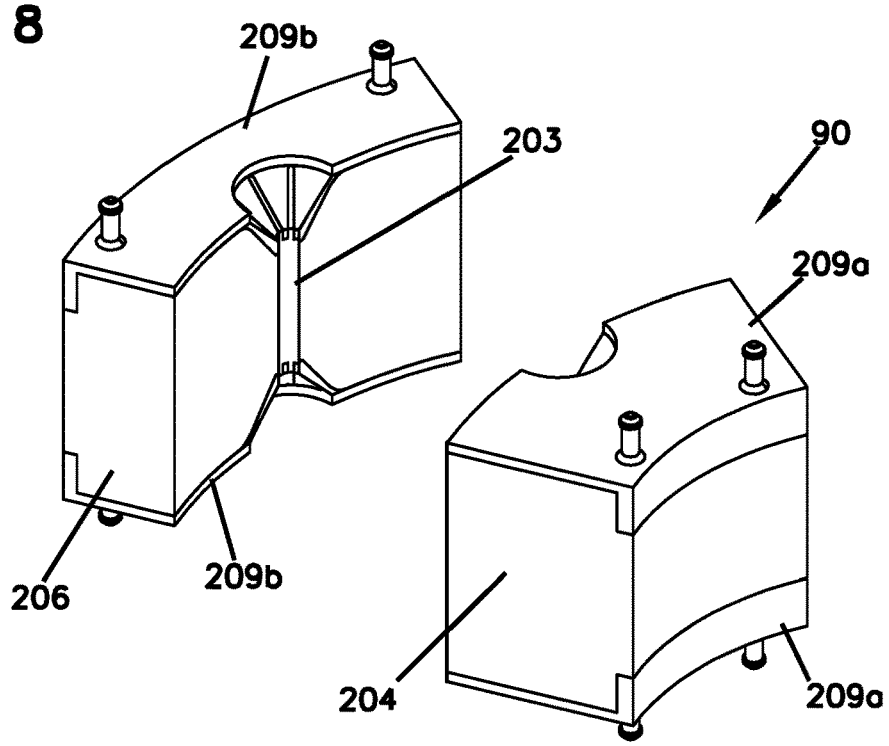
FIG. 8 is an exploded view of the cable sealing module of FIG. 6.
Figure 9:
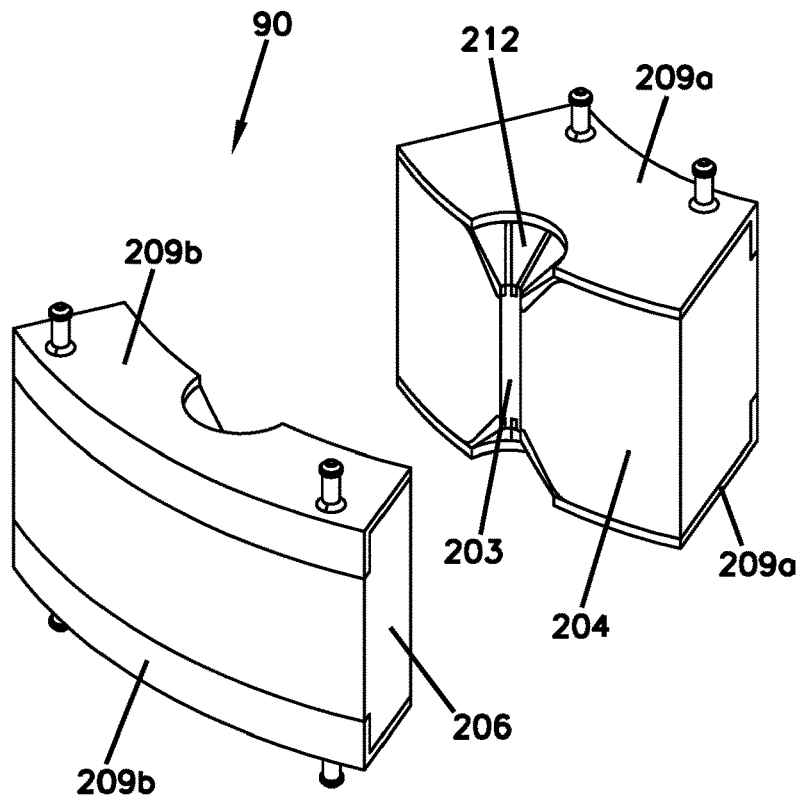
FIG. 9 is another exploded view of the cable sealing module of FIG. 6.
Figure 10:
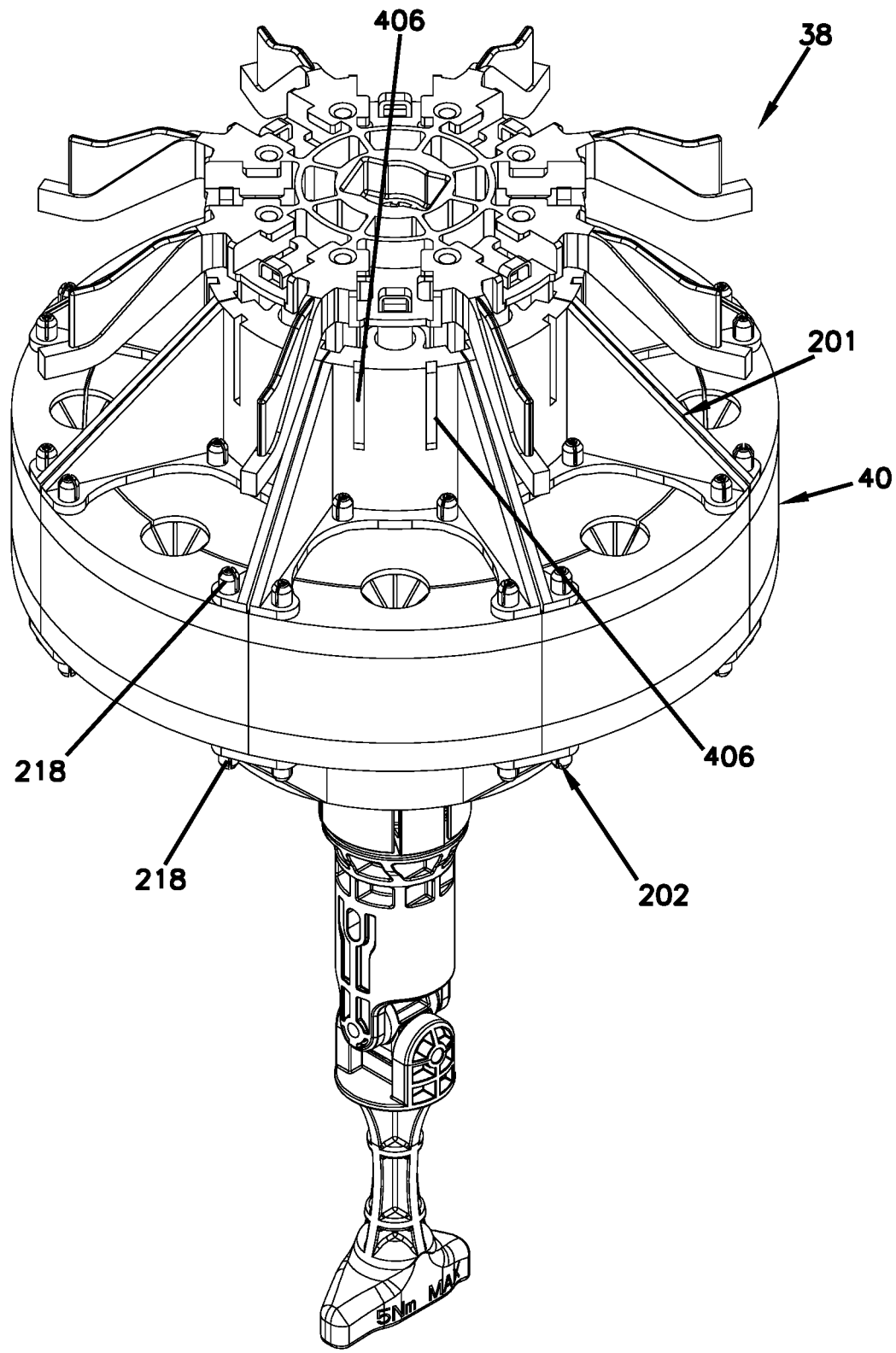
FIG. 10 is a perspective view of an example gel sealing unit that can be used with the telecommunications enclosure of FIG. 1.
Figure 11:
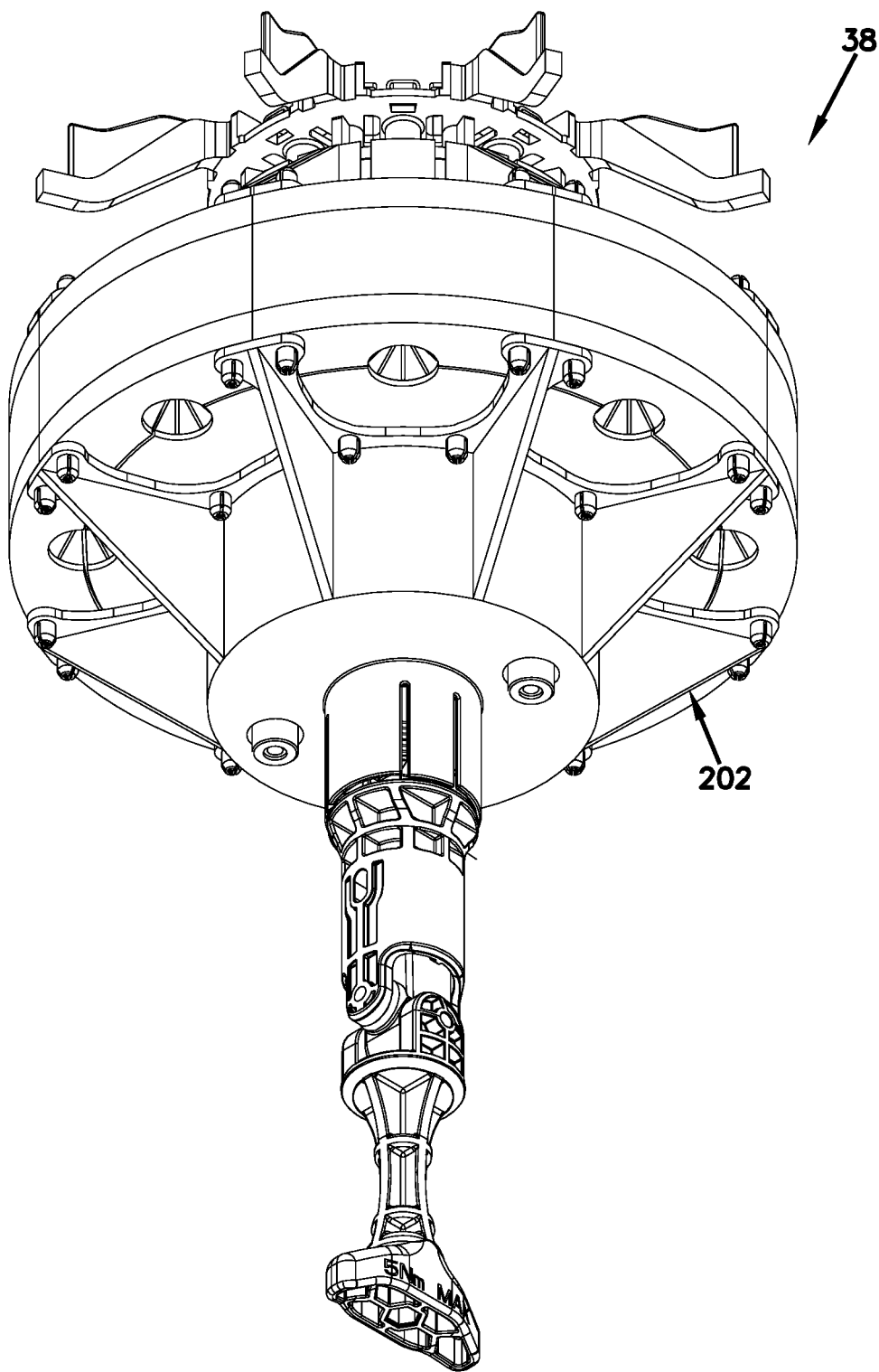
FIG. 11 is another perspective view of the gel sealing unit of FIG. 10.
Figure 12:
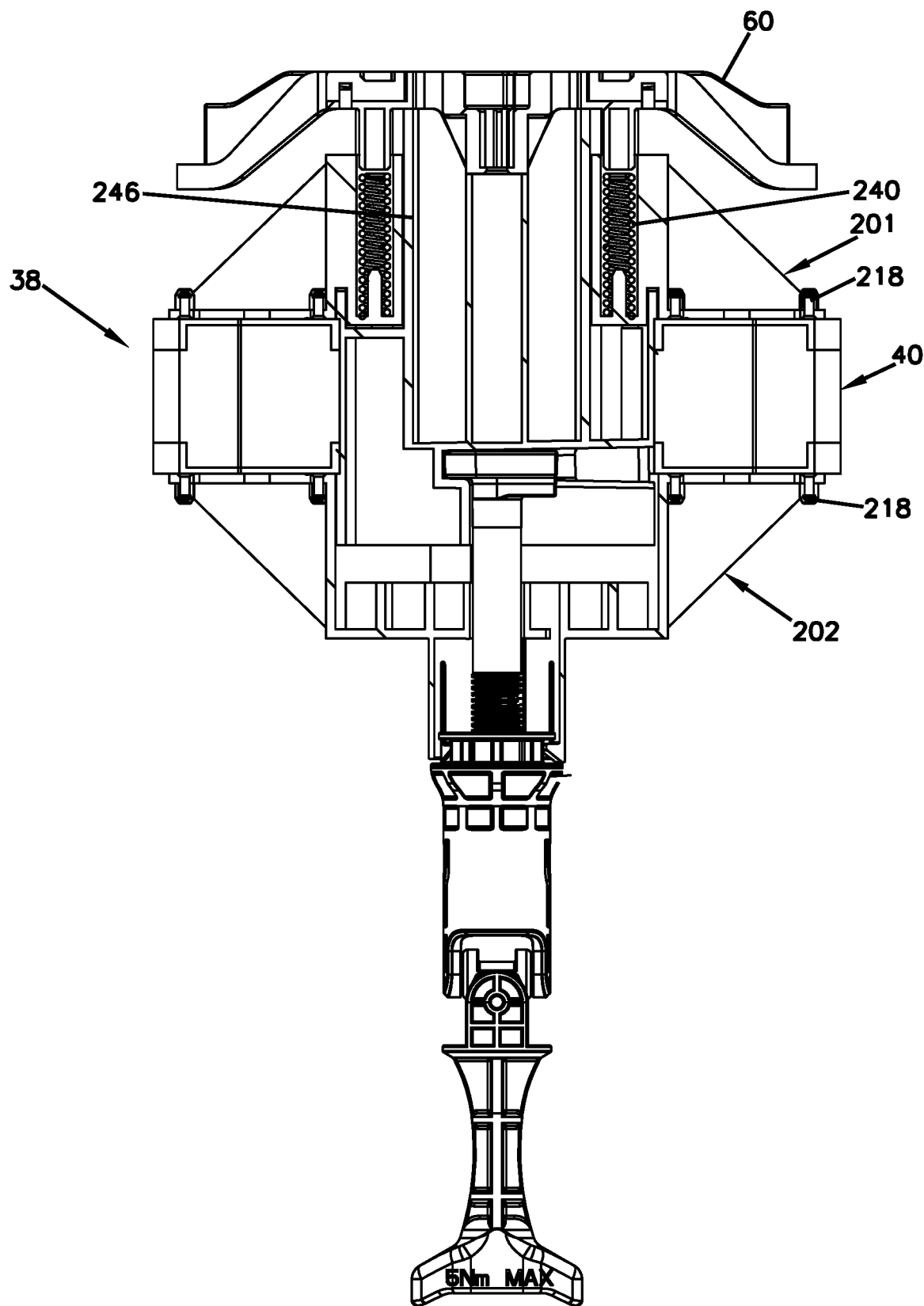
FIG. 12 is a cross-sectional view of the cable sealing unit of FIG. 10.
Figure 13:
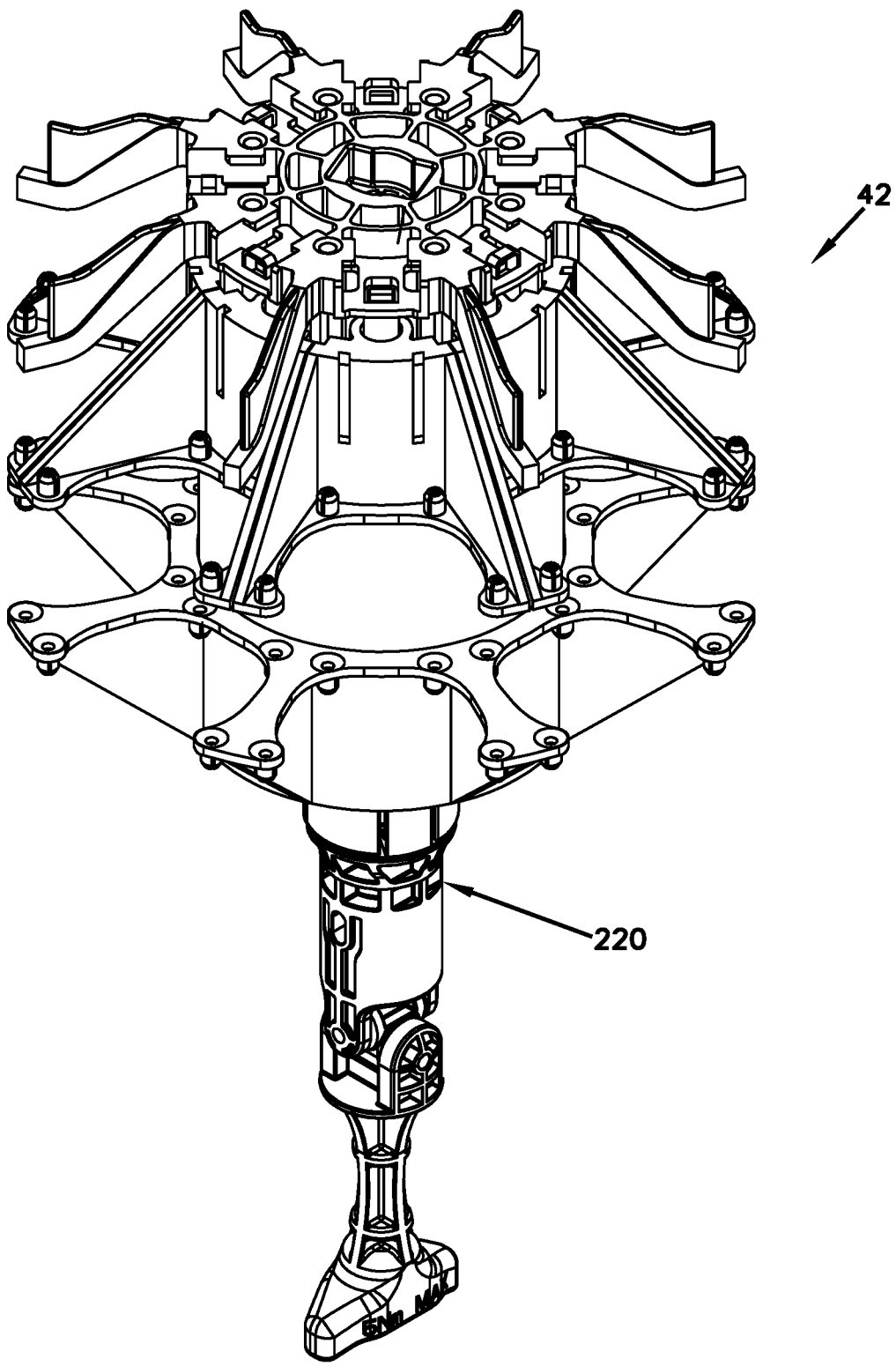
FIG. 13 is a perspective view of an actuator of the cable sealing unit of FIG. 10.
Figure 14:
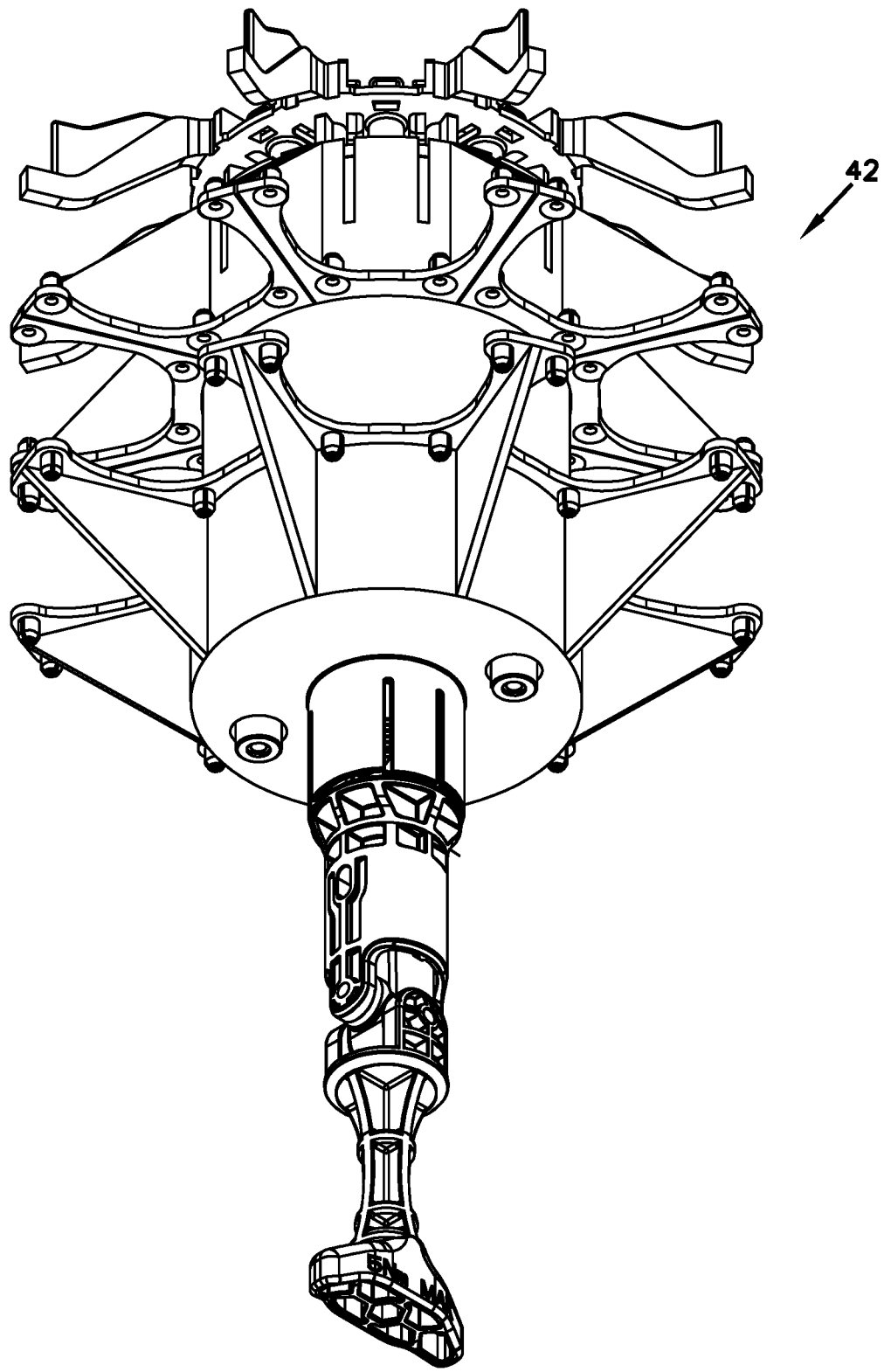
FIG. 14 is another perspective view of the actuator of FIG. 13.
Figure 15:
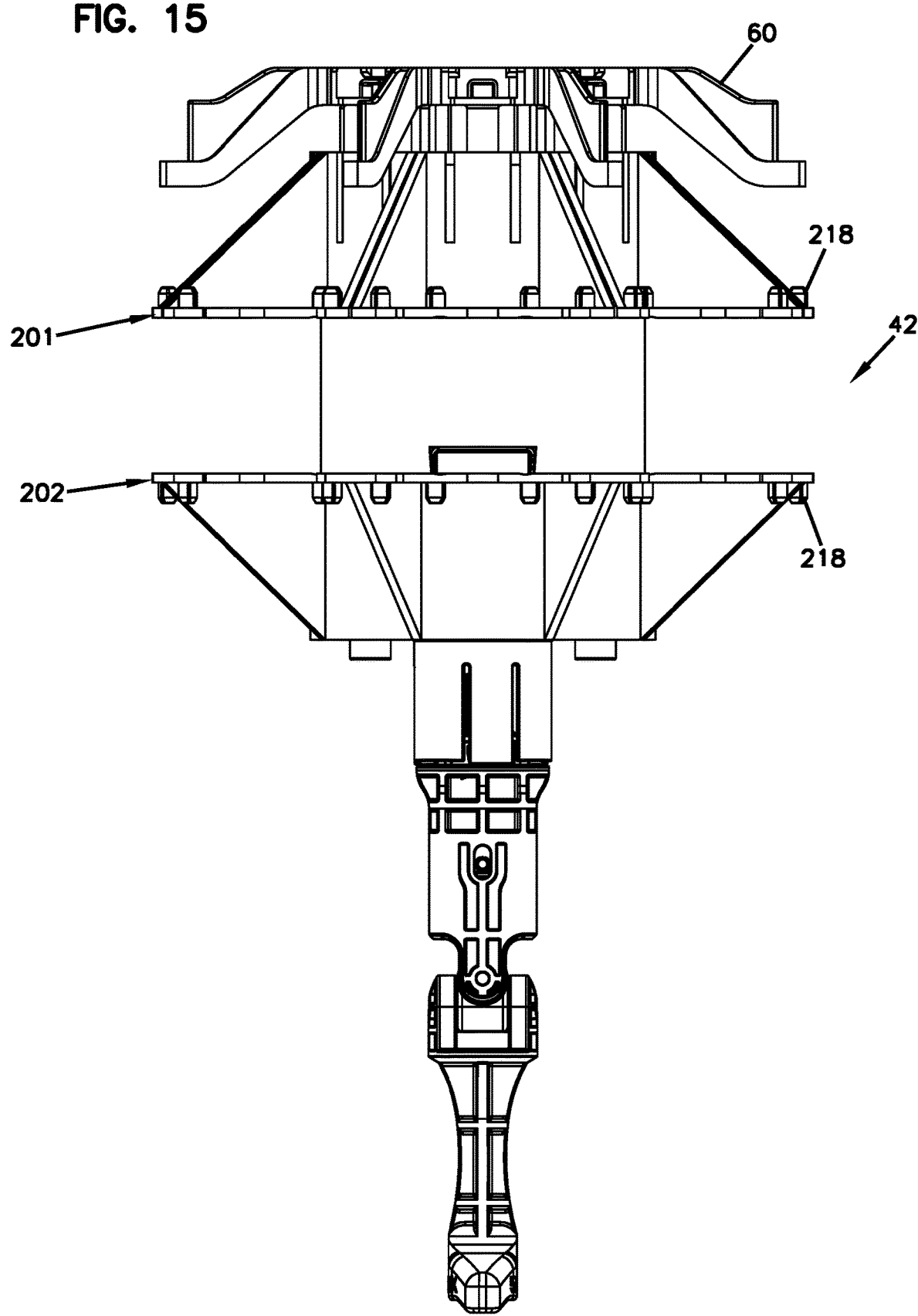
FIG. 15 is a side view of the actuator of FIG. 13.
Figure 16:
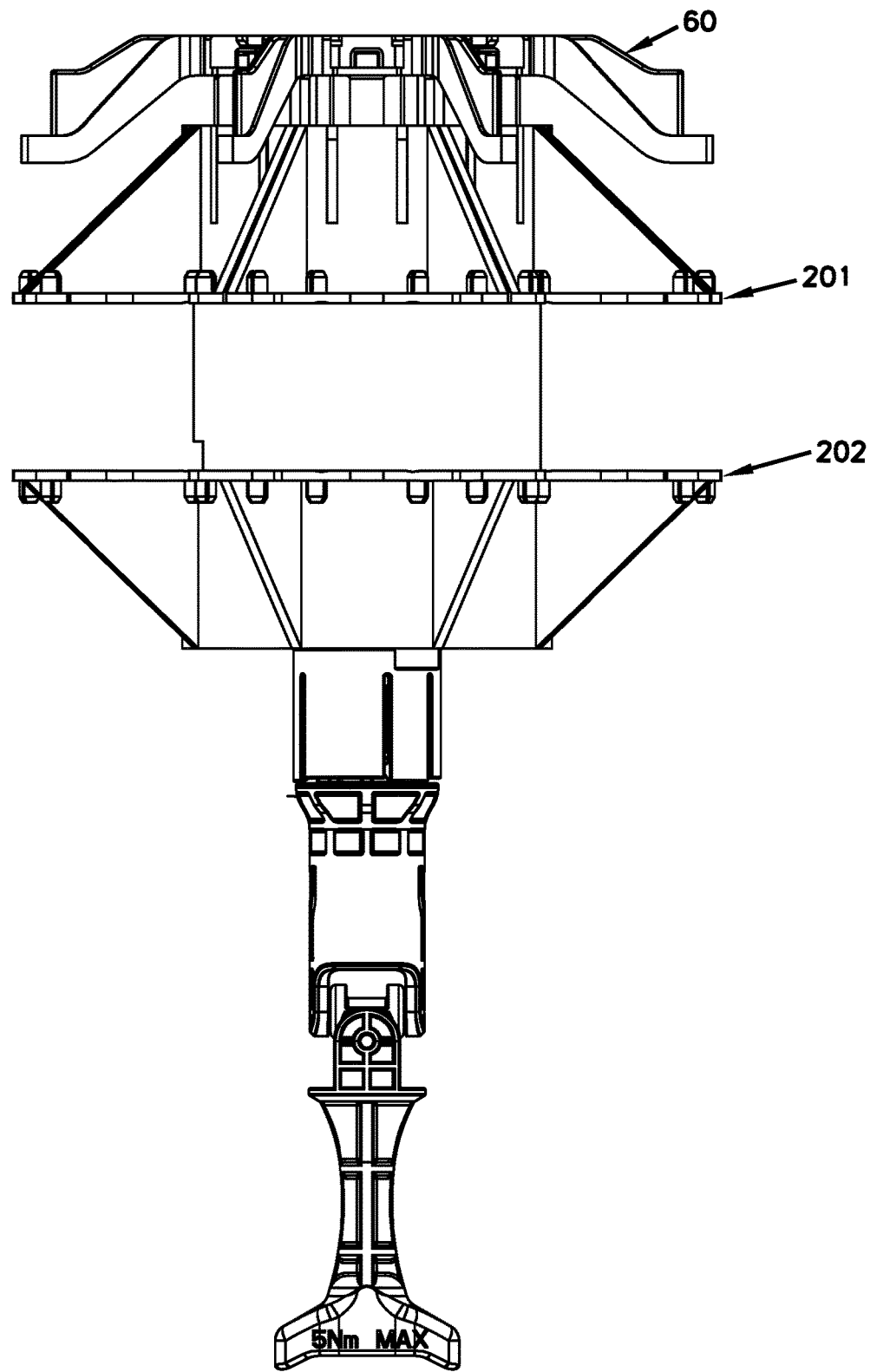
FIG. 16 is another side view of the actuator of FIG. 13.
Figure 17:
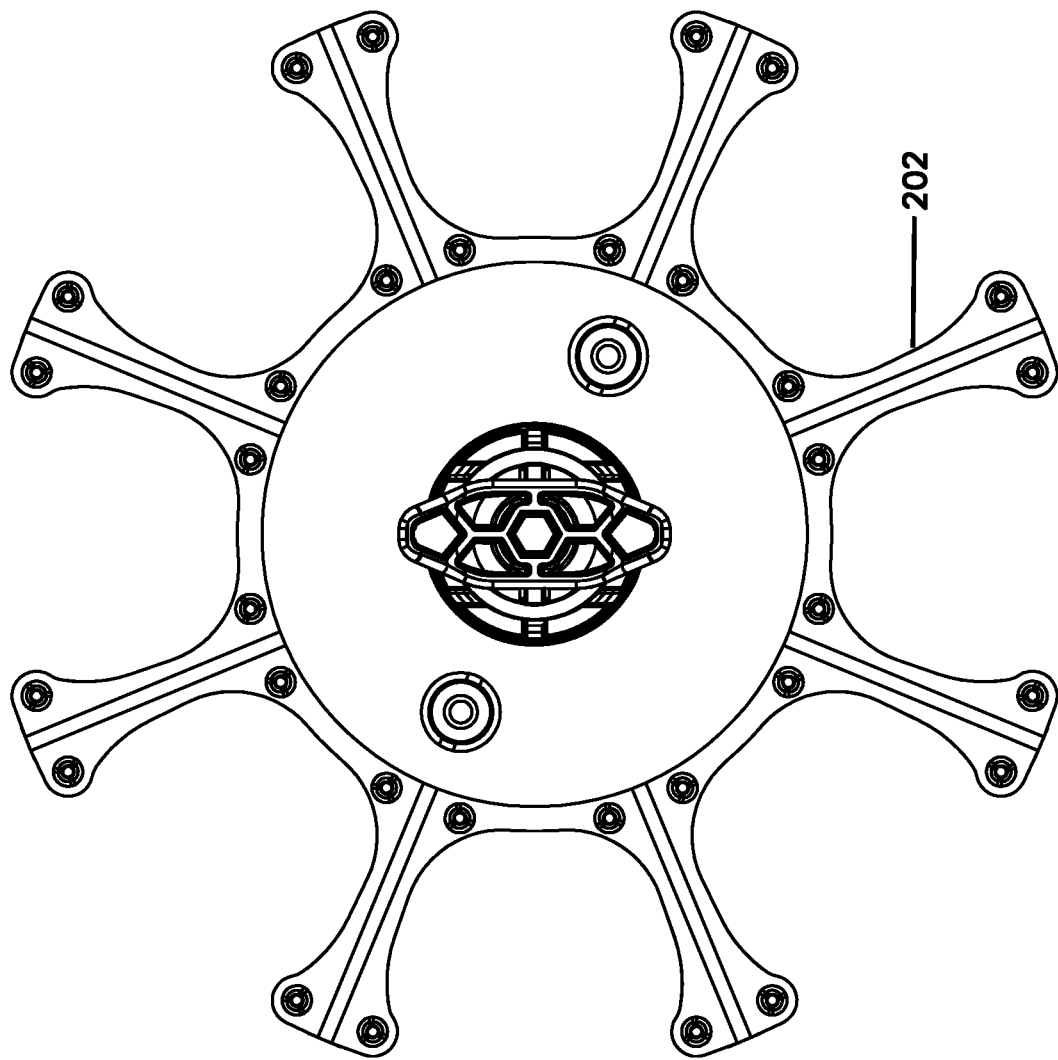
FIG. 17 is a bottom view of the actuator of FIG. 13.
Figure 18:
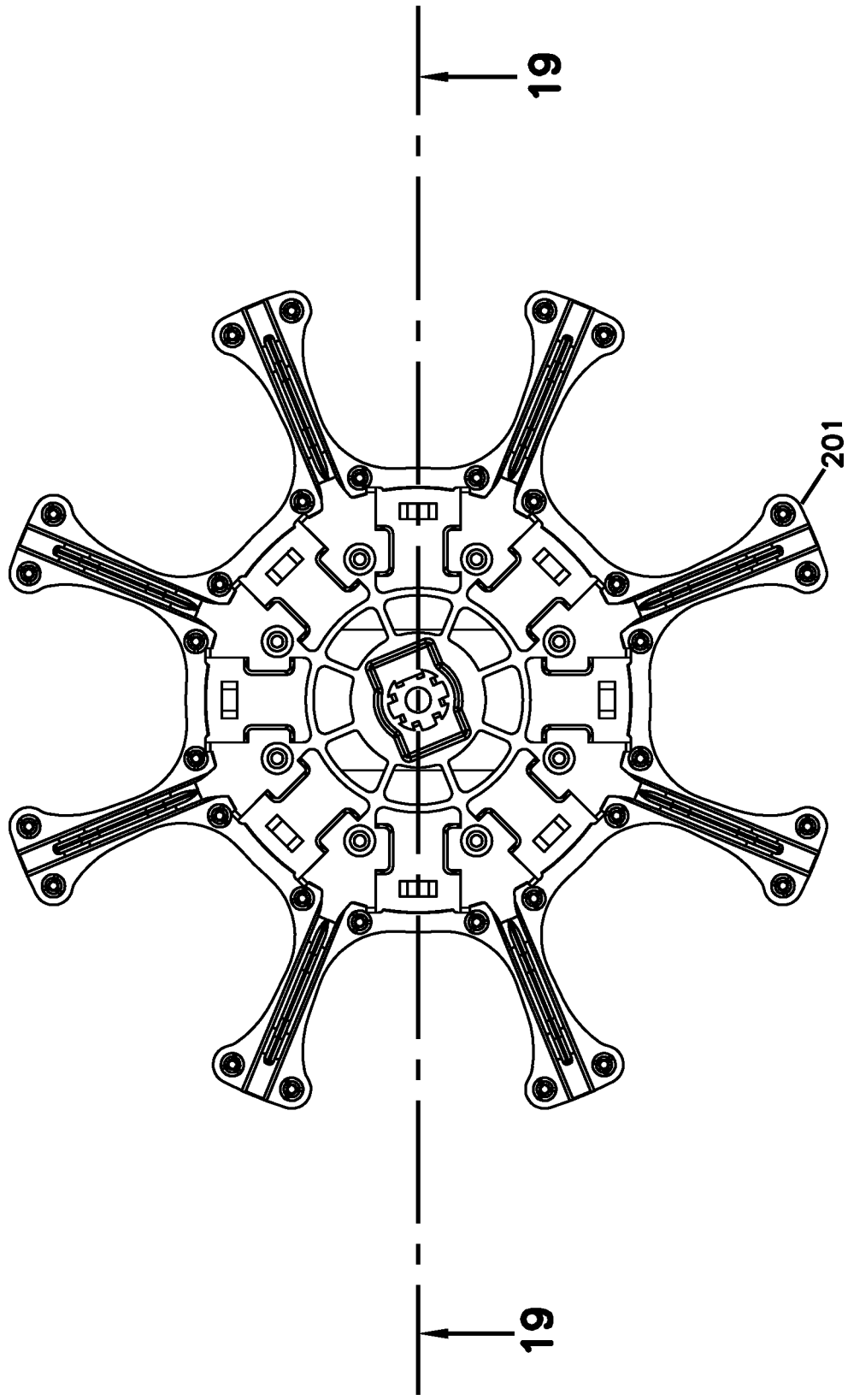
FIG. 18 is a top view of the actuator of FIG. 13.
Figure 19:
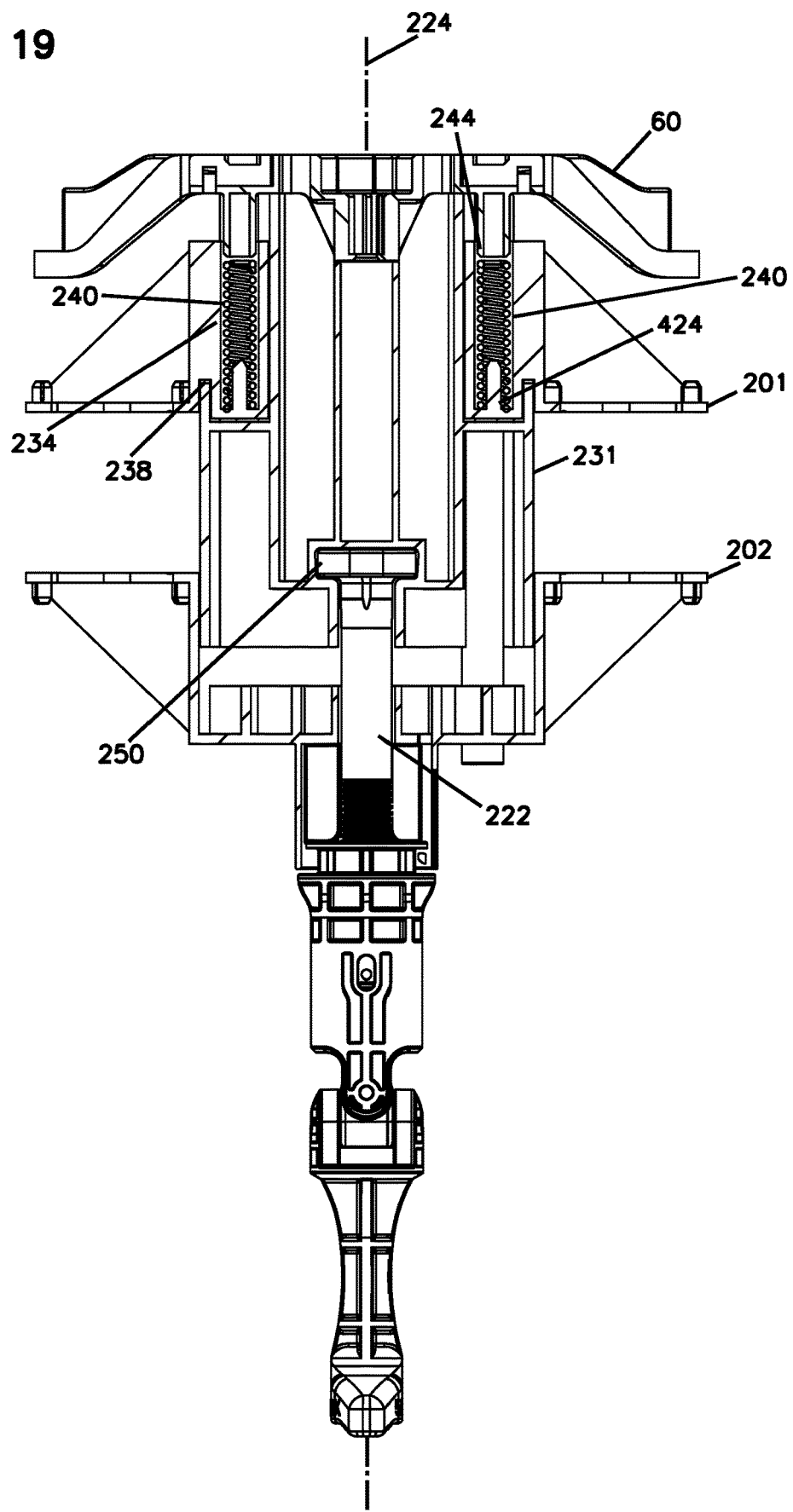
FIG. 19 is a cross-sectional view of the actuator of FIG. 13.
Figure 29:
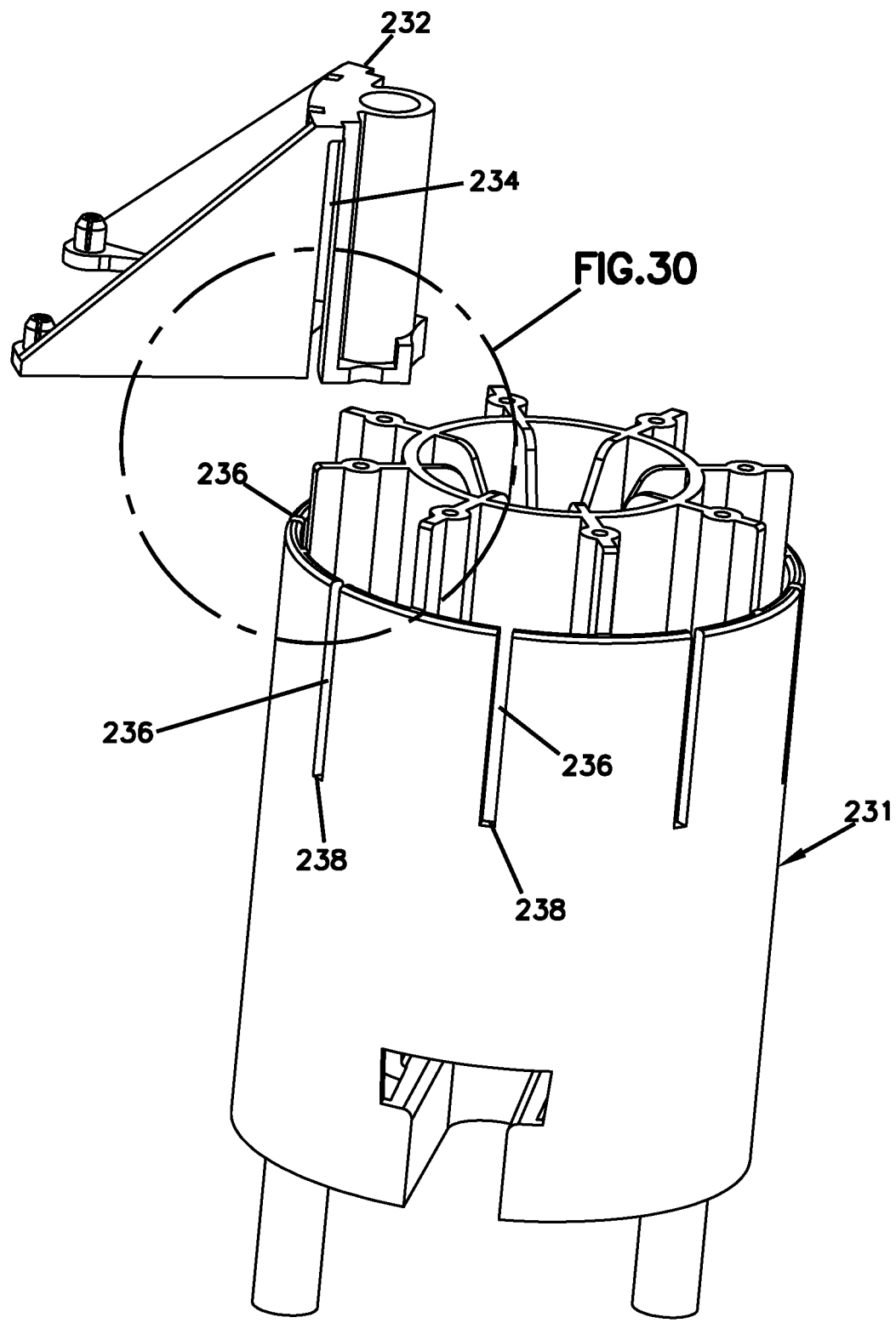
FIG. 29 illustrates how one of the pressurization structure sections mounts to a pressurization structure mount of a trigger of the gel sealing module of FIG. 10.
Figure 30:
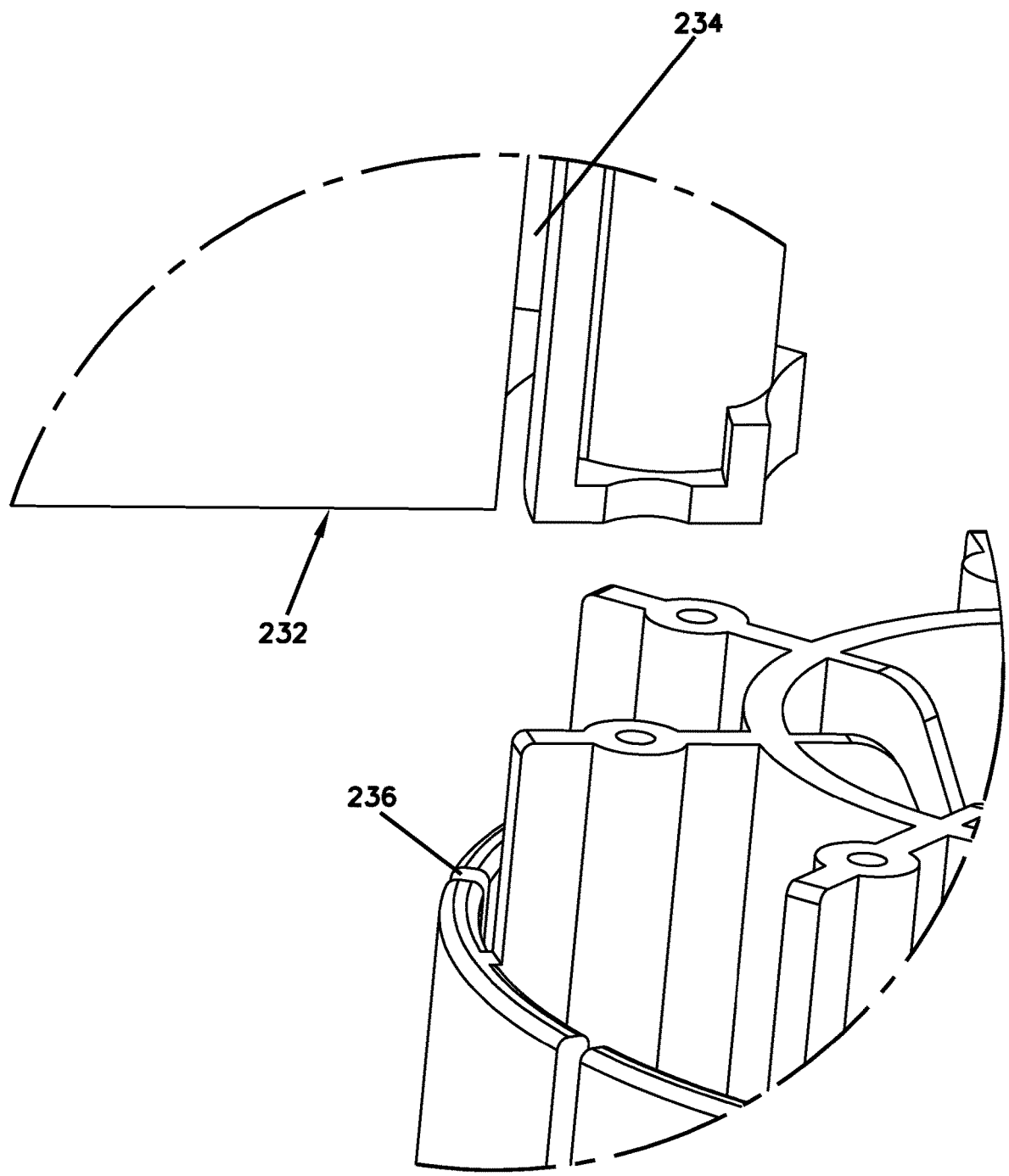
FIG. 30 is a more detailed view showing how the pressurization structure section mounts to the pressurization structure mount.

In certain examples, each of the gel sealing modules 90 can have a truncated wedge shape. FIGS. 6 and 7 show one of the gel sealing modules 90 having the truncated wedge shape. The depicted gel sealing module 90 includes first and second opposite sides 702, 704 that converge as the first and second opposite sides 702, 704 extend from a major end 706 to a minor end 708 of the main body of the gel sealing module 90. The minor end 706 has a concave curvature and the major end 708 has a convex curvature. When the gel sealing modules 90 are assembled together to form the gel sealing block 40, the opposite sides 702, 704 of adjacent gel sealing modules 90 seal relative to one another. Additionally, the major ends 706 cooperate to define the radially outwardly facing gel surface 41 that seals against the radially inwardly facing surface 43 of the gel-block mounting sleeve 44. The minor ends 708 cooperate to define a radially inwardly facing surface adapted to seal against a component of the gel sealing unit (e.g., an outer circumferential surface of a structure such as the mounting sleeve 231 shown at FIGS. 19 and 29.)

In certain examples, the gel sealing modules 90 can be individually and separately removable from between inner and outer pressurization structures 201, 202 of the actuator 42. Preferably at least a plurality of the removable gel sealing modules 90 include cable sealing modules each defining at least one cable port 203. In one example, at least some of the gel sealing modules 90 include at least first and second gel portions 204, 206 (e.g., volumes of gel) that meet at a separable interface 208 at which at least one cable port 203 is defined. The first and second gel portions 204, 206 are capable of being separated from one another when the cable sealing module 90 is not mounted between the inner and outer pressurization structures 201, 202 to allow a cable to be laterally inserted into the cable port 203 (i.e., the gel sealing modules can have a wrap-around design). The gel sealing module 90 can also include end caps 209 between which an axis 210 the cable port 203 extends. The end caps 209 can function to provide gel containment when the gel block is pressurized during sealing. The end cap can include flexible fingers 212 at the cable ports 203 to provide gel containment around a cable and to allow the end caps to accommodate cables having a range of different diameters. The fingers 212 can flex open to accommodate a cable in the cable port 203. The end caps 209 can include first end cap portions 209a attached to opposite ends of the first gel portion 204 and second end cap portions 209b attached to opposite ends of the second gel portion 206. The first and second end cap portions 209a, 209b are carried with their respective first and second gel portions 204, 206 when the gel portions 204, 206 are separated from one another. Thus, the first and second end cap portions 209a, 209b separate from one another when the first and second gel portions 204, 206 are separated from one another. Used herein, "separated" means that at least portions can be moved apart from one. In the case where separate parts of a gel module are connected by a flexible means such as a living hinge, the separate parts can be separated from one another by flexing the living hinge and are the parts are considered separated from one another even though the parts are still connected by the living hinge.

In a preferred example, the end caps 209 include snap-fit structures for coupling in a snap-fit connection interface with the inner and outer pressurization structures 201, 202. In one example, the snap-fit structures include axially extending pins 214 (e.g., posts) with enlarged heads 216 that are received within snap-fit collars 218 carried with the inner and outer pressurization structures 201, 202. The pins 214 can be parallel to the cable port axis 210. In other examples, the collars 218 can be provided on the sealing modules and the pins 214 can be provided on the pressurization structure 201, 202. The collars 218 are configured to elastically flex open to receive the enlarged heads 216 and then snap back toward a closed position once the heads 216 have passed therein to provide a snap-fit coupling. The collars 218 can include internal pockets or receptacles for receiving the heads 216. The snap fit components are snapped together by motion in an axial direction (e.g., along the cable ports and a central axis of the actuator and the enclosure). In other examples, other types of snap-fit interfaces such as flexible latches, tabs, cantilevers, and the like can be used. The snap-fit configuration provide a means for the inner and outer pressurization structures 201, 202 to apply tension to the gel block 40 when the gel block is mounted in the actuator 42. When the inner and outer pressurization structures 201, 202 are forced apart from one another by a trigger arrangement of the actuator 42, tensile load is applied to the gel block 40 through the snap-fit interfaces. While snap-fit interface are preferred, other types of interfaces capable of transferring tensile load can also be used. For example, the end caps and the pressurization structures can have mating rails and channels that slide together (e.g., in a radial direction) or like structures.

Figure 81:
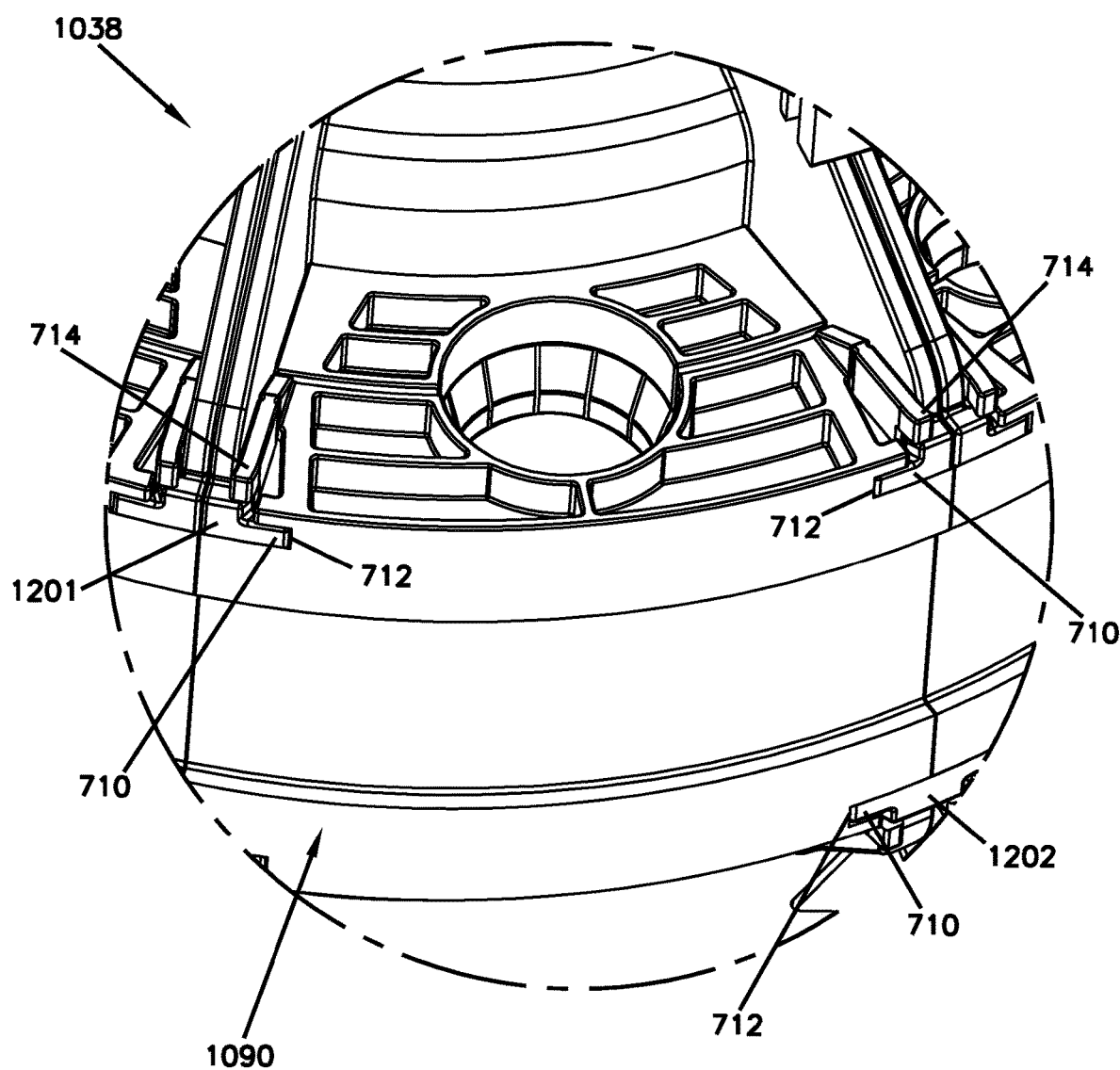
FIG. 81 shows a groove-and-rail configuration in accordance with the principles of the present disclosure for mounting a gel sealing module within a gel block.
Figure 82:
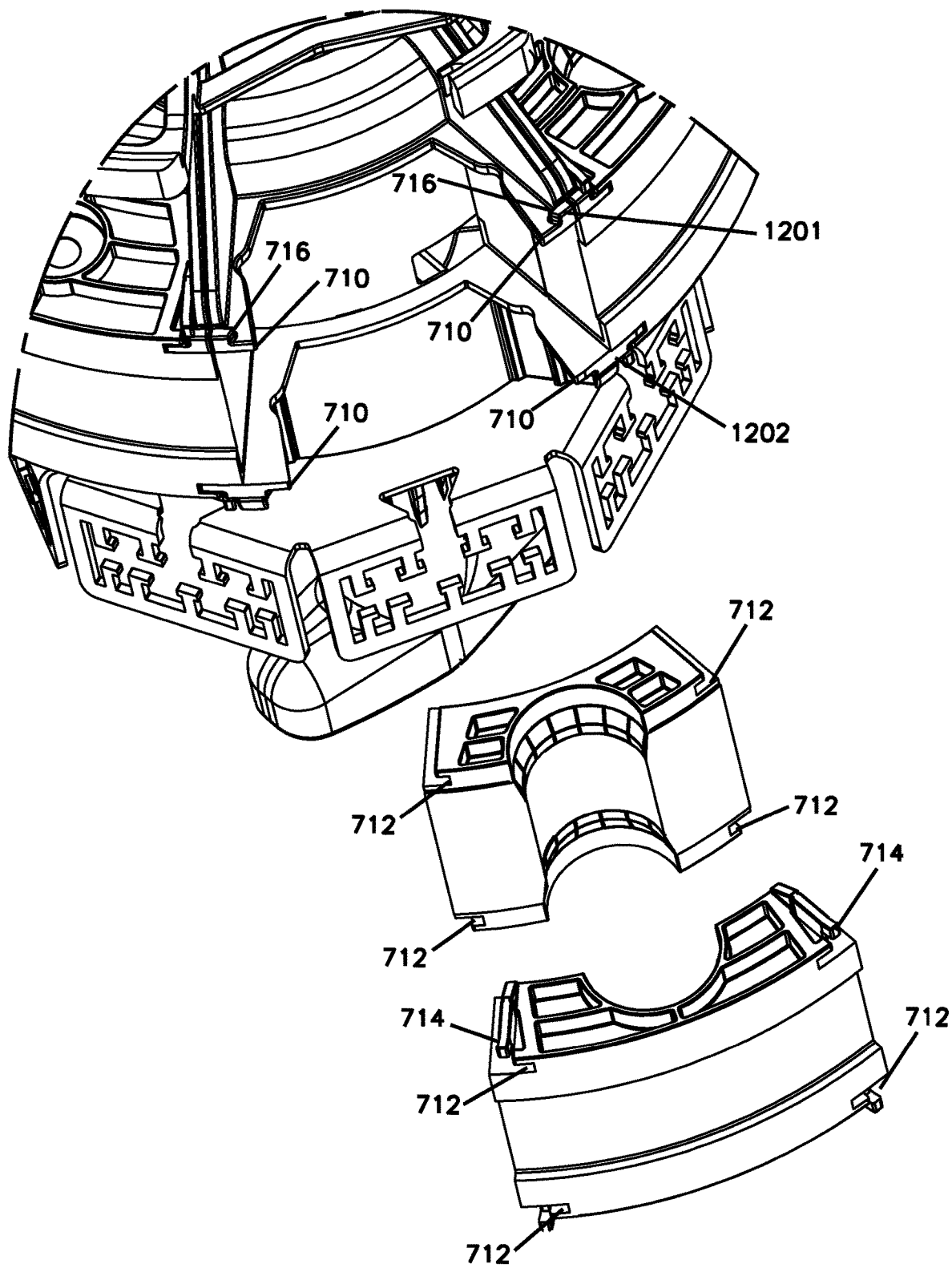
FIG. 82 shows the arrangement of FIG. 81 with one of the gel sealing modules removed from the gel sealing unit.
Figure 83:
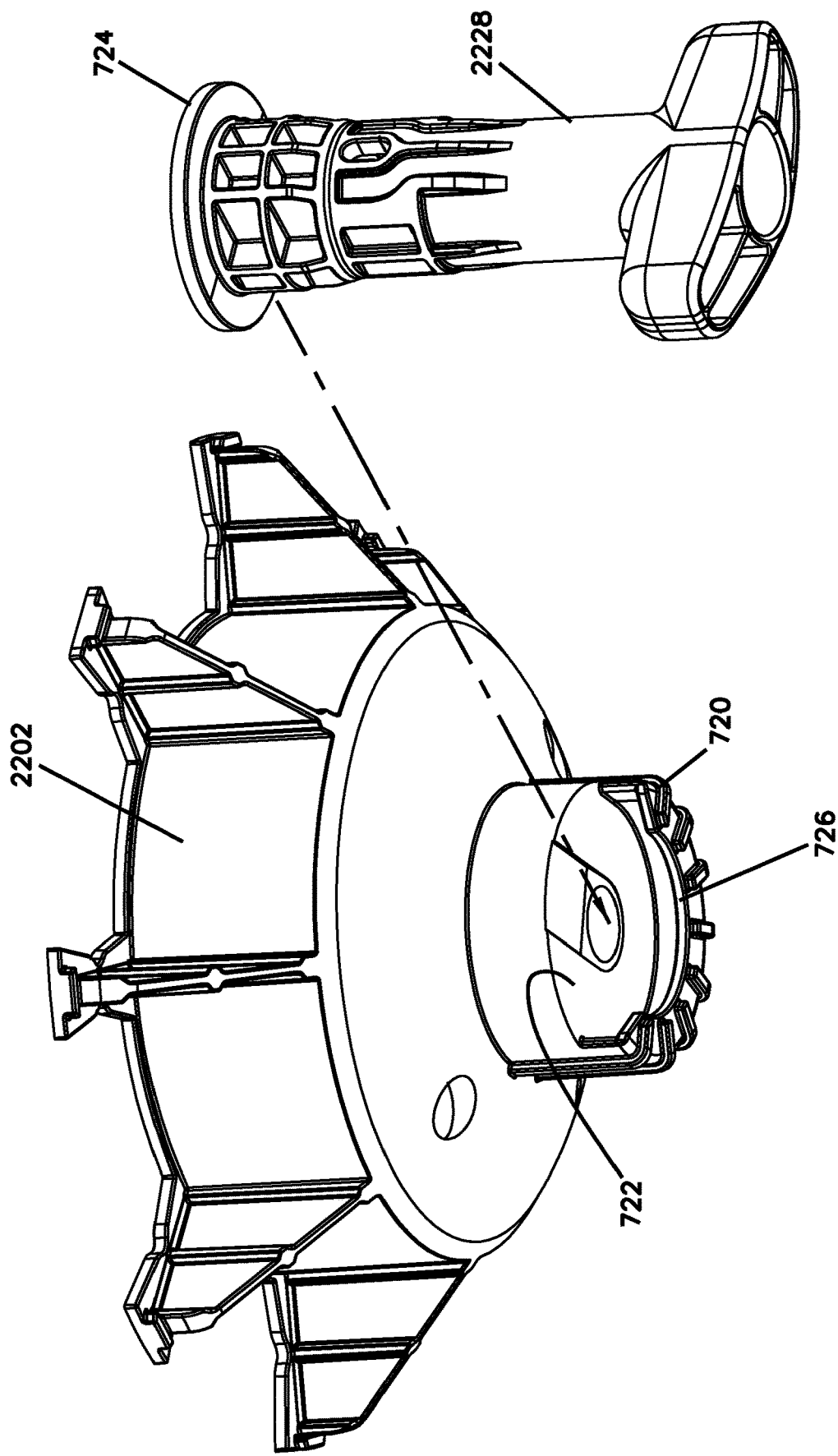
FIG. 83 shows an arrangement in accordance with the principles of the present disclosure for attaching an actuator handle to a pressurization structure.

FIGS. 81 and 82 show an alternative gel sealing unit 1038 having the same configuration as the gel sealing unit 38 except gel sealing modules are attached to the actuation structure by an interface arrangement including intermating rails and grooves capable of transferring tensile loads from the actuator to the gel sealing modules. As shown at FIGS. 81 and 82, the depicted gel sealing module 1090 includes end caps with rails 710 that fit within corresponding channels 712 defined by inner and outer pressurization structures 1201, 1202. The gel sealing modules 1090 are loaded between the pressurization structures 1201, 1202 by inserting the gel sealing modules 1090 inwardly in a radial direction toward a central axis of the gel sealing unit 1038. The rails 710 and the channels 712 slide relative to one another as the gel sealing modules 1090 are loaded between the pressurization structures 1201, 1202. Each of the gel sealing modules 1090 also includes two flexible latches 714 for preventing the gel sealing modules 1090 from being radially withdrawn from between the pressurization structures 1201, 1202. In certain examples, the flexible latches 714 are integrally formed with end caps of the gel sealing modules 1090. In certain examples, the flexible latches 714 have a cantilevered configuration. In certain examples, the flexible latches 714 are integrated with the end caps of the gel sealing modules 1090 that are positioned adjacent to the inner pressurization structure 1201. The inner pressurization structure 1201 can include catches 716 adjacent the outer perimeter of the inner pressurization structure 1201 that are adapted to engage with the flexible latches 714 when the gel sealing modules 1090 are fully inserted into the gel sealing unit 1038. In other examples, the flexible latches can be provided at the end caps corresponding to the outer pressurization structure 1202 and the outer pressurization structure 1202 can include corresponding catches. By flexing the flexible latches 714 toward one another, the flexible latches 714 can disengage from their corresponding catches 716 to allow the gel sealing modules 1090 to be removed from the gel sealing unit. In certain examples, the flexible latches 714 include outward projections that can be grasped between a technicians thumb and forefinger to allow the flexible latches 714 to be pressed together. In certain examples, the flexible latches 714 are located at the major ends of the gel sealing modules adjacent to the opposite sides of the gel sealing modules. Preferably, the latches of a given one of the gel sealing modules can be manually pressed toward each other to disengage the latches 714 from the catches 716.

In use of the gel sealing unit, gel sealing modules are selected to populate the gel block based on the types and sizes of cables desired to be routed into the enclosure through the gel block. When a cable of a particular type or size is identified for sealing, a gel sealing module compatible with the cable is selected and a cable anchoring unit compatible with the cable and the selected gel sealing module is also selected. The inside radial portion (e.g., gel portion 204) of the gel sealing module is then snapped into the actuator between the pressurization structures, which are in an open orientation in which the pressurization structures are axially far enough apart to allow for insertion of the inside radial portion. The cable is then attached to the selected cable anchor which is then secured to the anchoring bracket 60. An optical fiber or fibers of the cable can extend beyond the anchoring location and can be contained in a protective tube (e.g., a buffer tube of the cable, a furcation tube, etc.) that is routed to the tube holder adjacent the fiber manager. The tube terminates at the tube holder and the optical fiber(s) continues to the fiber manager where the fibers or fibers can be routed to trays of the fiber manager. The bend radius limiters can be used to transition the optical fibers from the tubes that terminate at the tube holder to a routing path that extends up the tower of the fiber manager to a tray. Once the cable has been anchored to the bracket, the cable can be laid into the inside radial portion of the gel sealing module which already had been snapped between the pressurization structures. The outside radial portion (e.g., portion 206) of the gel sealing module is then snapped between the pressurization structures with the cable captured in a cable port defined between the inside and outside radial portions of the gel sealing module. This process is repeated until the full gel block 40 has been installed in the actuator 42. Thereafter, the telecommunications assembly 34 can be inserted into the base 26 through the outer end 30 of the base 26 and the bracket 60 is locked in the base to anchor the assembly 34 in a position where the gel sealing block 40 is in the base 26. The actuator 42 is then actuated to pressurize the gel block within the base 26 to provide cable sealing and peripheral sealing. To remove the assembly 34, the actuator is used to tension the gel block, the bracket 60 is unlocked from the base, and the assembly 34 is pulled out through the end 30 of the base 26.

Figure 20:
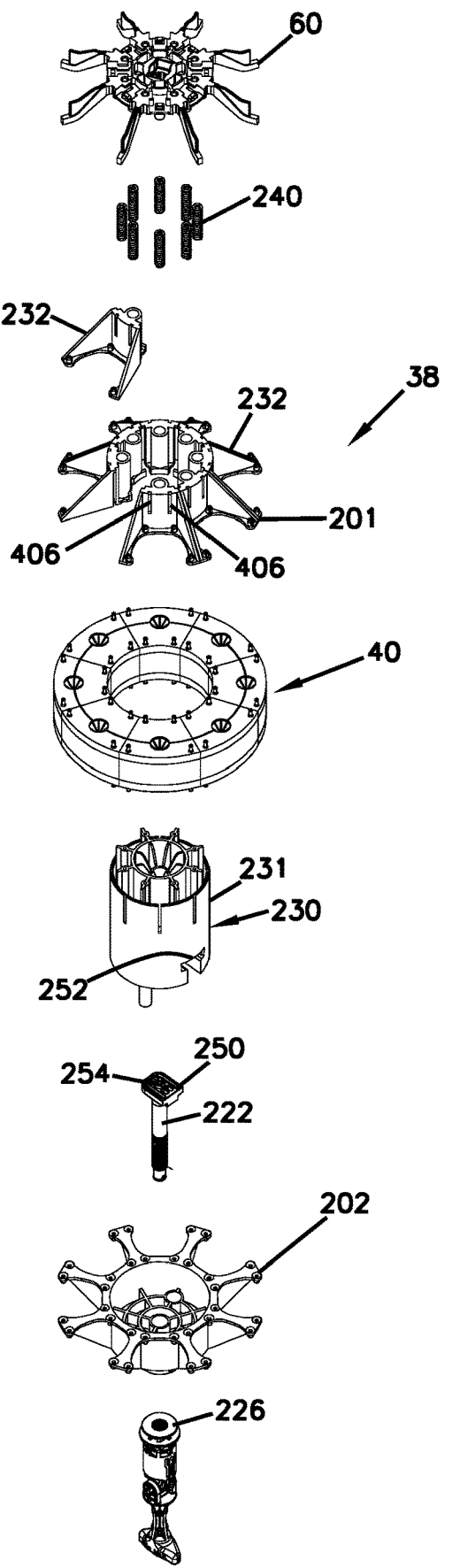
FIG. 20 is an exploded view of the gel sealing unit of FIG. 10.
Figure 21A:
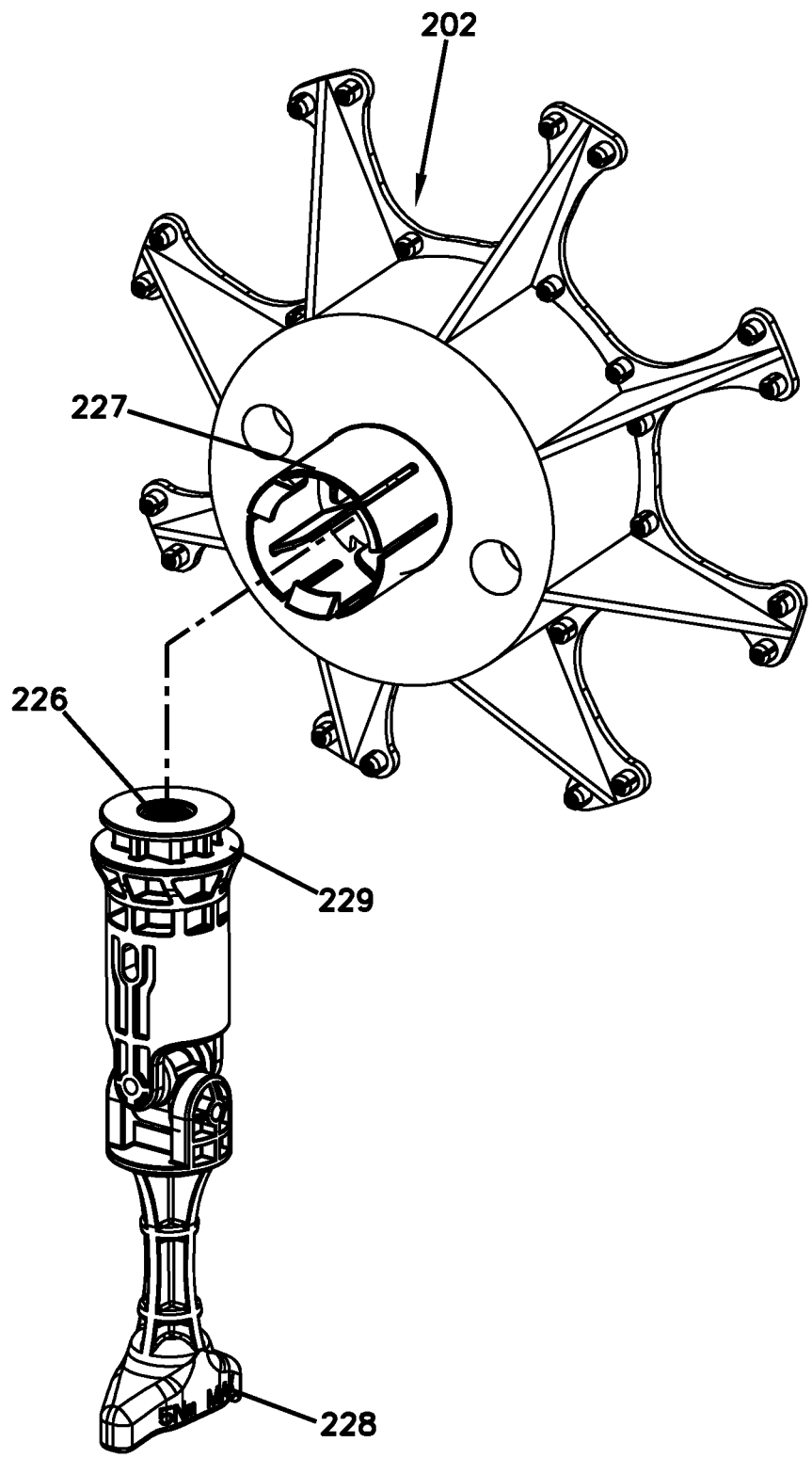
FIG. 21A illustrates how a handle portion of the gel sealing unit of FIG. 10 is coupled to an outer pressurization structure of the gel sealing unit of FIG. 10.
Figure 21B:
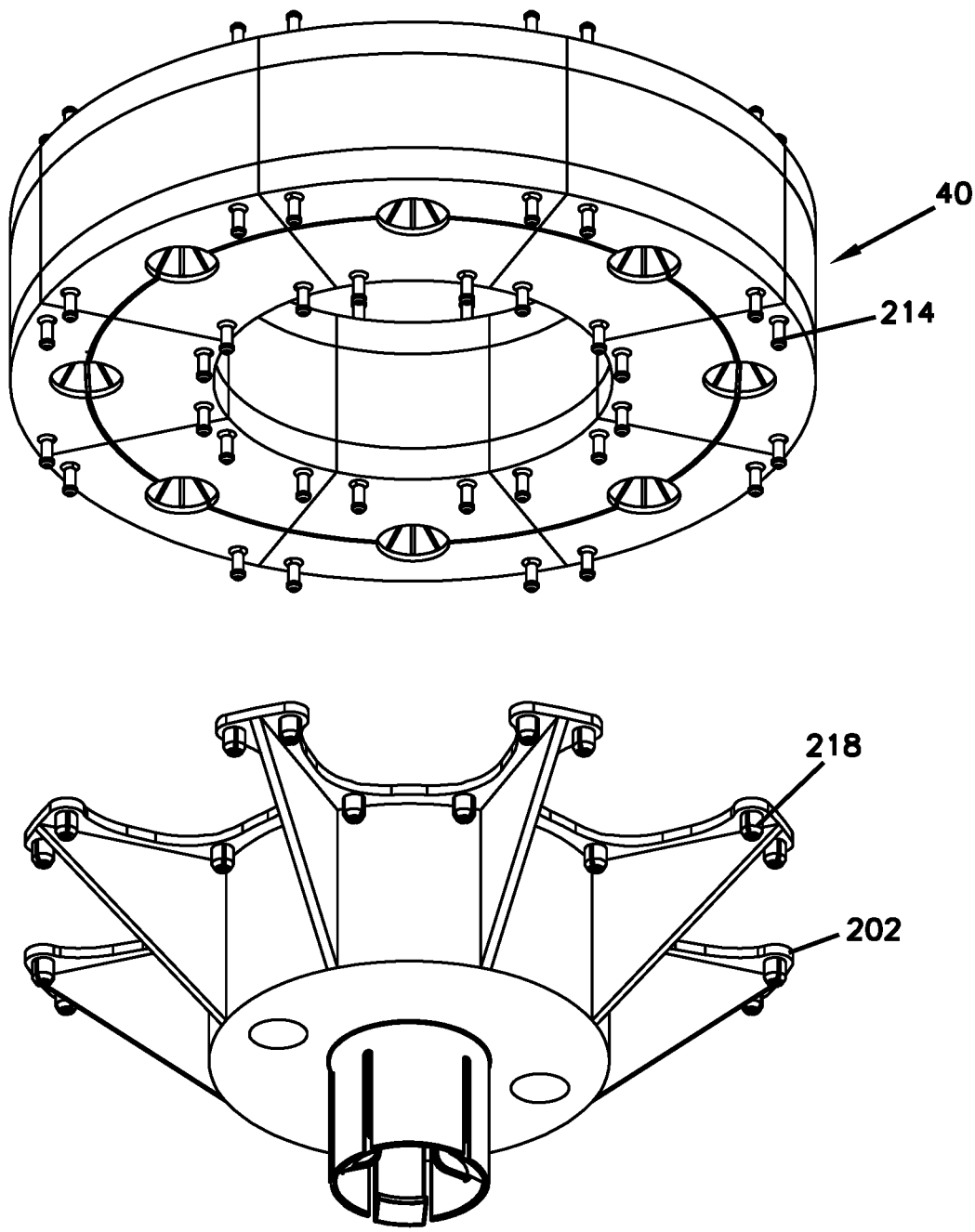
FIG. 21B illustrates how the cable sealing modules of the gel sealing block connect to the outer pressurization structure of the gel sealing module through snap-fit interfaces.
Figure 23:
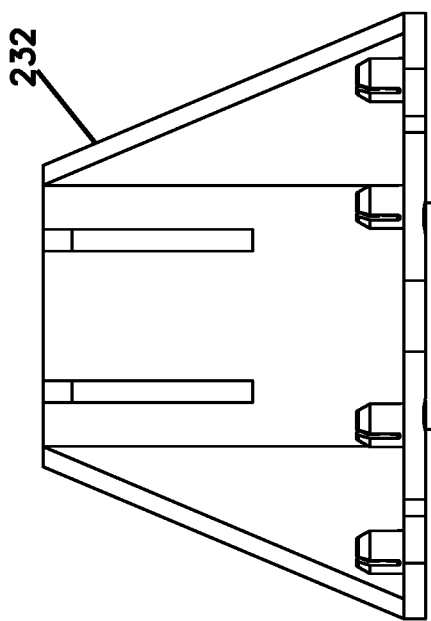
FIG. 23 shows pressurization structure section of FIG. 22 from an outer radial perspective.
Figure 22:
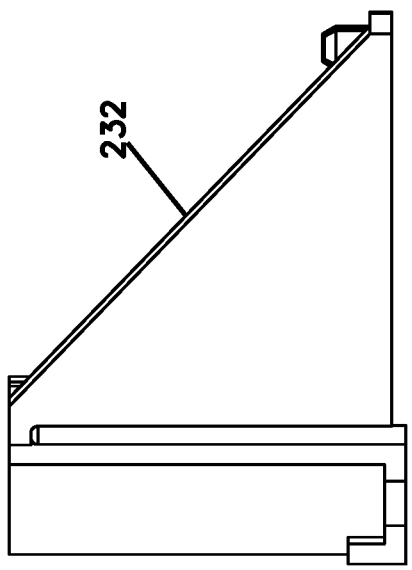
FIG. 22 is a side view of an individual section of an inner pressurization structure of the gel sealing unit of FIG. 10.
Figure 25:
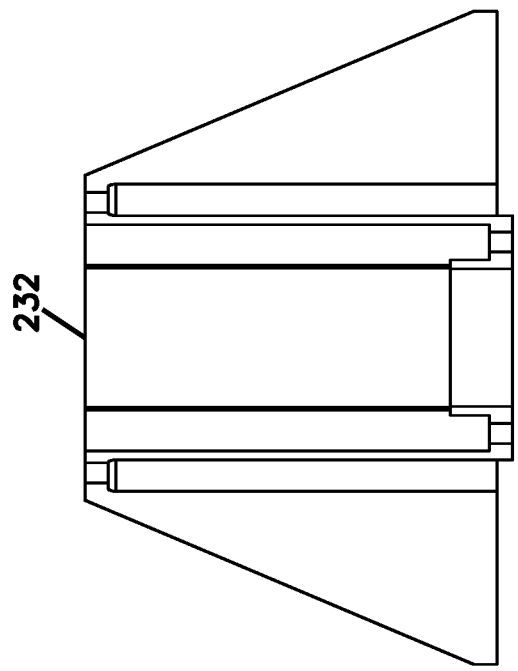
FIG. 25 shows the pressurization structures section of FIG. 22 from an inner radial perspective.
Figure 24:
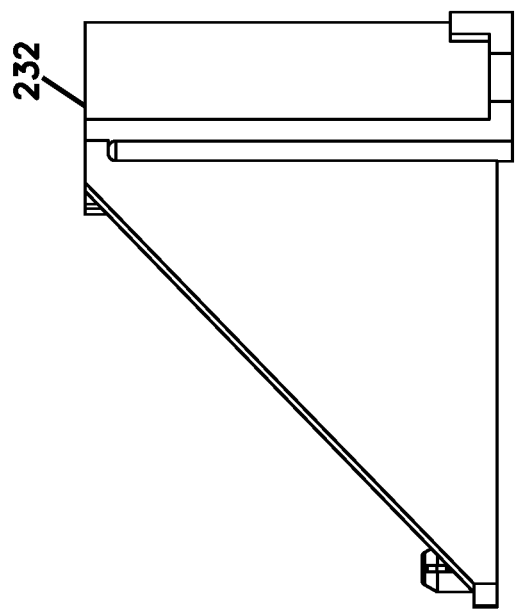
FIG. 24 is another side view of the pressurization structure section of FIG. 22.
Figure 26:
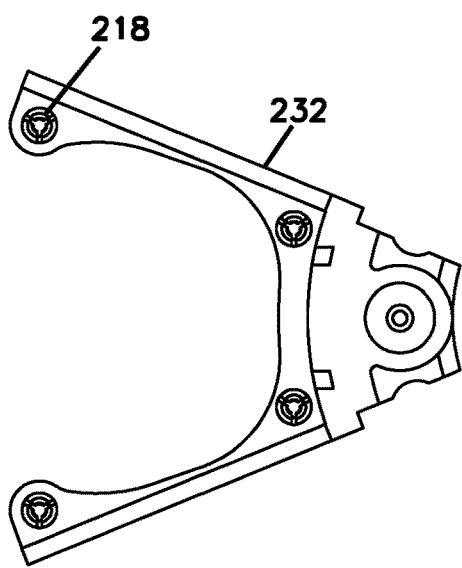
FIG. 26 is a top view of the pressurization structure section of FIG. 22.
Figure 27:
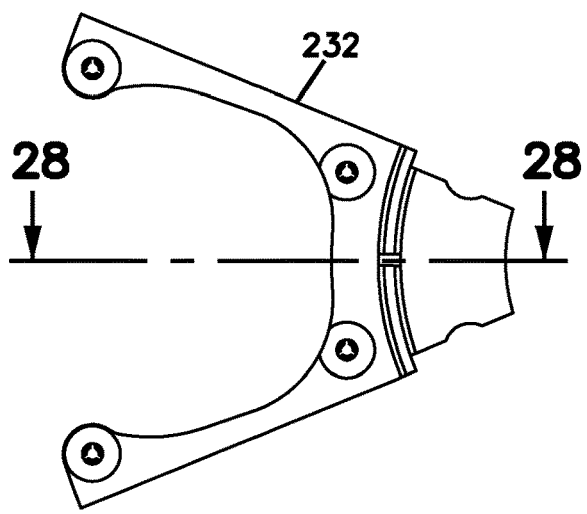
FIG. 27 is a bottom view of the pressurization structure section of FIG. 22.
Figure 28:
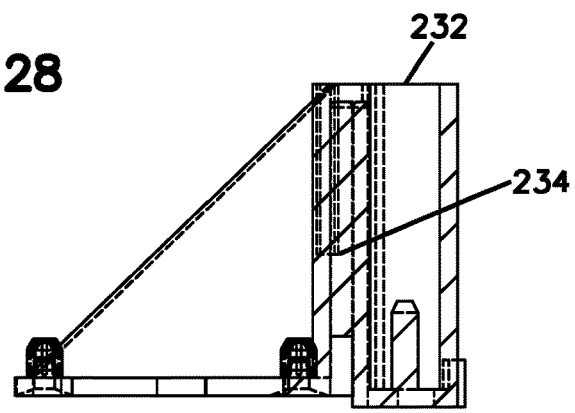
FIG. 28 is a cross-sectional view of the pressurization structure section of FIG. 22.

Referring to FIGS. 10-21B, the gel sealing unit 38 can include the gel sealing block 40 and the actuator 42 capable of applying compressive load to the gel sealing block 40 to provide or enhance sealing. The actuator includes the inner and outer pressurizations structures 201, 202 between which the gel sealing block 40 mounts. The pressurization structures 201, 202 can have a spoked configuration with radial arms on which the snap-fit collars 218 are positioned (see FIG. 21B). The actuator 42 includes a trigger arrangement 220 (see FIGS. 14-30) for transferring compressive load to the pressurization structures 201, 202. As best shown at FIG. 20, the trigger arrangement 220 includes a threaded first shaft 222 that extends along a first axis 224 along which the outer pressurization structure 202 can axially move to apply the compressive load to the gel sealing block 40. The trigger arrangement 220 includes a nut 226 threaded on the shaft 222. The nut 226 is rotatable about the first axis 224 relative to the outer pressurization structure 202 and is axially fixed relative to the outer pressurization structure 202. By axially fixed, it is generally meant that the parts that are axially fixed relative to one another are coupled or connected so as to generally move axially together as a unit. In one example, an outer annular grove 229 surrounding the nut 226 is snapped into a snap-fit sleeve 227 (see FIG. 21A) of the outer pressurization structure 202 to axially lock or fix the nut 226 in place relative to the outer pressurization structure while allowing the nut to turn/rotate relative to the outer pressurization structure 202. The nut 226 is integrated or coupled to a handle 228 for turning the nut 226 relative to the outer pressurization structure 202 and the threaded first shaft 222.

The trigger arrangement 220 also includes a pressurization structure mount 230 for mounting the inner pressurization structure 201. The mount 230 can include a mounting sleeve 231 having an outer circumferential surface against which a radially inwardly facing gel surface of the gel block 40 seals when pressurized. The inner pressurization structure 201 includes a plurality of separate pressurization sections 232 that are independently slidable relative to the mounting sleeve 231 along the first axis 224. The pressurization sections 232 can include webs 234 that slide within slots 236 at an upper end of the mounting sleeve 231. The slots 236 have closed lower ends 238 that engage the webs 234 function as positive stops when the trigger arrangement 220 is used to tension the gel block 40. The pressurization sections 232 each include two arms carrying collars 218 for snapping together with the upper pins 214 of the gel modules. The trigger arrangement 220 including separate springs 240 corresponding to each of the separate pressurization sections 232. The spring 240 are captured between first spring stops 242 on the pressurizations sections 232 and second spring stops 244 on the anchor bracket 60 (see FIG. 12). The anchor bracket 60 is fixed to a top end of the mounting sleeve 231 by fasteners or other means. The spring 240 fit within vertical bores 246 defined by the pressurization structures 232.

The threaded first shaft 222 has an upper end 250 that is axially and rotatably fixed relative to the mounting sleeve 231. In one example, the sleeve 231 defines a T-shaped slot 252 that receives a T-shaped flange 254 at the upper end 250 of the shaft 222. The flange 254 can snap within the slot 252. The gel sealing block 40 is coupled to the inner and outer pressurization structures 201, 202 by a coupling that allows the inner and outer pressurization structures to apply a tension load to the gel sealing block (e.g., the snap-fit interface described above or other type of interface). The gel sealing block 40 includes the plurality of individual gel sealing modules 90 that cooperate to define the gel block 40 with each gel sealing module 90 corresponding to one of the separate pressurization sections 232 of the inner pressurization structure 201.

When the nut 226 is threaded (e.g., via the handle 228) in a first rotational direction about threaded first shaft 222 the nut 226 and outer pressurization structure 202 move axially in a first direction along the threaded first shaft 222 toward the inner pressurization structure 201 causing the gel block 40 to be forced against the inner pressurization structure 201 and the inner pressurization structure 201 to be forced against the springs 240 causing the springs 240 to be compressed and spring compression load to be axially applied to the gel sealing block 40. Thus the gel block is spring pressurized and cause to flow/deform to fill any voids within the base and to effectively seal about any cables in the cable ports and to form an outer peripheral seal with the base 26 and an inner seal around the mounting sleeve 231. To de-pressurize the gel block 40, the nut 40 is threaded in a second rotational direction about the first shaft 222 the nut 226 and the outer pressurization structure 202 move axially in a second direction along the threaded first shaft 222 away from the inner pressurization structure 201 causing the gel block 40 and the inner pressurization structure 201 to be pulled away from springs 240 such that the spring decompress. Once the springs 240 have decompressed, the outer surface of the gel block 40 may still be strongly bonded to the inner surface of the base 26. To break or loosen this bond, the nut 226 can continue to be rotated on the shaft 222 in the second direction causing the inner pressurization structure to be pulled into engagement with a positive stop (e.g., the webs 234 of the inner pressurization structures contact the bottom ends of the slots 236) of the mounting sleeve 231 causing the inner and outer pressurization structure 201, 202 to be positively pulled apart as the outer pressurization structure 202 and the nut 226 continue to move in the second direction such that tension is applied to the gel sealing block through the snap-fit interface. Tensioning of the gel block can cause it to constrict thereby loosening adhesion with the base. The sealing unit 28 can then be removed from the base more easily.

Figure 31:
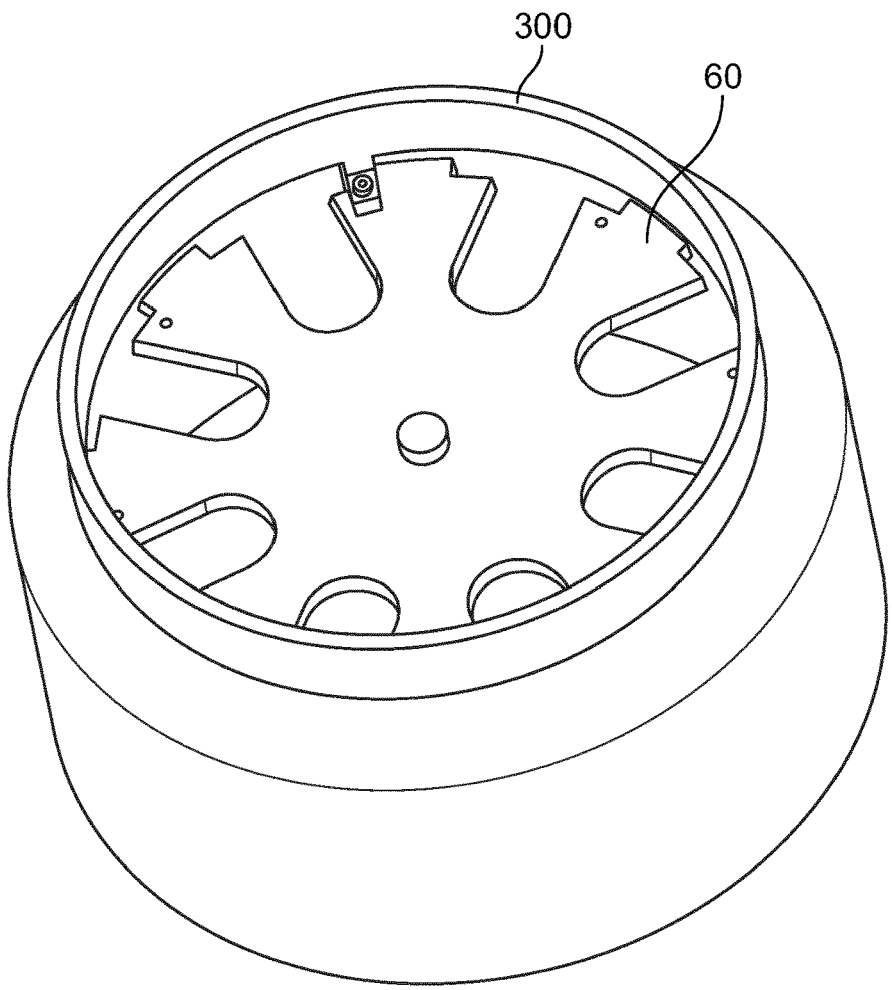
FIG. 31 shows a fastener being used to lock an anchoring bracket suitable for use with the sealing unit of FIG. 10 at a locked rotational position relative to the base.
Figure 32:
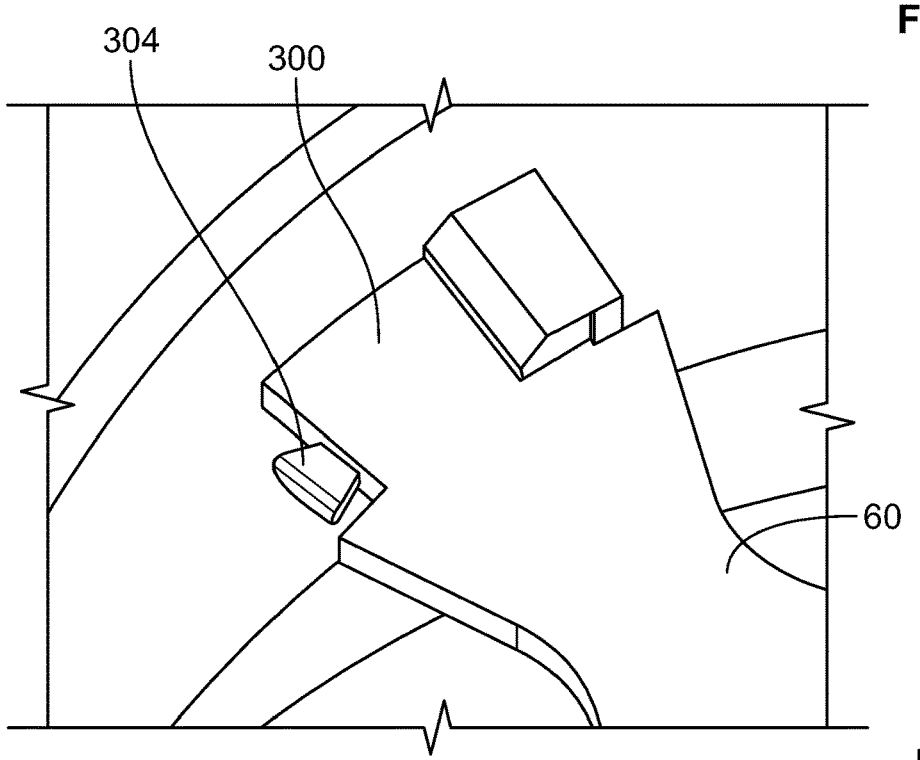
FIG. 32 shows a snap-fit configuration for locking the anchoring bracket in a rotational position relative to the base.
Figure 33:
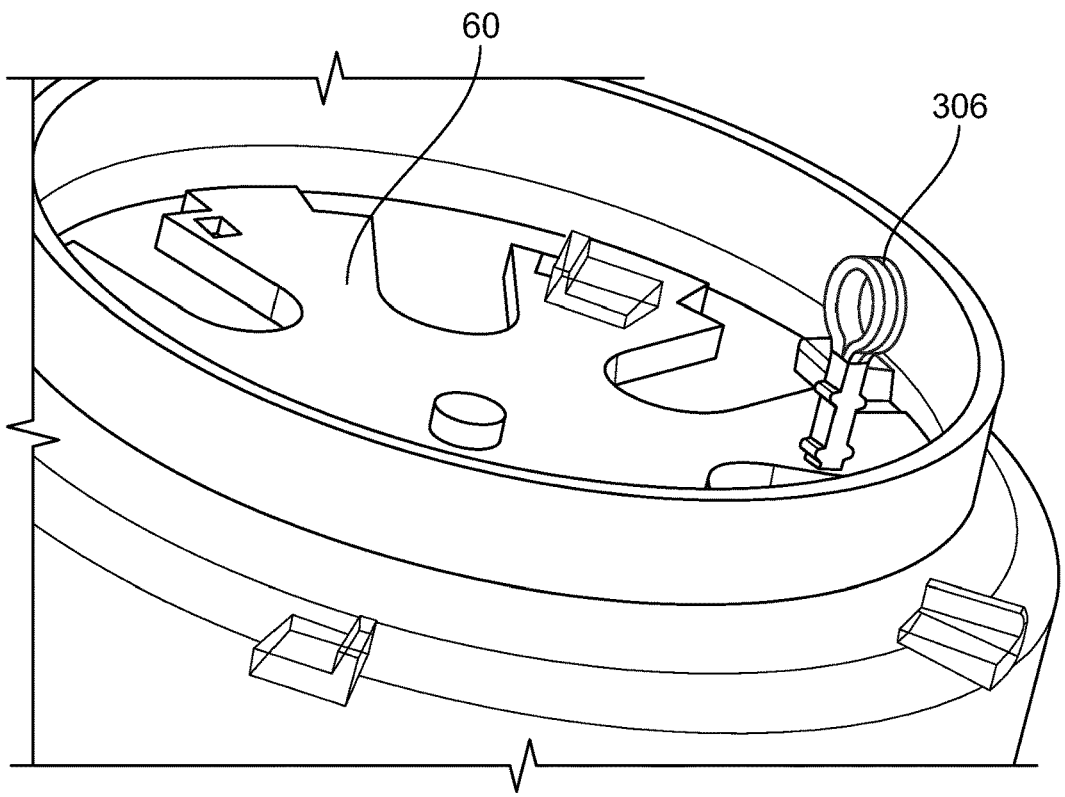
FIG. 33 shows a slide clip that is used to lock the anchoring bracket in a rotational position relative to the base.
Figure 34:
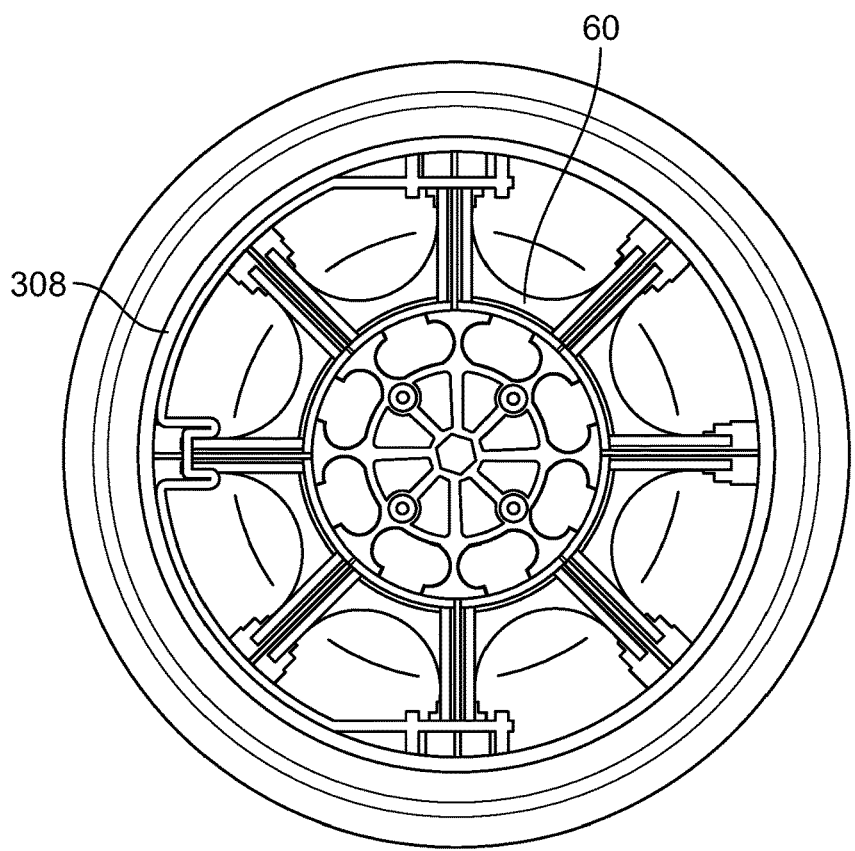
FIG. 34 depicts a slide element for locking the anchoring bracket in the base regardless of rotational orientation.
Figure 35:
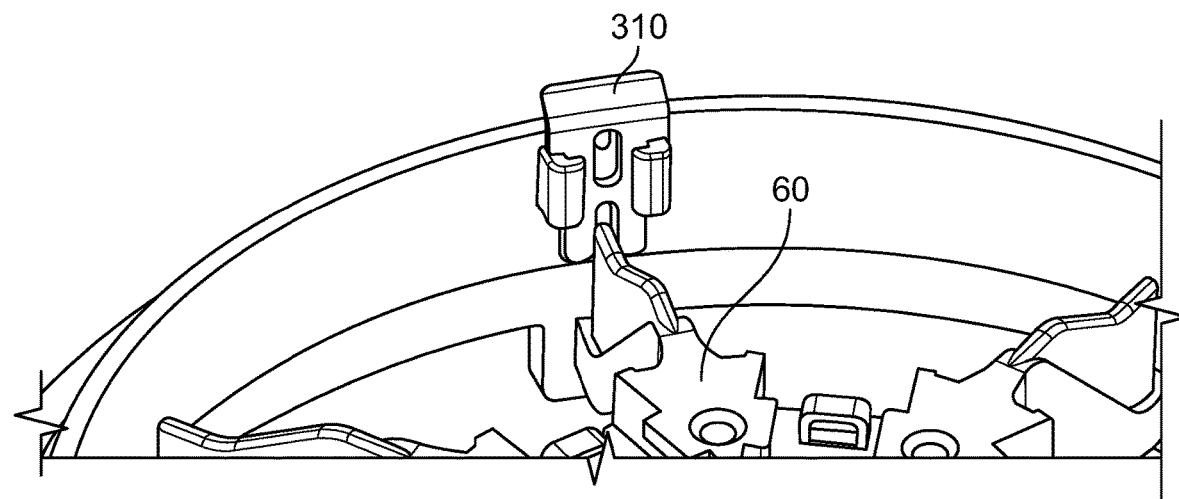
FIG. 35 illustrates another slide clip for locking an anchoring bracket within the base.
Figure 36:
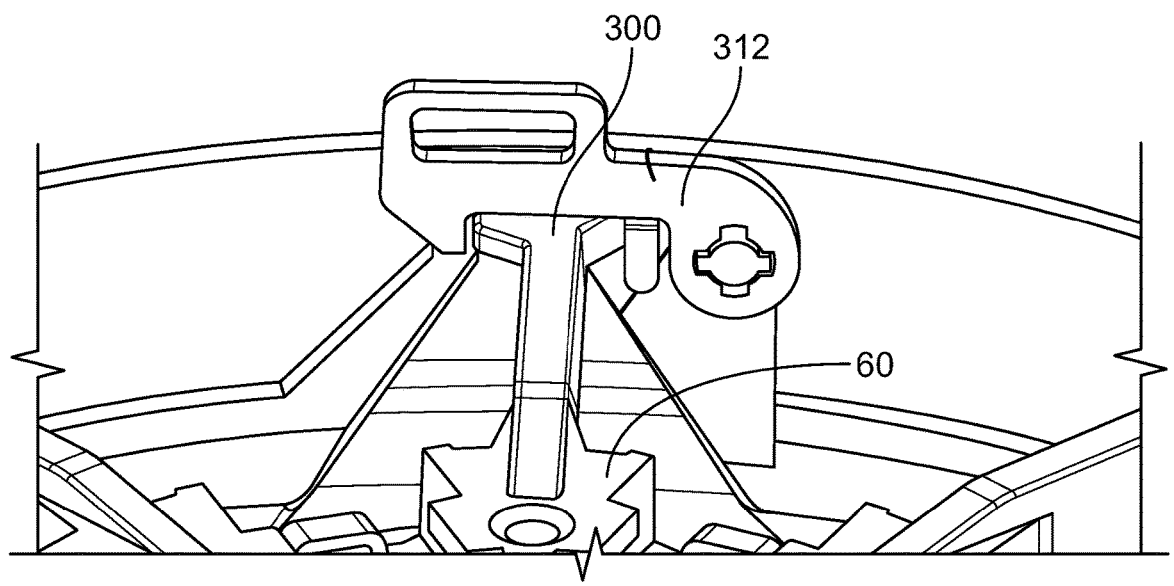
FIG. 36 illustrates a pivot latch for locking an anchoring bracket in a desired rotational position within the base.
Figure 37:
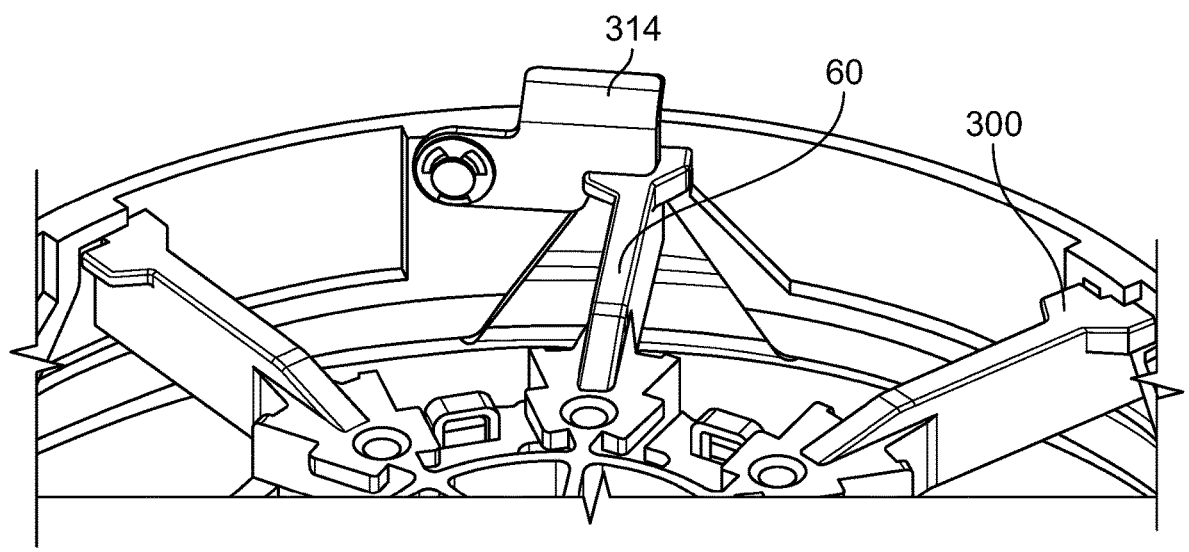
FIG. 37 illustrates another pivot latch for locking an anchoring bracket at a desired rotational position with the base.
Figure 38:
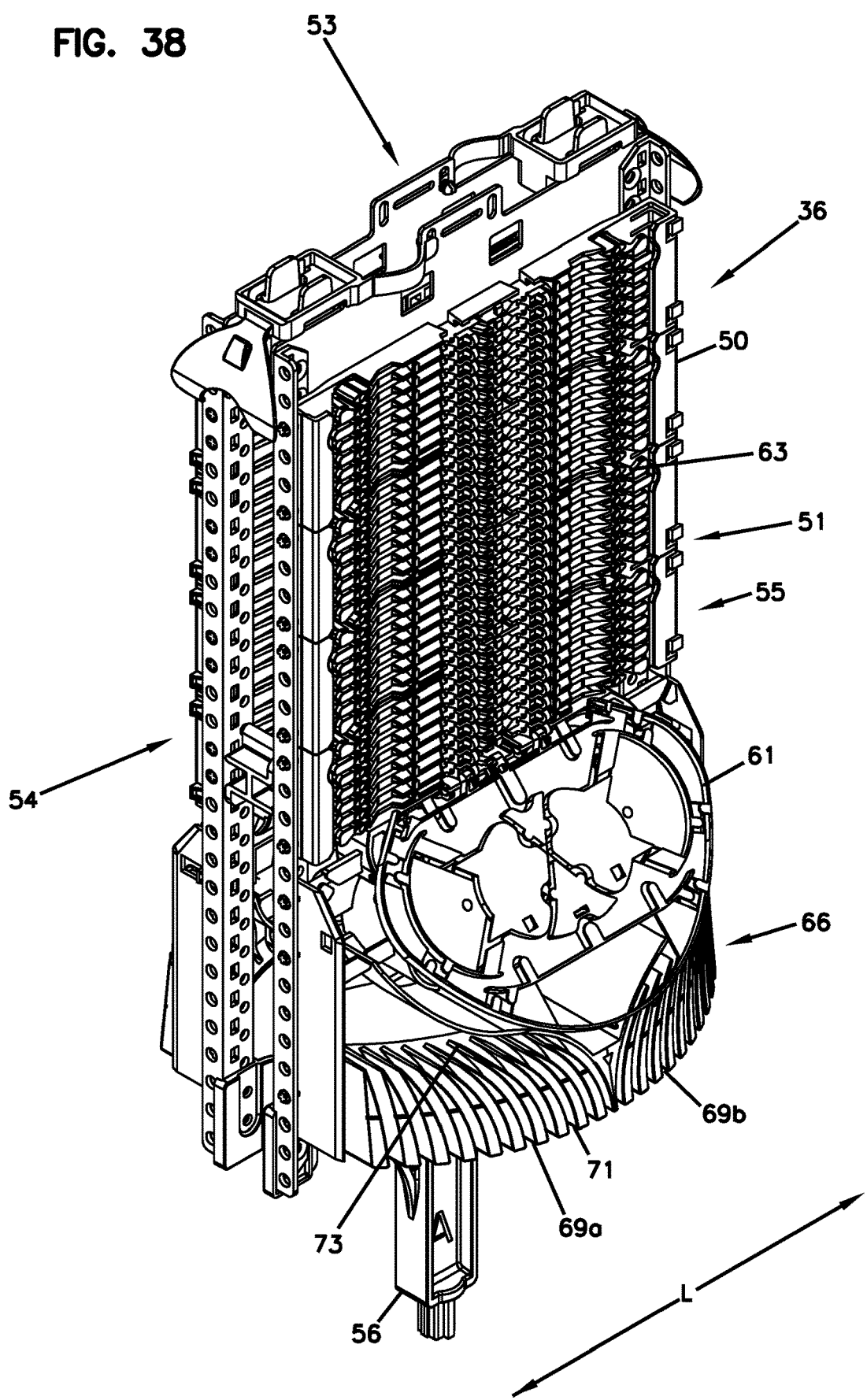
FIG. 38 is a perspective view of a fiber optic manager and tube mount suitable for use with the enclosure of FIG. 1.
Figure 39:
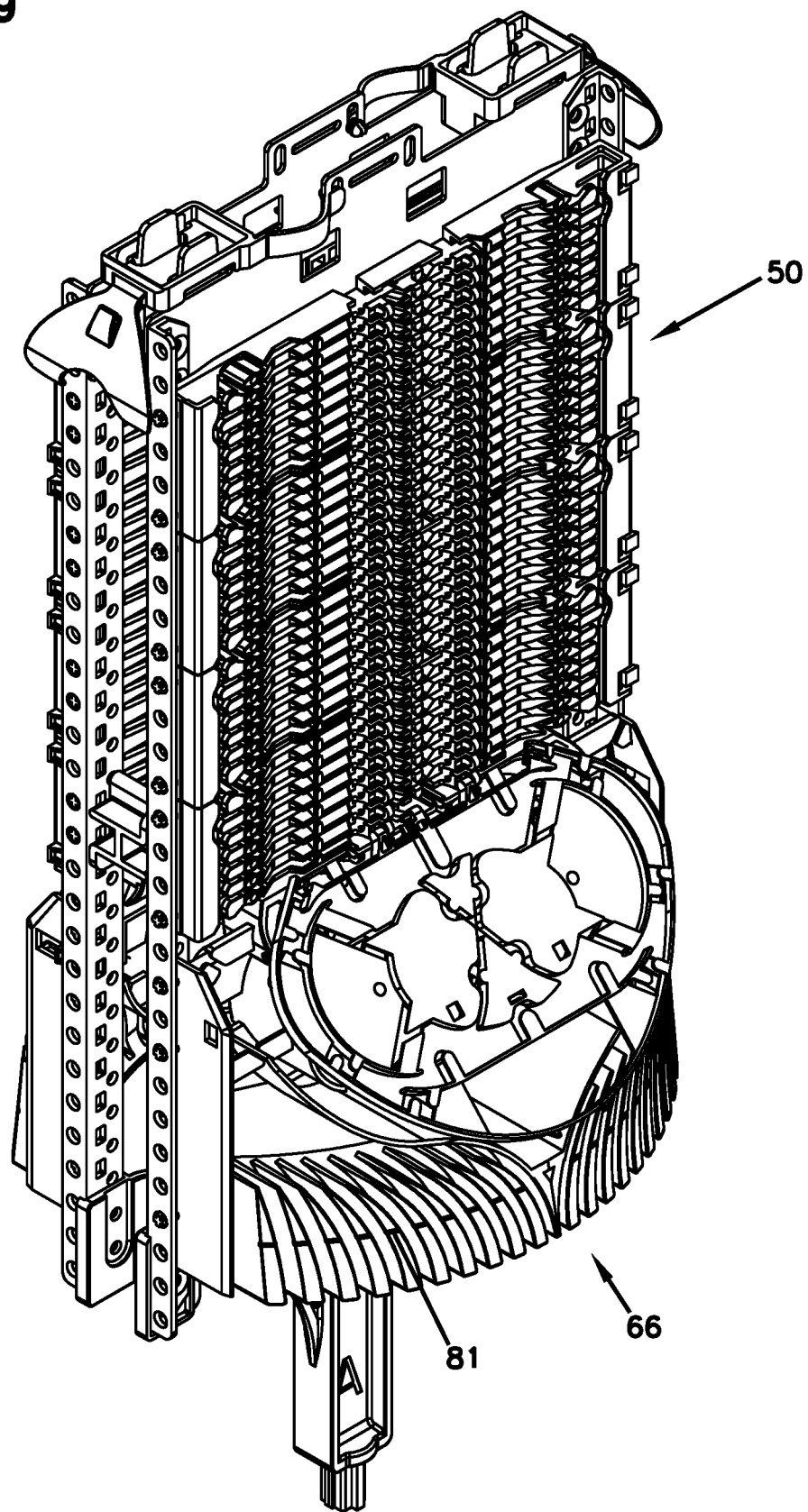
FIG. 39 is another perspective view of the fiber optic manager and tube mount of FIG. 38.
Figure 40:
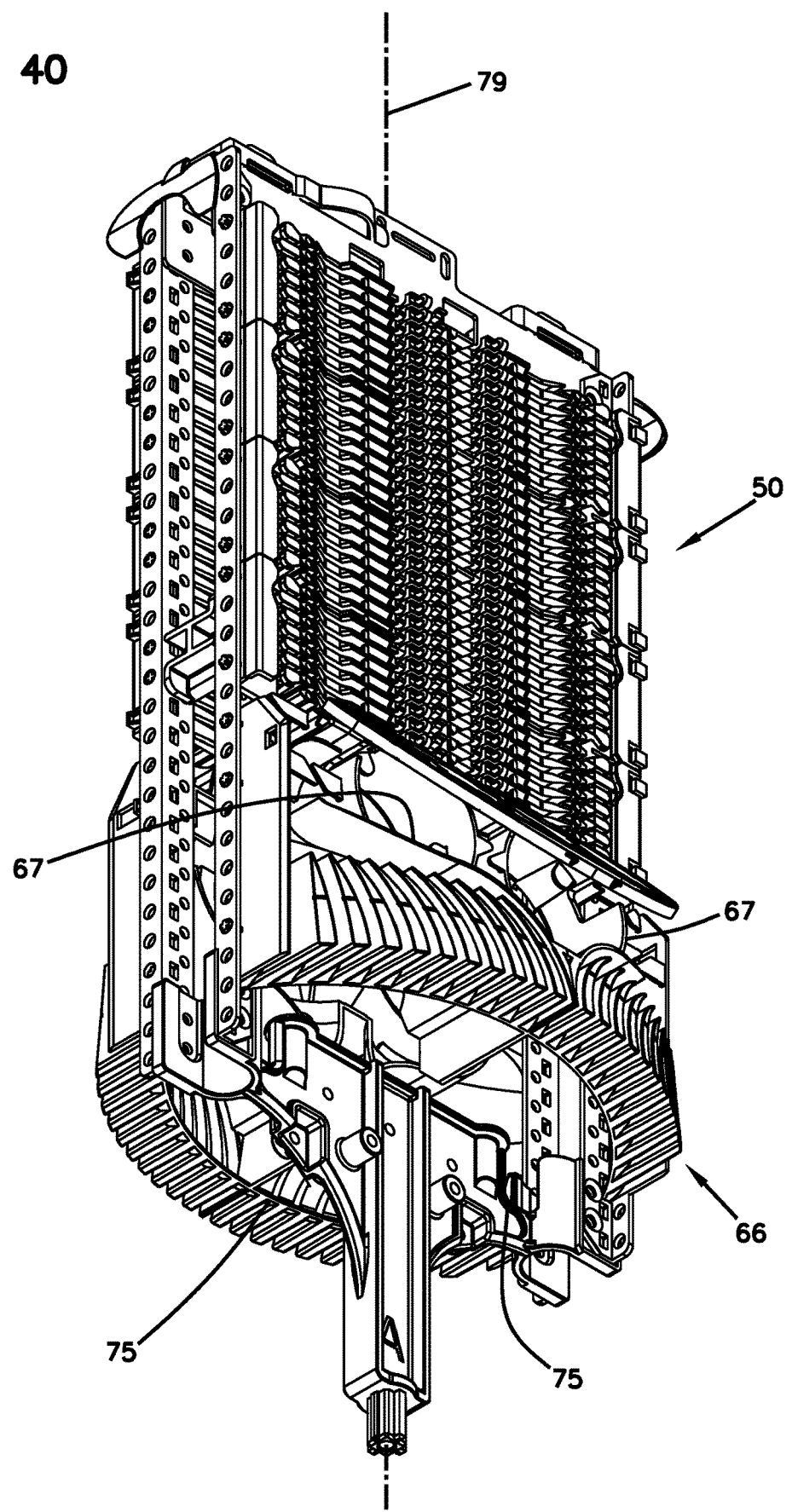
FIG. 40 is a further perspective view of the fiber optic manager and tube mount of FIG. 38.
Figure 41:
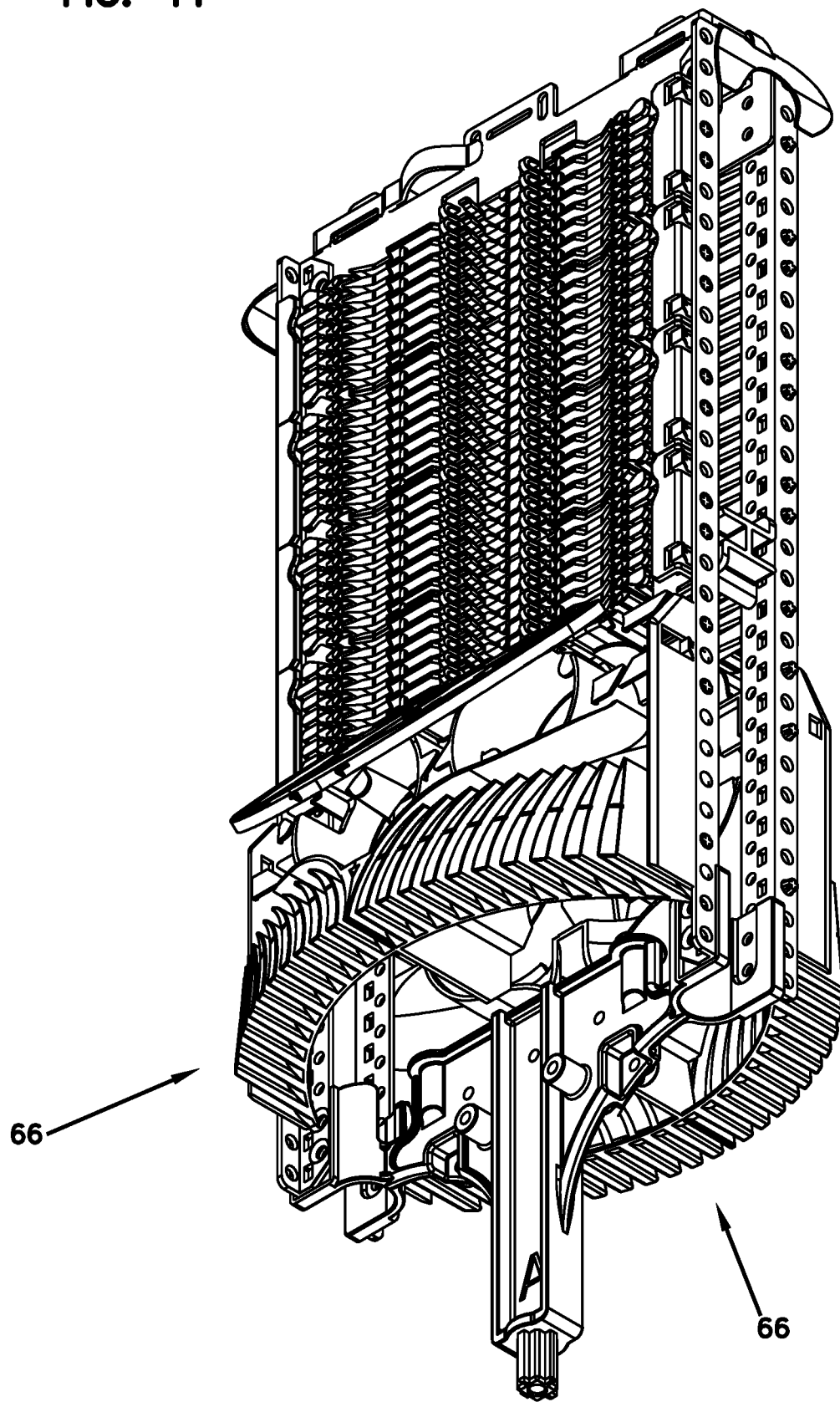
FIG. 41 is still another perspective view of the fiber optic manager and tube mount of FIG. 38.
Figure 42:
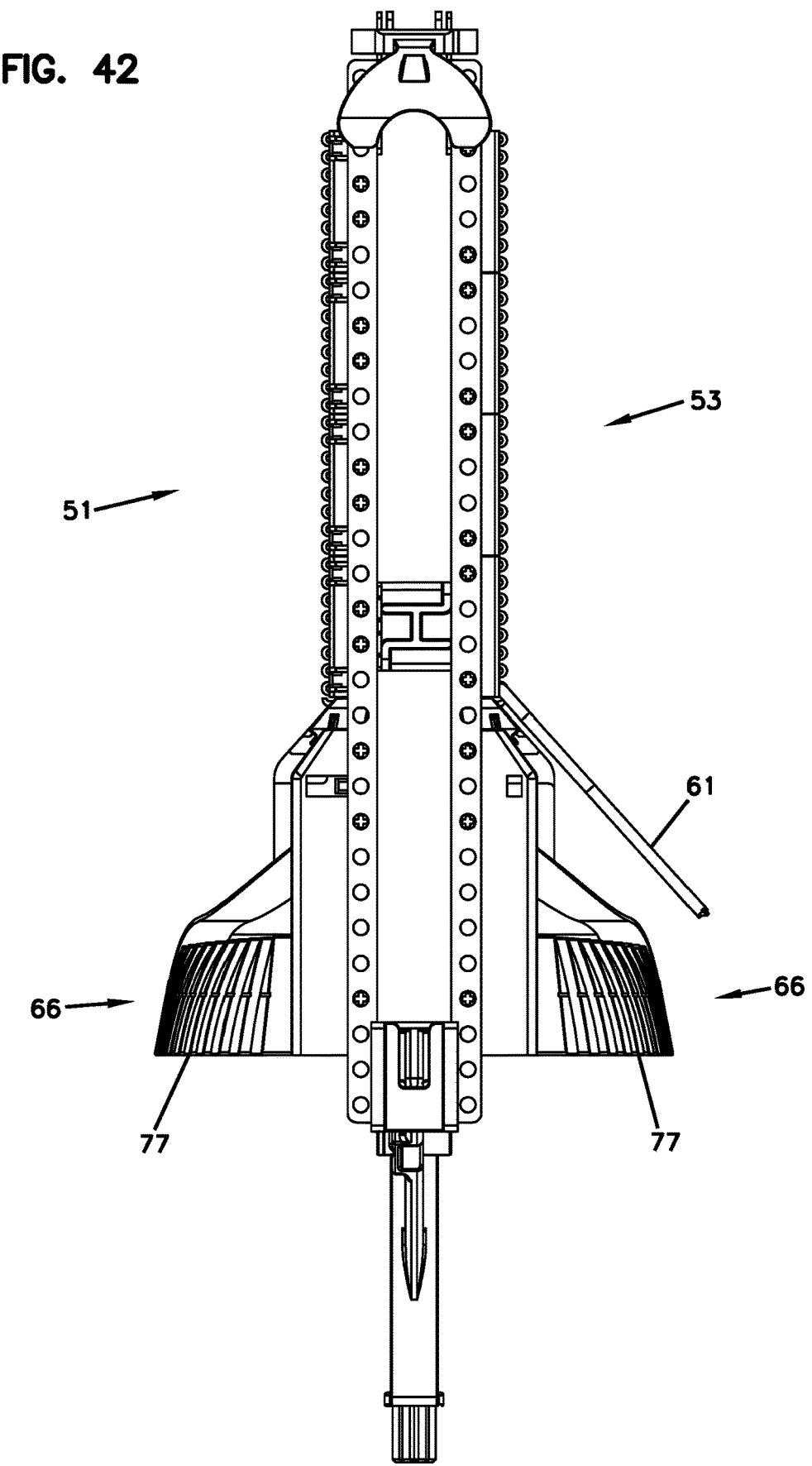
FIG. 42 is a side view of the fiber optic manager and tube mount of FIG. 38.
Figure 43:
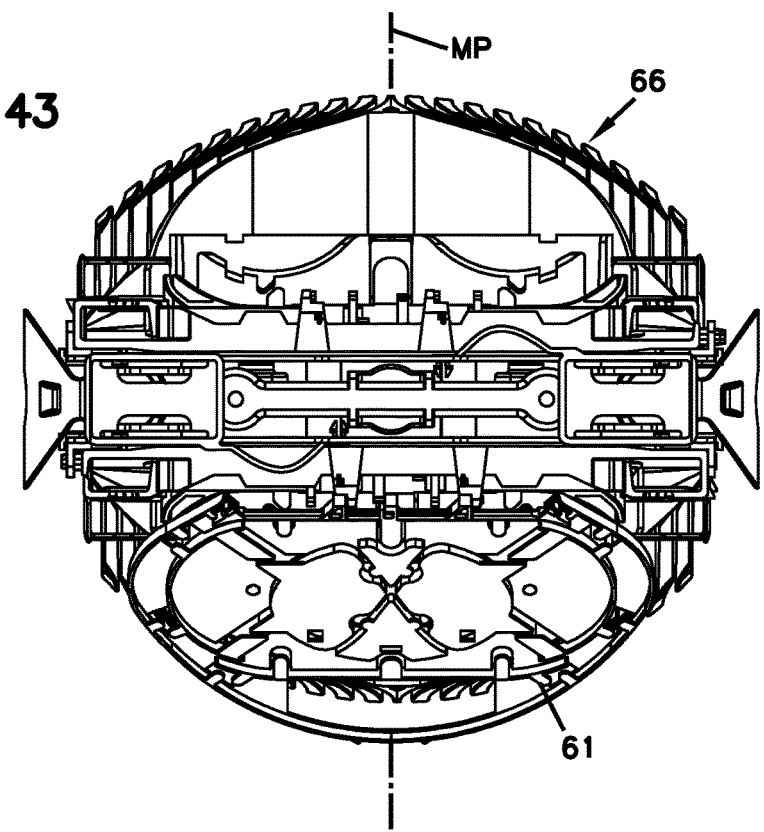
FIG. 43 is a top view of the fiber optic manager and tube mount of FIG. 38.
Figure 44:
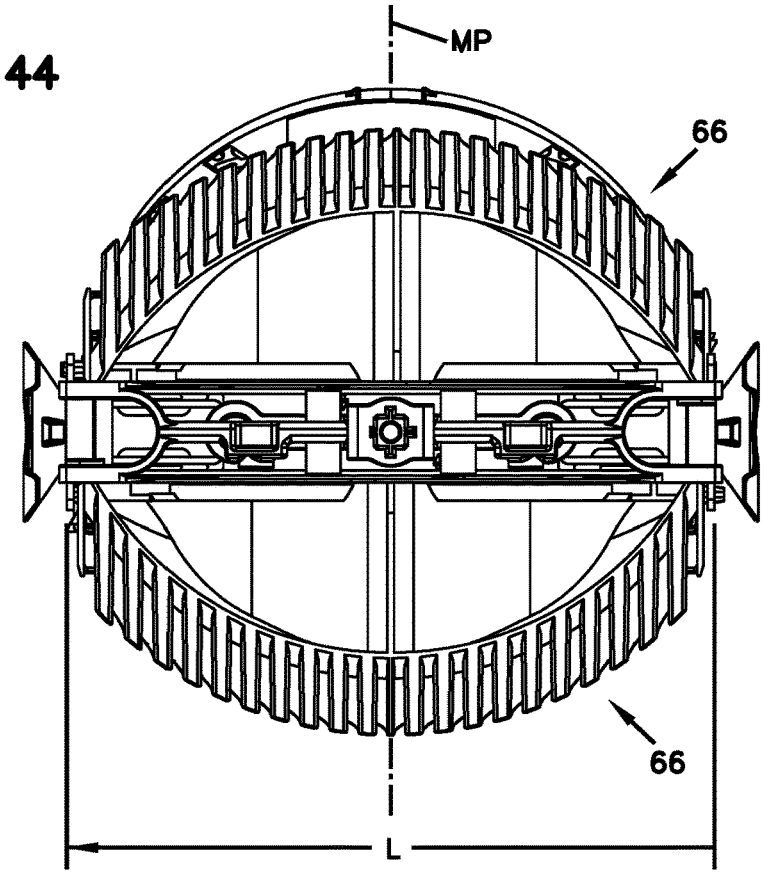
FIG. 44 is a bottom view of the fiber optic manager and tube mount of FIG. 38.
Figure 45:
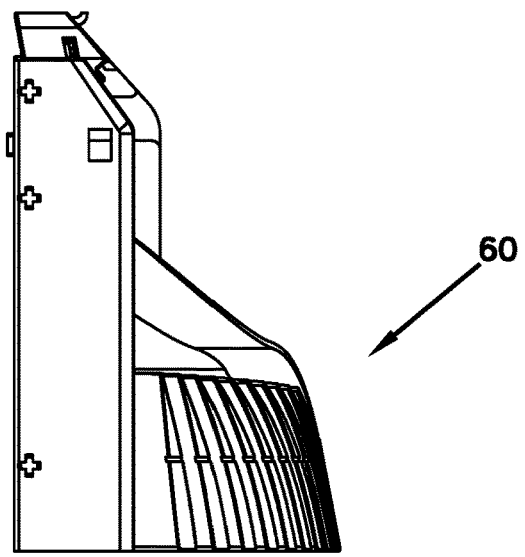
FIG. 45 is a side view of a tube mounting piece of the fiber optic manager and tube mount of FIG. 38.
Figure 46:
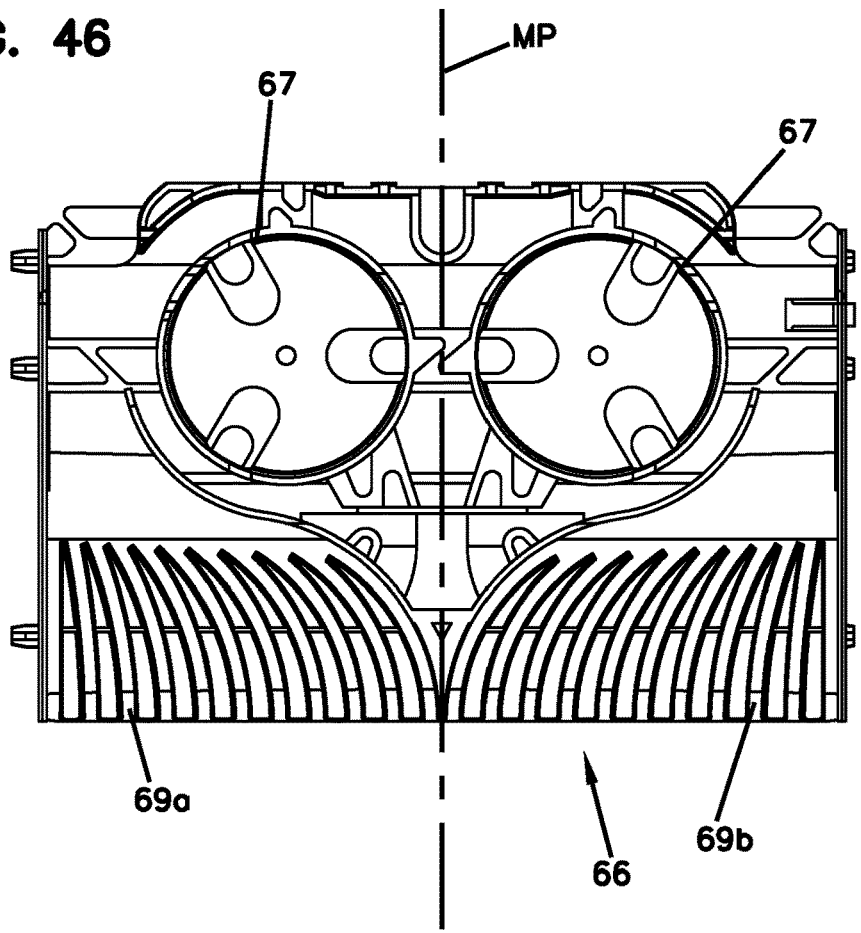
FIG. 46 is a front view of the tube mounting piece of FIG. 45.
Figure 47:
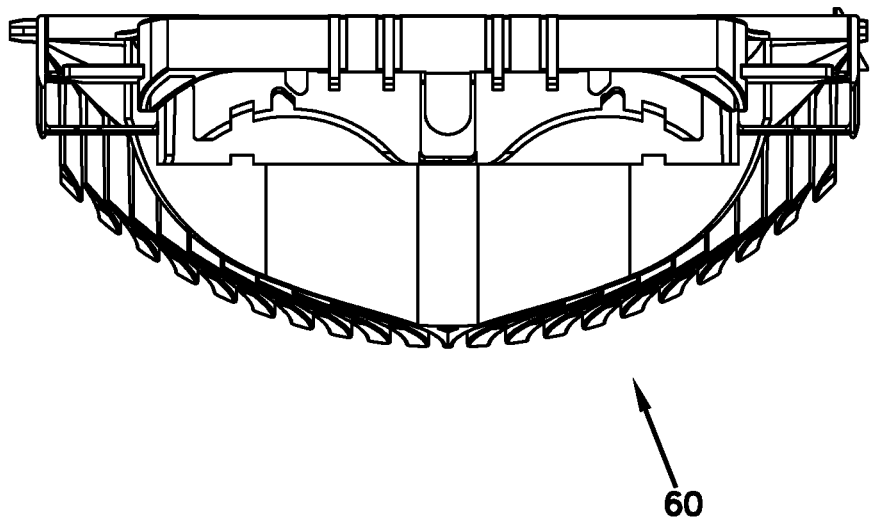
FIG. 47 is a top view of the tube mounting piece of FIG. 45.
Figure 48:
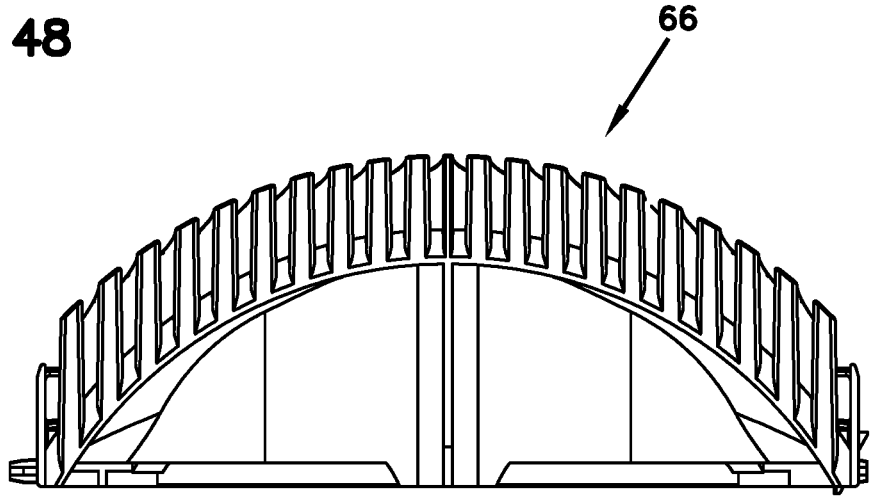
FIG. 48 is a bottom view of the tube mounting piece of FIG. 45.
Figure 49:
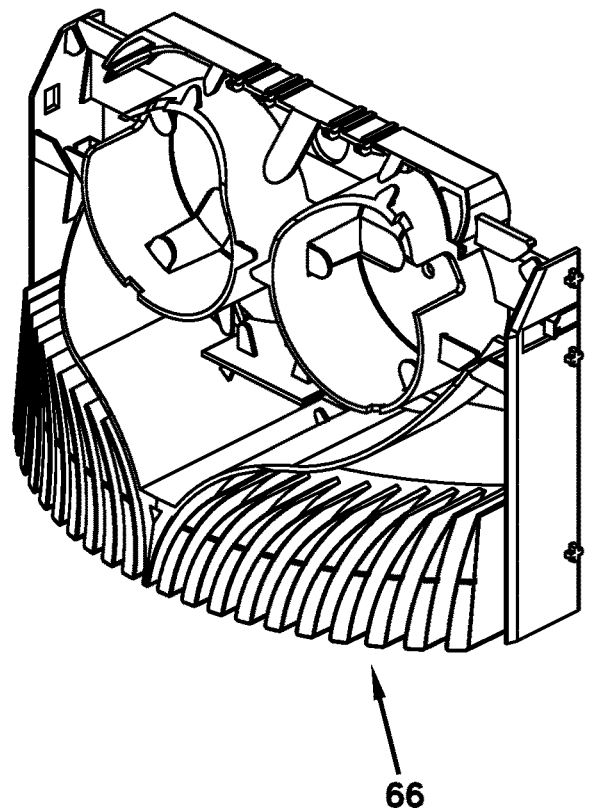
FIG. 49 is a front, perspective view of the tube mounting piece of FIG. 45.
Figure 50:
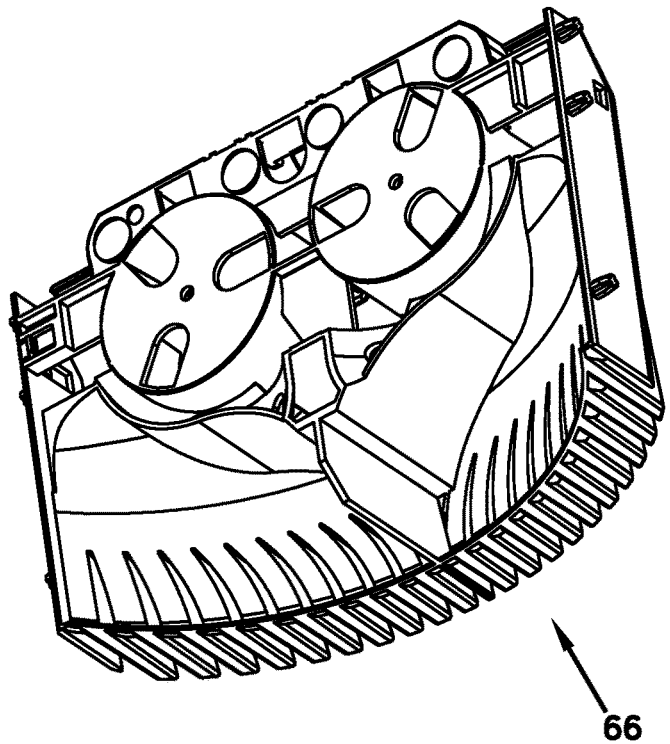
FIG. 50 is a rear, perspective view of the tube mounting piece of FIG. 45.
Figure 51:
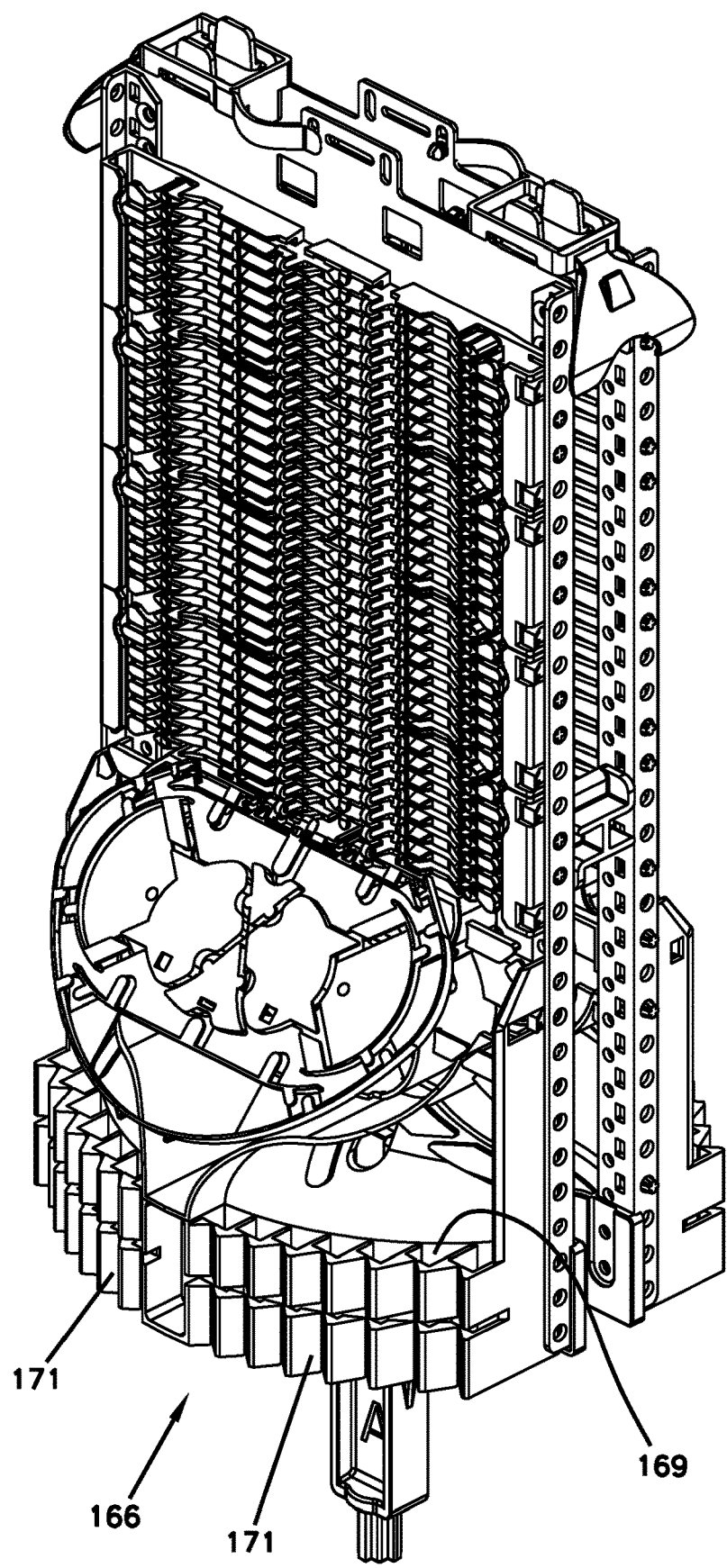
FIG. 51 is a perspective view of another fiber manager and tube mounting arrangement suitable for use with the telecommunications enclosure of FIG. 1.
Figure 52:
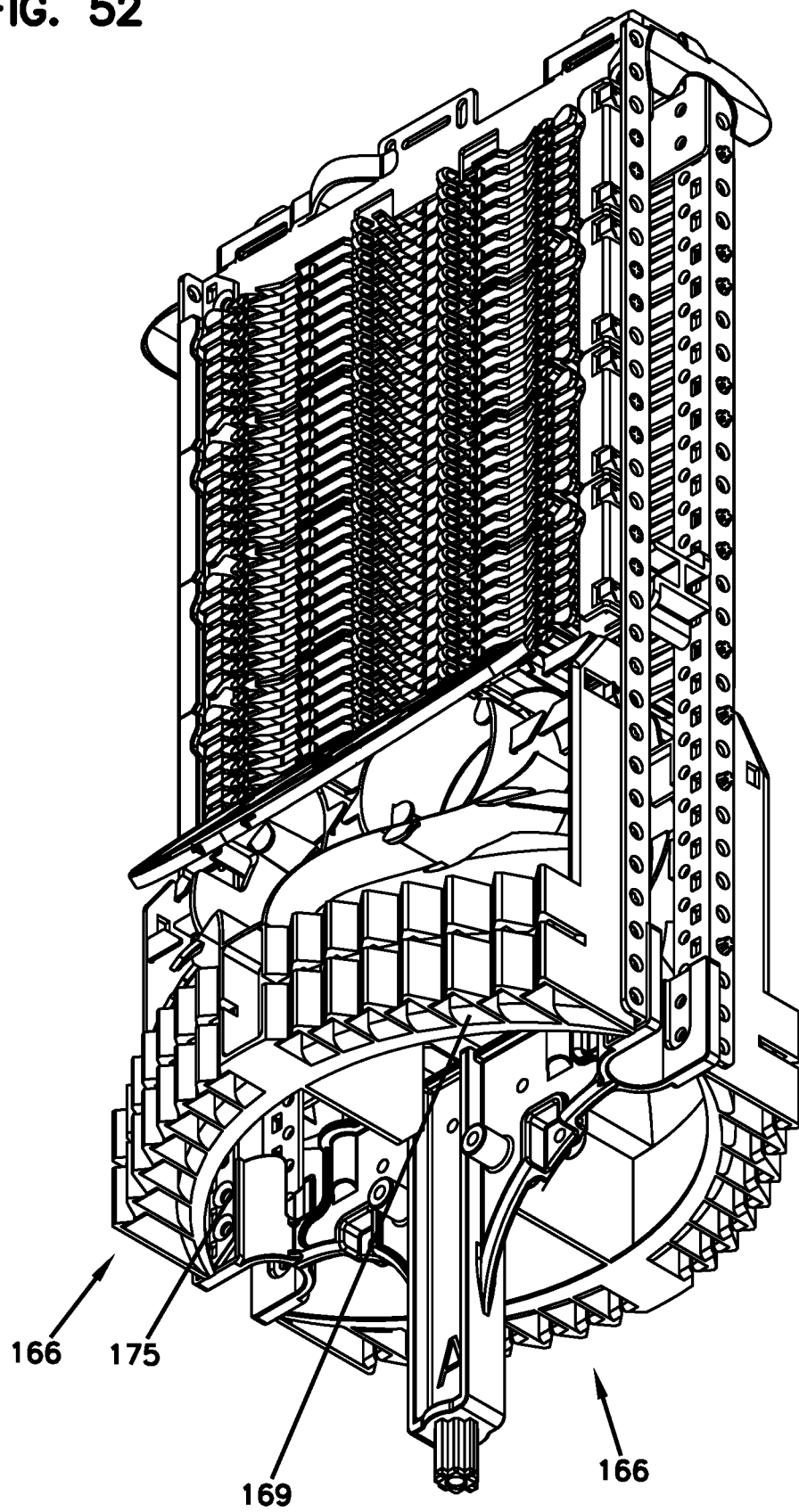
FIG. 52 is another perspective view of the fiber optic manager and tube mount of FIG. 51.
Figure 53:
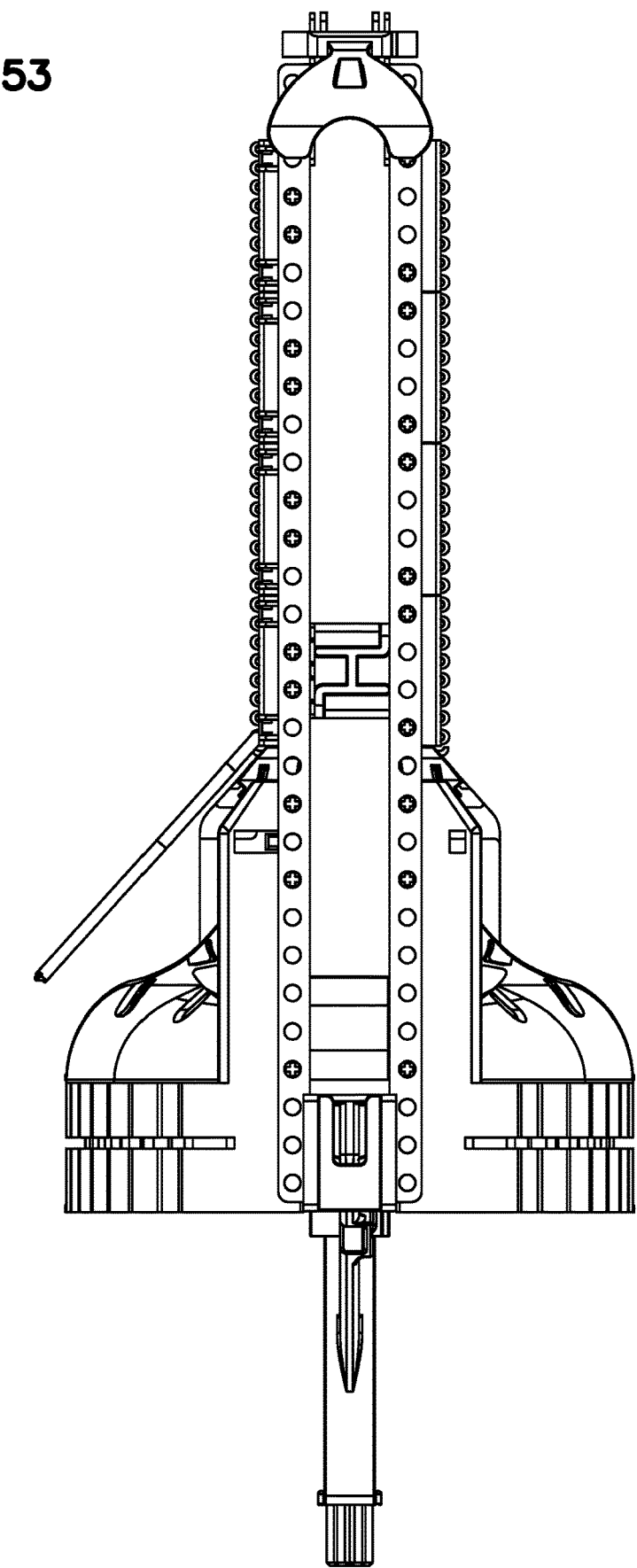
FIG. 53 is a side view of the fiber optic manager and tube mount of FIG. 51.
Figure 54:
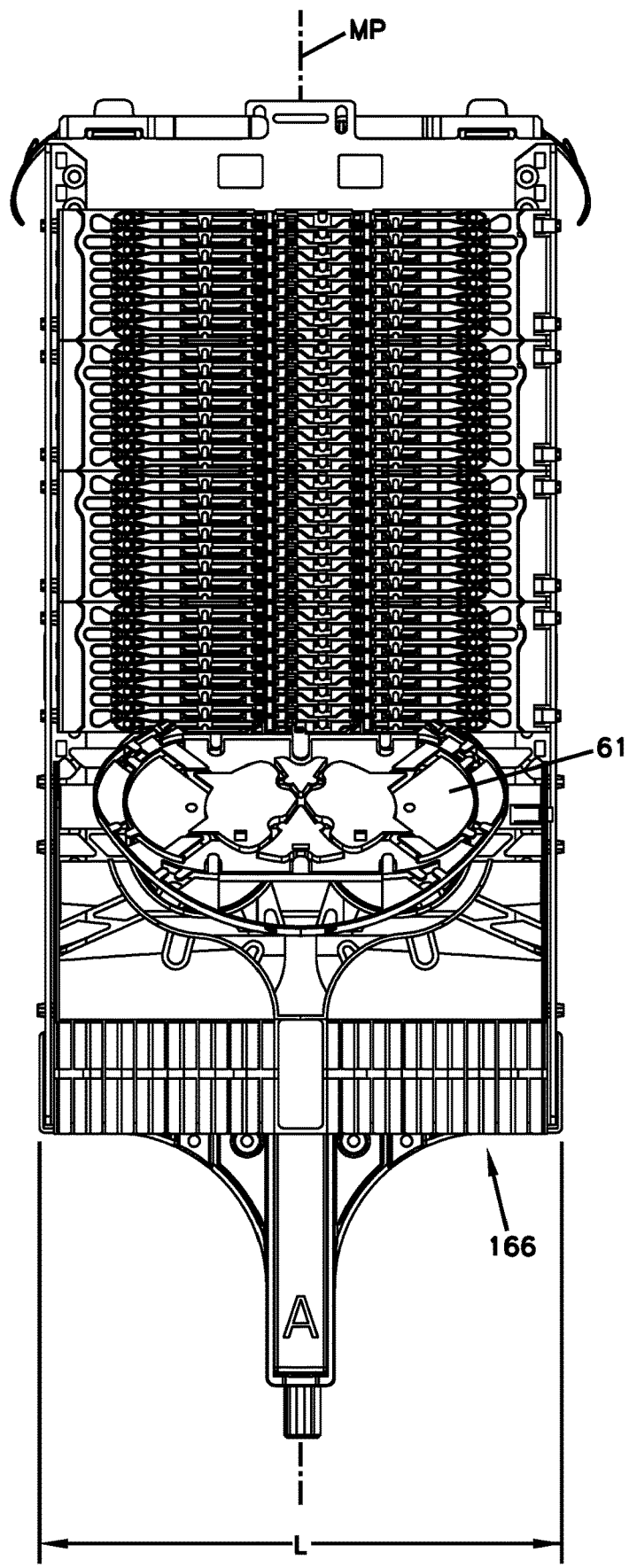
FIG. 54 is a front view of the fiber optic manager and tube mount of FIG. 51.
Figure 55:
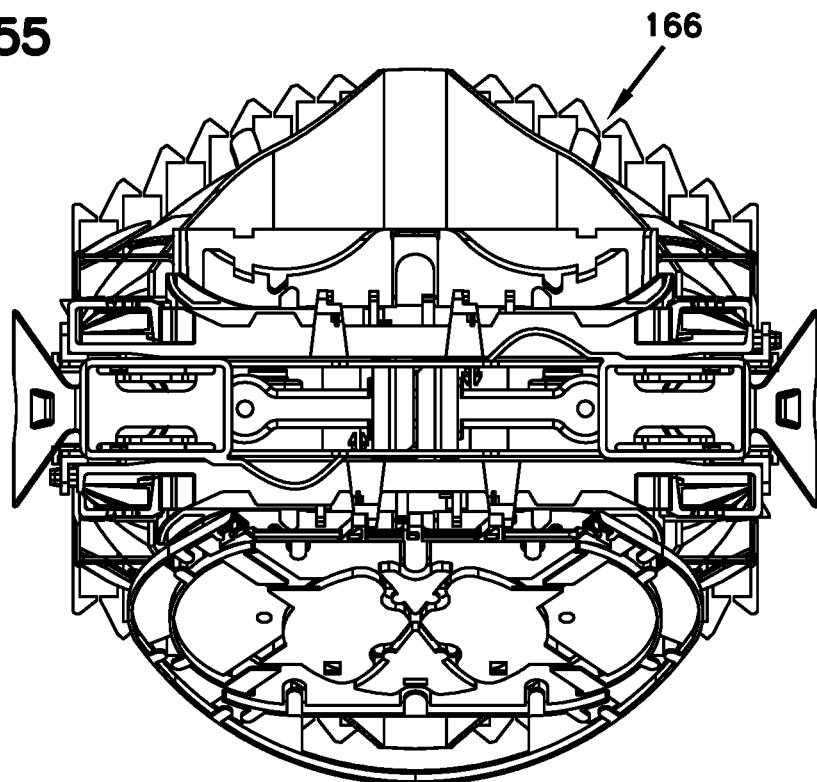
FIG. 55 is a top view of the fiber optic manager and tube mount of FIG. 51.
Figure 56:
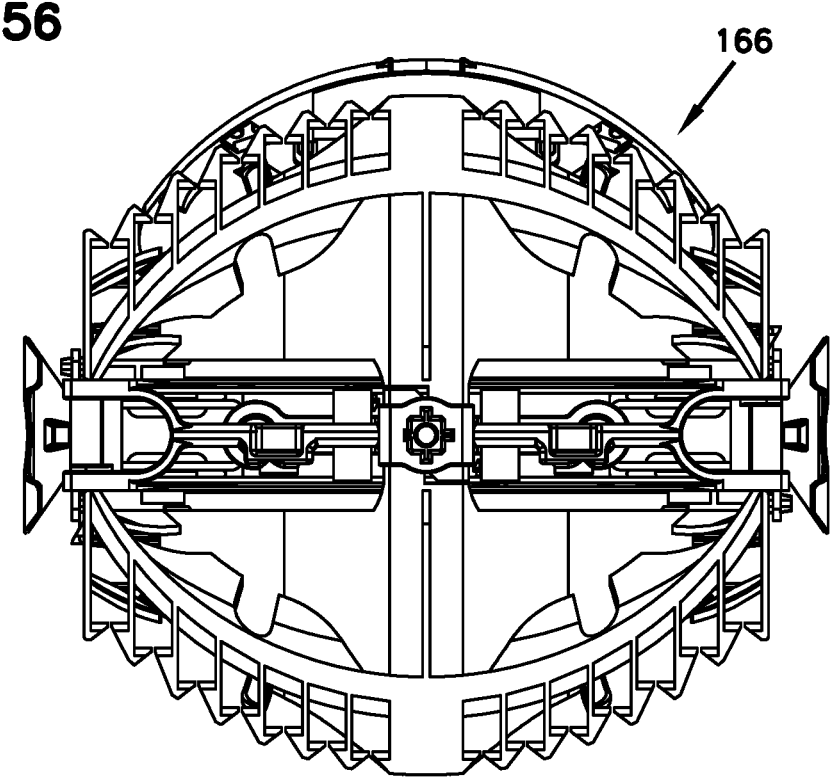
FIG. 56 is a bottom view of the fiber optic manager and tube mount of FIG. 51.
Figure 57:
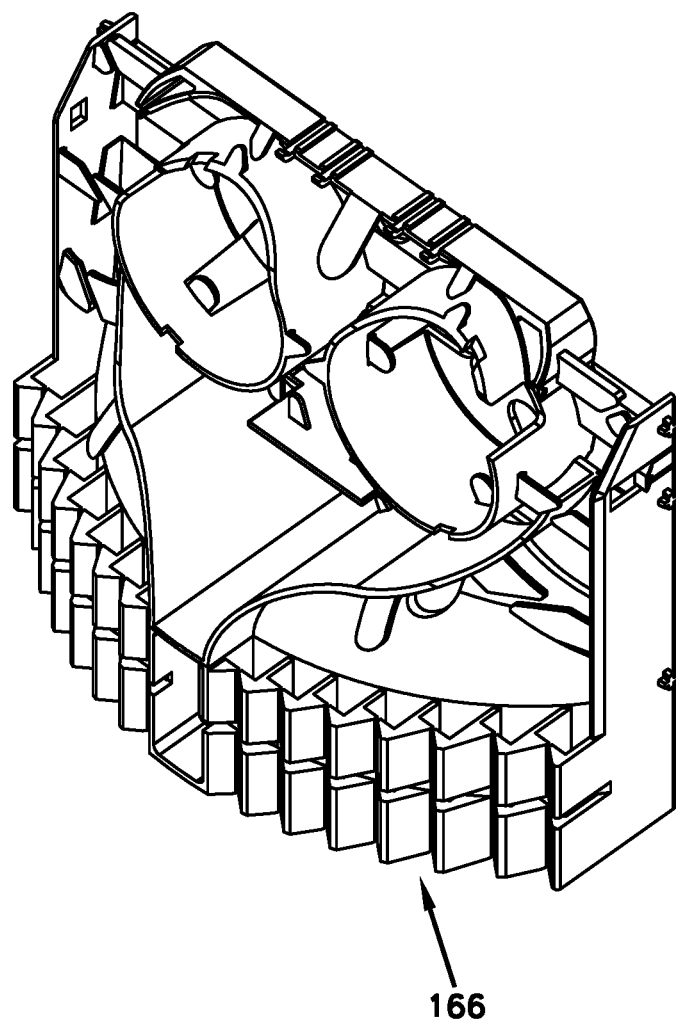
FIG. 57 is a front, perspective view of a tube mount piece of the fiber optic manager and tube mount of FIG. 51.
Figure 58:
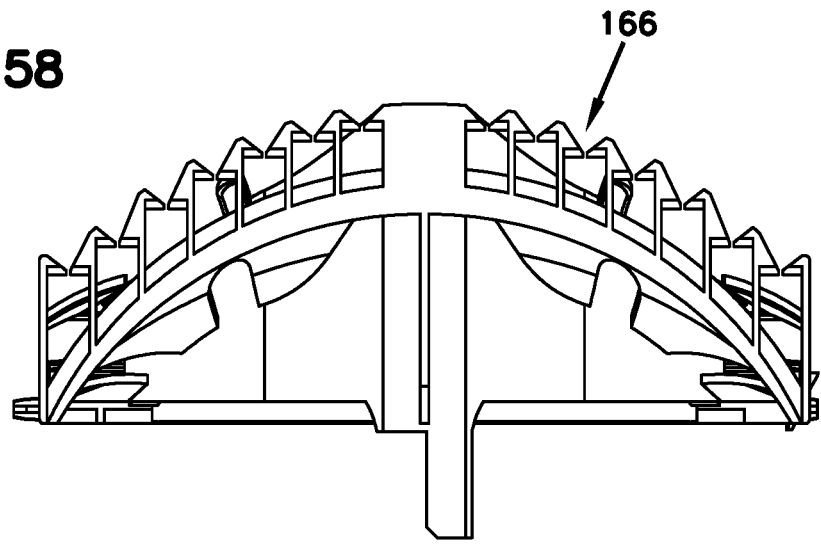
FIG. 58 is a bottom view of the tube mount piece of FIG. 57.
Figure 59:
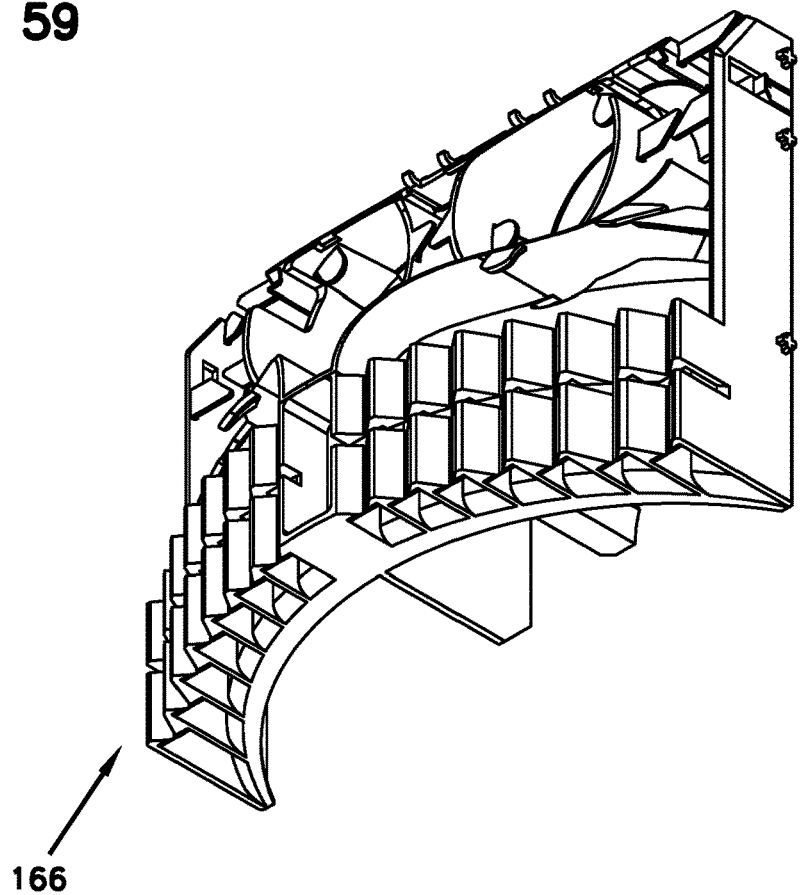
FIG. 59 is another perspective view of the tube mount piece of FIG. 57.
Figure 60:
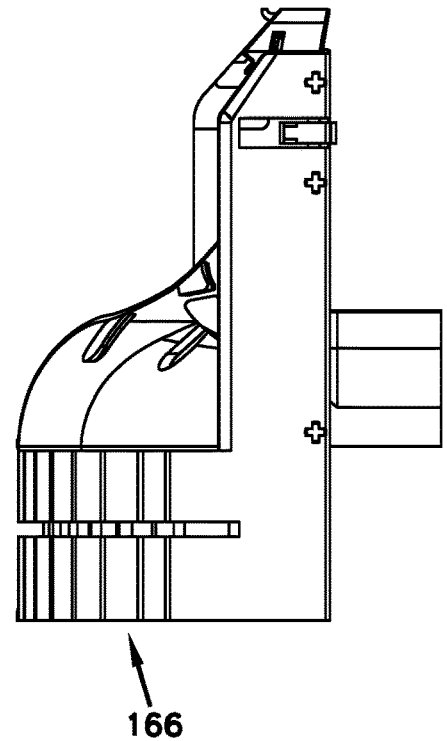
FIG. 60 is a side view of the tube mount piece of FIG. 57.
Figure 61:
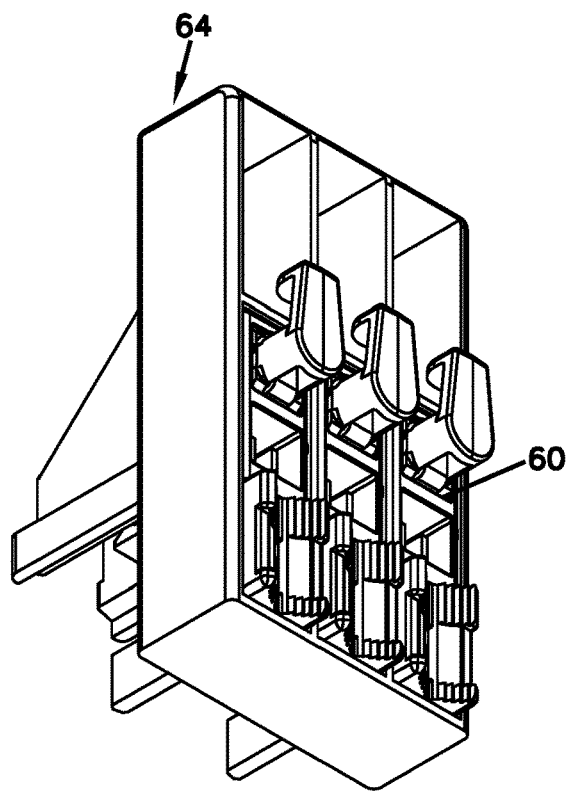
FIG. 61 is a perspective view of an adapter for mounting cable anchors to the gel sealing unit of FIG. 10.
Figure 62:
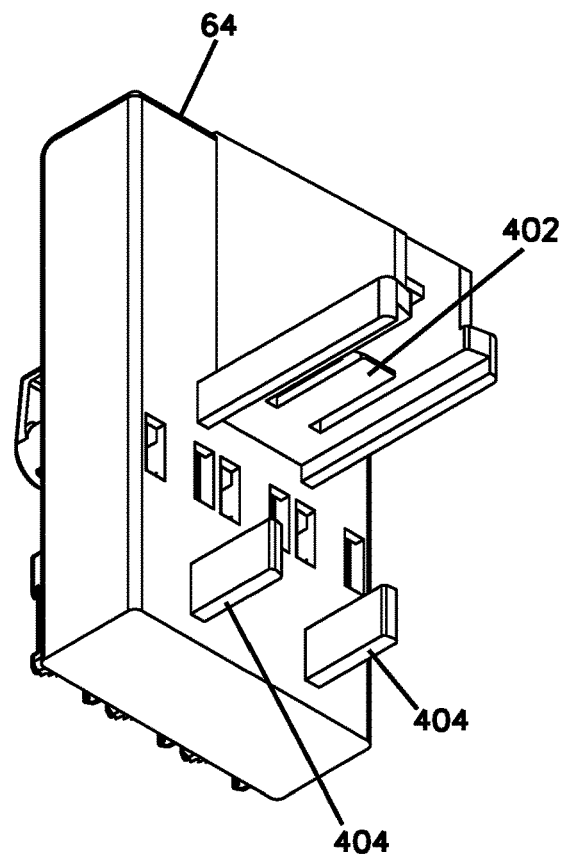
FIG. 62 is a rear perspective view of the adapter of FIG. 61.
Figure 63:
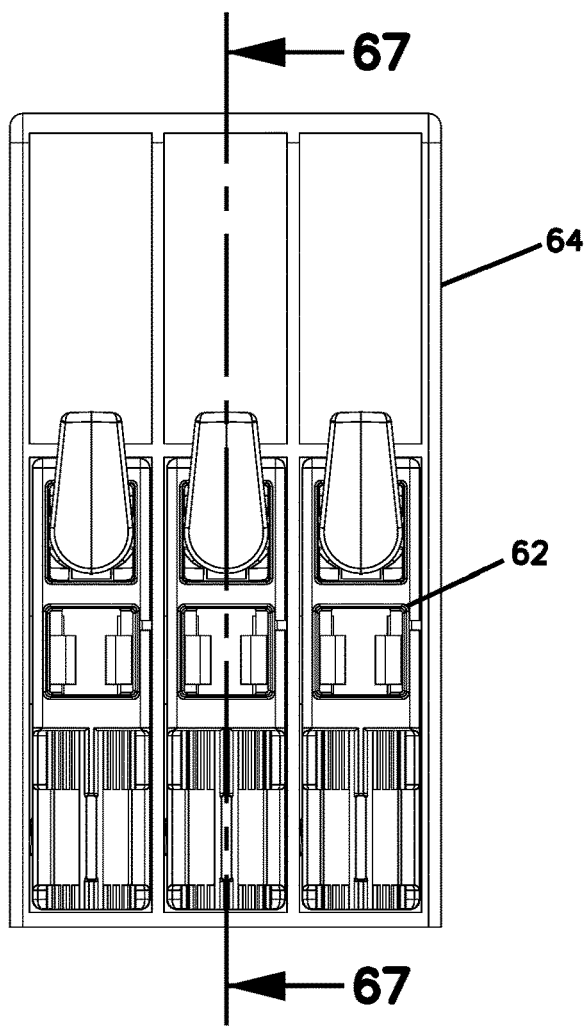
FIG. 63 is a front view of the adapter of FIG. 61.
Figure 64:
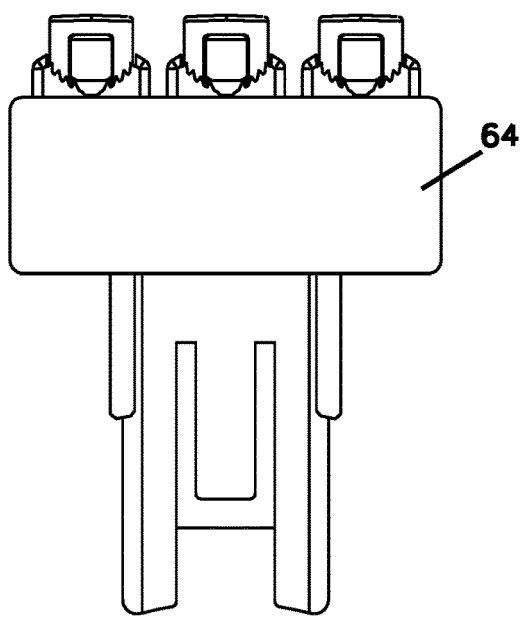
FIG. 64 is a bottom view of the adapter of FIG. 61.
Figure 65:
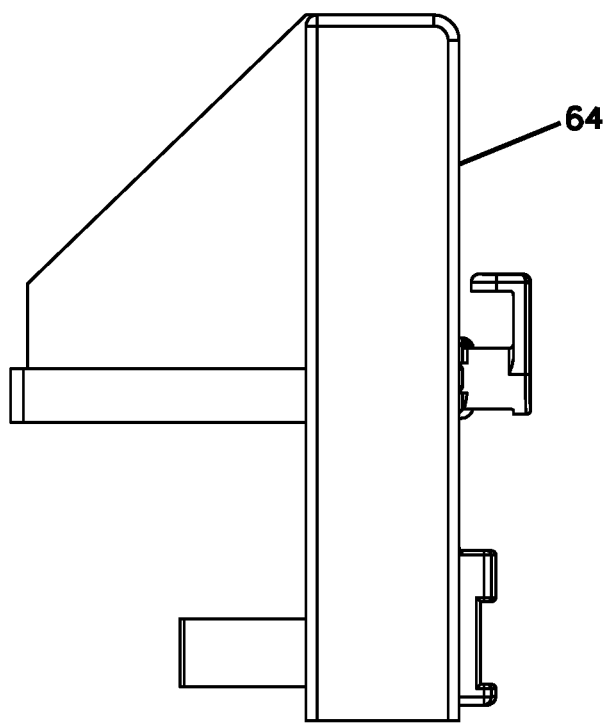
FIG. 65 is a side view of the adapter of FIG. 61.
Figure 66:
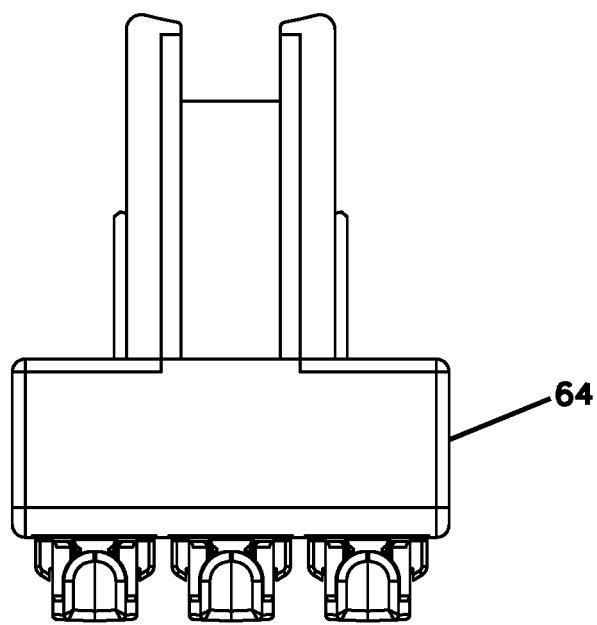
FIG. 66 is a top view of the adapter of FIG. 61.
Figure 67:
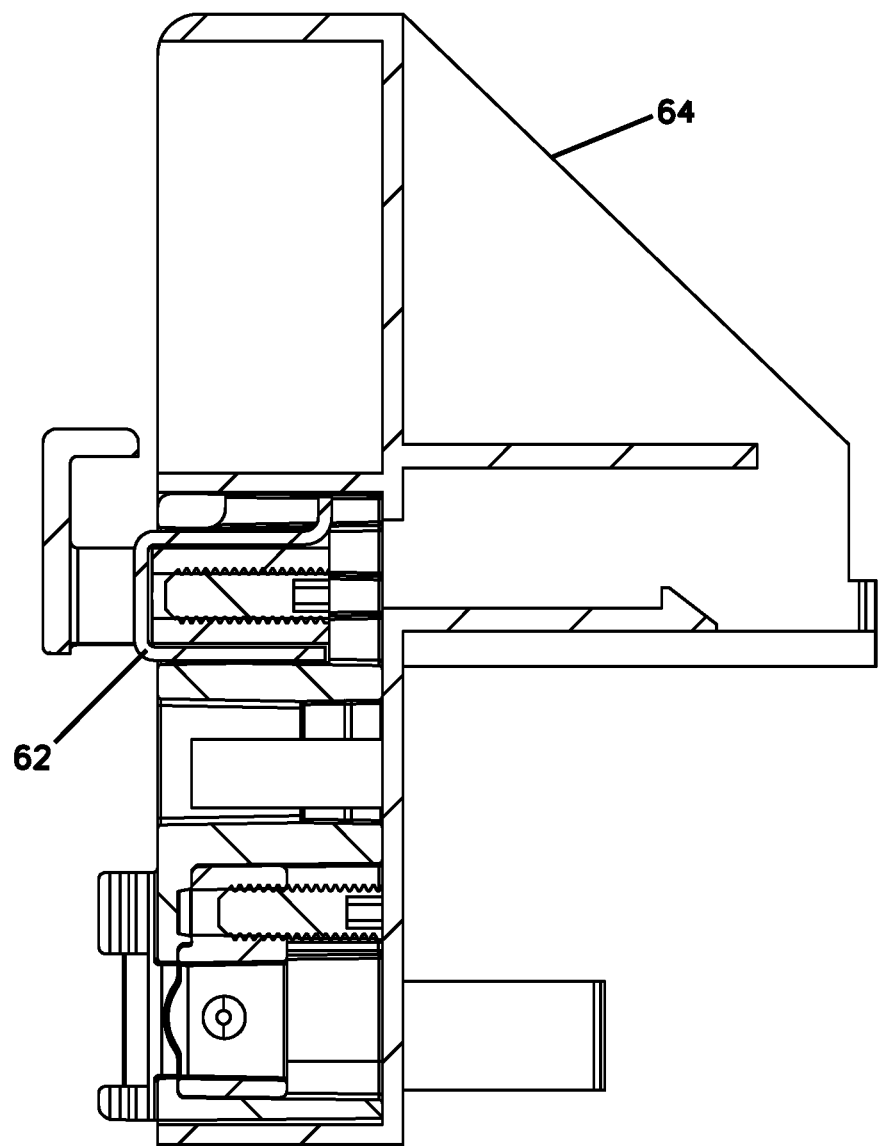
FIG. 67 is a cross-sectional view of the adapter of FIG. 61.
Figure 68:
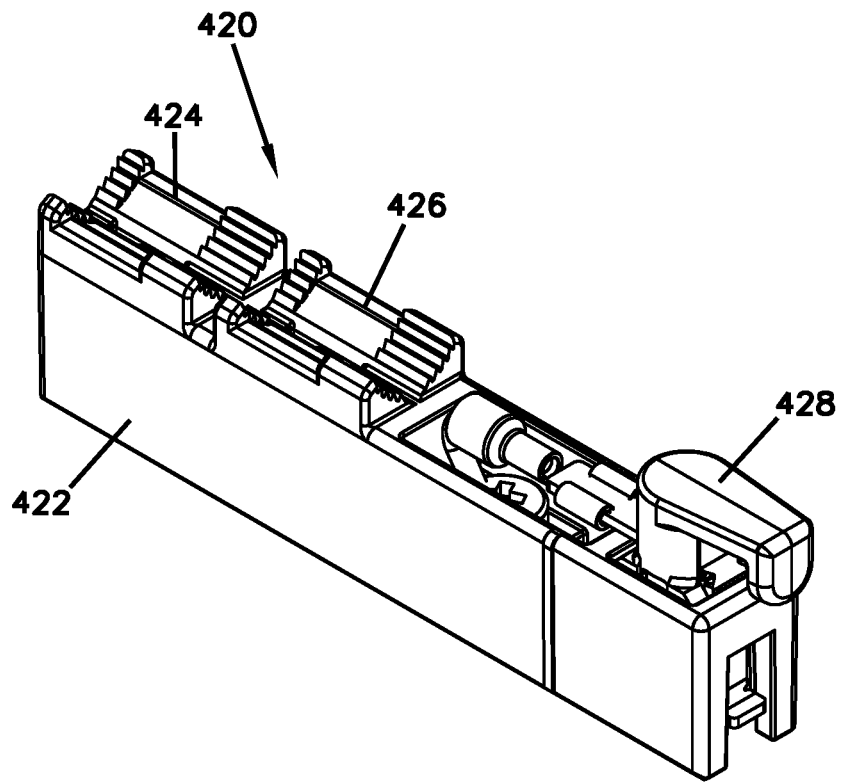
FIG. 68 is a perspective view of an example cable anchor that can be attached or integrated with the gel sealing unit of FIG. 10 either directly or via an intermediate adapter.
Figure 69:
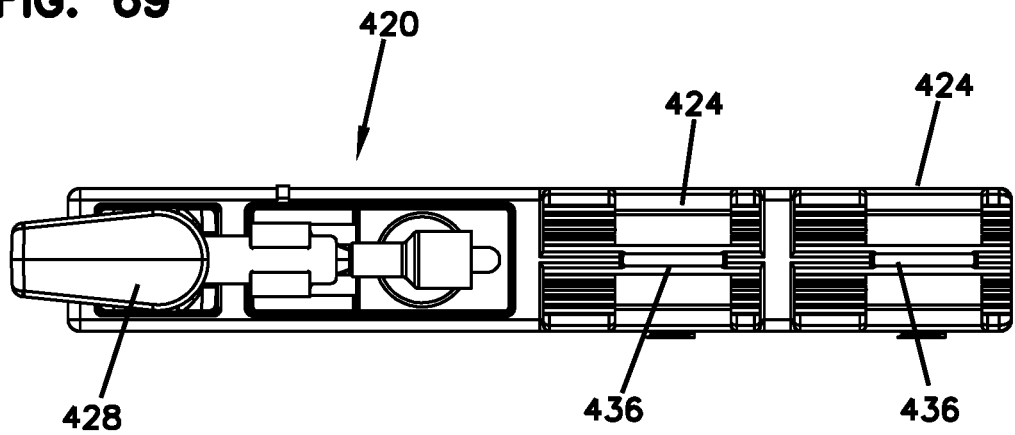
FIG. 69 is a top view of the cable anchor of FIG. 68.
Figure 70:
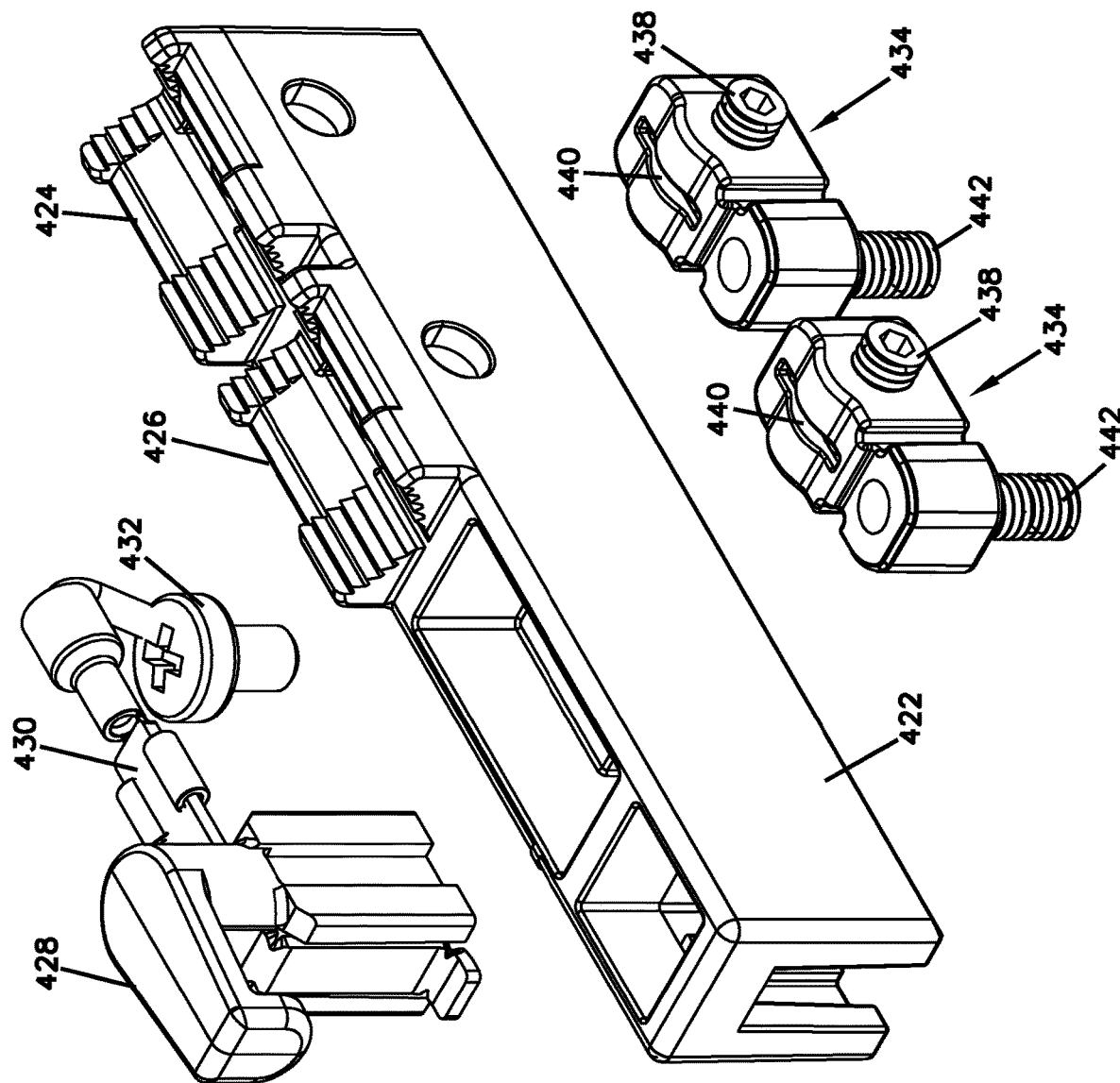
FIG. 70 is an exploded view of the cable anchor of FIG. 68.
Figure 71:
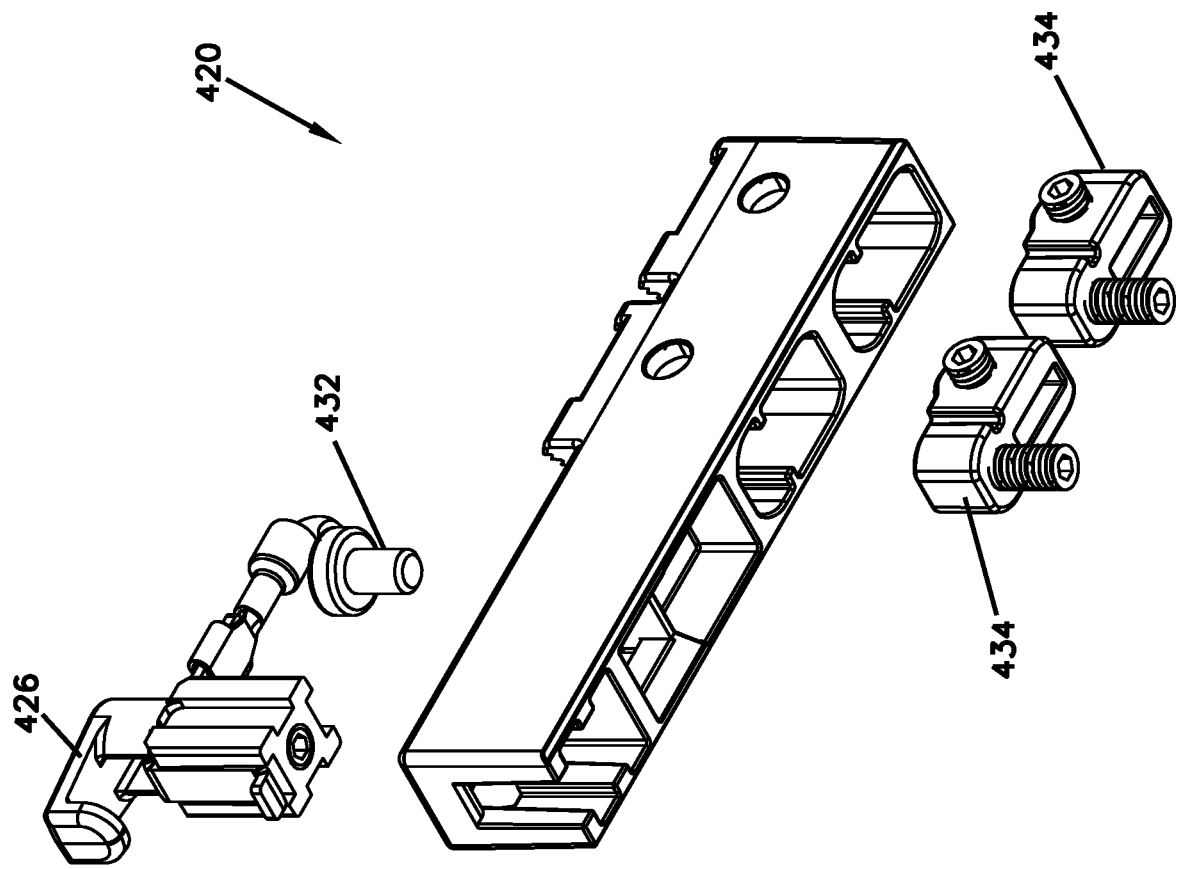
FIG. 71 is another exploded view of the cable anchor of FIG. 68.
Figure 84:
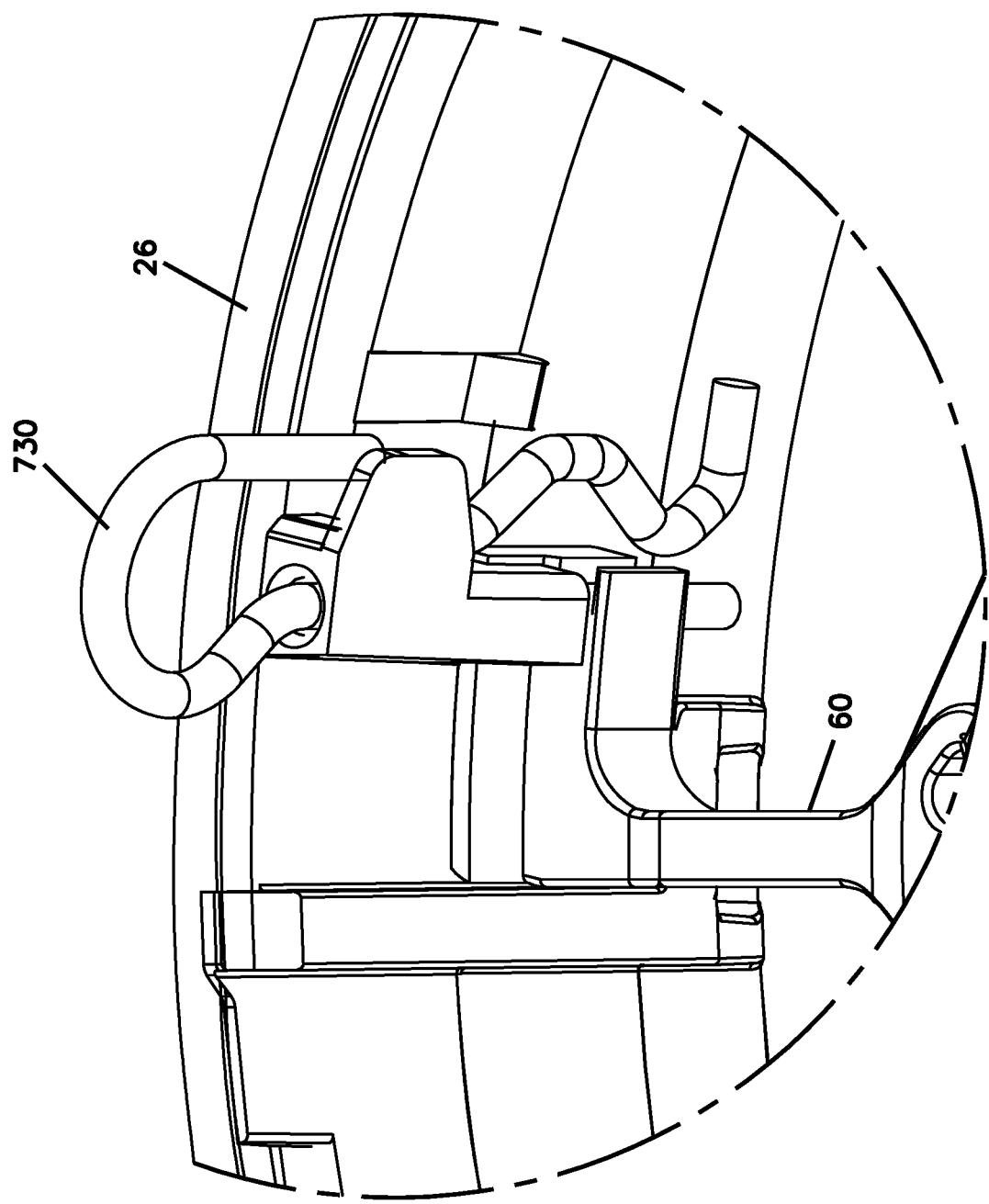
FIG. 84 shows an arrangement in accordance with the principles of the present disclosure for using a clip to rotationally and axially lock an anchoring bracket within a base of an enclosure.

The bracket 60 is carried with the sealing unit 38 and the remainder of the telecommunications assembly unit 34. When the unit 34 is inserted though the second end 30 of the base 26, the bracket moves through the base 26 and is preferably oriented in a first rotational position relative to the base. The base includes a bracket connection interface 300 near the first end of the base. When the bracket 60 reaches the bracket connection interface 300, the unit can be rotated relative to a central axis of the base to move the bracket 60 from the first rotational position to a second rotational position in which the bracket 60 engages the connection interface 300 and is axially fixed relative to the base 26. In the second rotational position, portions of the bracket 60 can be captured between upper and lower flanges or other retainers coupled to the base. FIG. 31 shows the bracket 60 in the second rotational position with a fastener such as a screw 302 being used to prevent the bracket from rotating from the second rotational position back to the first rotational position. FIG. 32 shows the bracket 60 retained in the second rotational position by a snap fit 304. FIG. 33 shows the bracket 60 retained in the second rotational position by an axial slide latch 306. FIG. 34 shows a slide latch 308 that axially retains the bracket 60 regardless of its rotational position (this example does not require twist to lock since the latch secures the bracket against axial movement relative to the base). FIG. 35 shows the bracket 60 retained in the second rotational position by another axial slide latch 310. FIG. 36 shows the bracket 60 retained in the second rotational position by a pivotal latch 312. FIG. 37 shows the bracket 60 retained in the second rotational position by another pivotal latch 314. FIG. 84 shows the bracket 60 retained in the second rotational position by a resilient clip 730.

Figure 85:
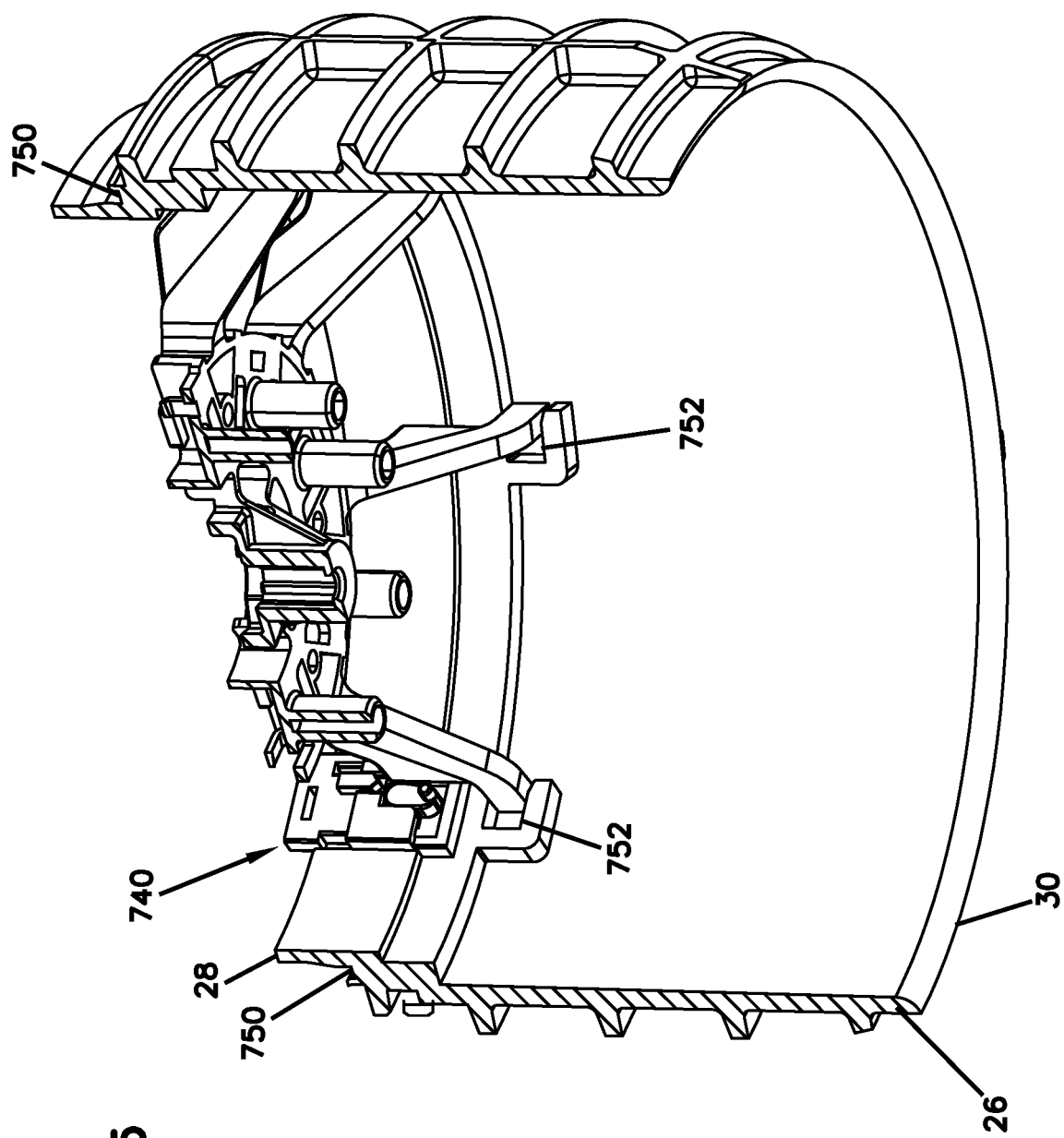
FIG. 85 shows a base of an enclosure in accordance with the principles of the present disclosure having an arrangement for preventing a dome from being mounted on the base until a bracket has first been secured within the base.

FIGS. 85-98 show an example assembly error prevention arrangement 740 (i.e., a poka yoke arrangement) for preventing the dome 24 from being coupled to the first end 28 of the base 26 before the anchoring bracket 60 suitably secured within the base 26. As shown at FIG. 85, the first end 28 of the base 26 defines a circumferential groove 750 for receiving a circumferential edge of the open end of the dome 24. Also, the base 26 includes a connection interface 300 in the form of a plurality of circumferential bracket anchoring slots 752 for axially anchoring the anchoring bracket 60 relative to the base 26 when the anchoring bracket 60 is in the second rotational position. The slots 752 are circumferentially spaced about the interior of the base 26. It will be appreciated that the anchoring bracket 60 includes a plurality of radial arms, and that end portions of the radial arms slide within the bracket anchoring slots 752 when the bracket 60 is rotated to the second rotational position. The bracket anchoring slots 752 include open ends and closed ends. When the anchoring bracket 60 is rotated from the first rotational position to the second rotational position, the end portions of the radial arms of the anchoring bracket 60 enter the bracket anchoring slots 752 through the open ends of the slots. The closed ends of the bracket anchoring slots 752 can function as positive stops for stopping rotation of the anchoring bracket when the anchoring bracket 60 reaches the second rotational position. When the bracket 60 is in the second rotational position, the end portions of the radial arms of the bracket are captured between upper and lower surfaces which define the bracket anchoring slots 752 so as to prevent axial movement of the bracket 60 relative to the base 26.

The assembly error prevention arrangement 740 includes a slide member 756 that is slidable relative to the base along a slide orientation 757 that extends between the first and second ends 28, 30 of the base 26. The slide member 756 is slidable along the slide orientation 757 (see FIGS. 86 and 87) between a dome-blocking position (see FIGS. 86, 88, 89, and 90) and an anchor bracket retention position (see FIGS. 87 and 91). The slide member 756 prevents the dome 24 from being installed at the first end 28 of the base 26 when the slide member 756 is in the dome blocking position. The slide member 756 allows the anchor bracket to be rotated from the first rotational position to the second rotational position when the slide member 756 is in the dome blocking position. The slide member 756 allows the dome 24 to be installed at the first end 28 of the base 26 when the slide member 756 is in the anchor bracket retention position. The slide member 756 prevents the anchor bracket from being rotated from the second rotational position to the first rotational position when the slide member 756 is in the anchor bracket retention position.

The base 26 includes a sidewall 758 including a mounting structure 760 adjacent the first end 28 of the base 26 for slidably receiving the slide member 756. The mounting structure 760 includes a main receptacle 762 for receiving a main body 764 of the slide member 756. The mounting structure 760 can also include an inner slot 766 for receiving a bracket blocking projection 768 of the slide member 756 and an outer slot 770 for receiving a dome blocking projection 772 of the slide member 756. The inner and outer slots 766, 770 have lengths that extend along the slide orientation 757. The bracket blocking projection 768 slides along the inner slot 766 and the dome blocking projection 772 slides along the outer slot 770 as the slide member 756 moves between the dome blocking position (see FIGS. 86 and 88) and the bracket retention position (see FIGS. 87 and 91).

Referring to FIGS. 87, 90, 92 and 93, the slide member 756 includes a flexible latch 774 that engages a catch 776 of the mounting structure 760 provided inside the base 26. The flexible latch 774 engages the catch 776 via a snap-fit connection to retain the slide member 756 within the receptacle 762 while concurrently allowing the slide member 756 to slide along the slide orientation 757 between the dome blocking position and the bracket retention position.

Figure 88:
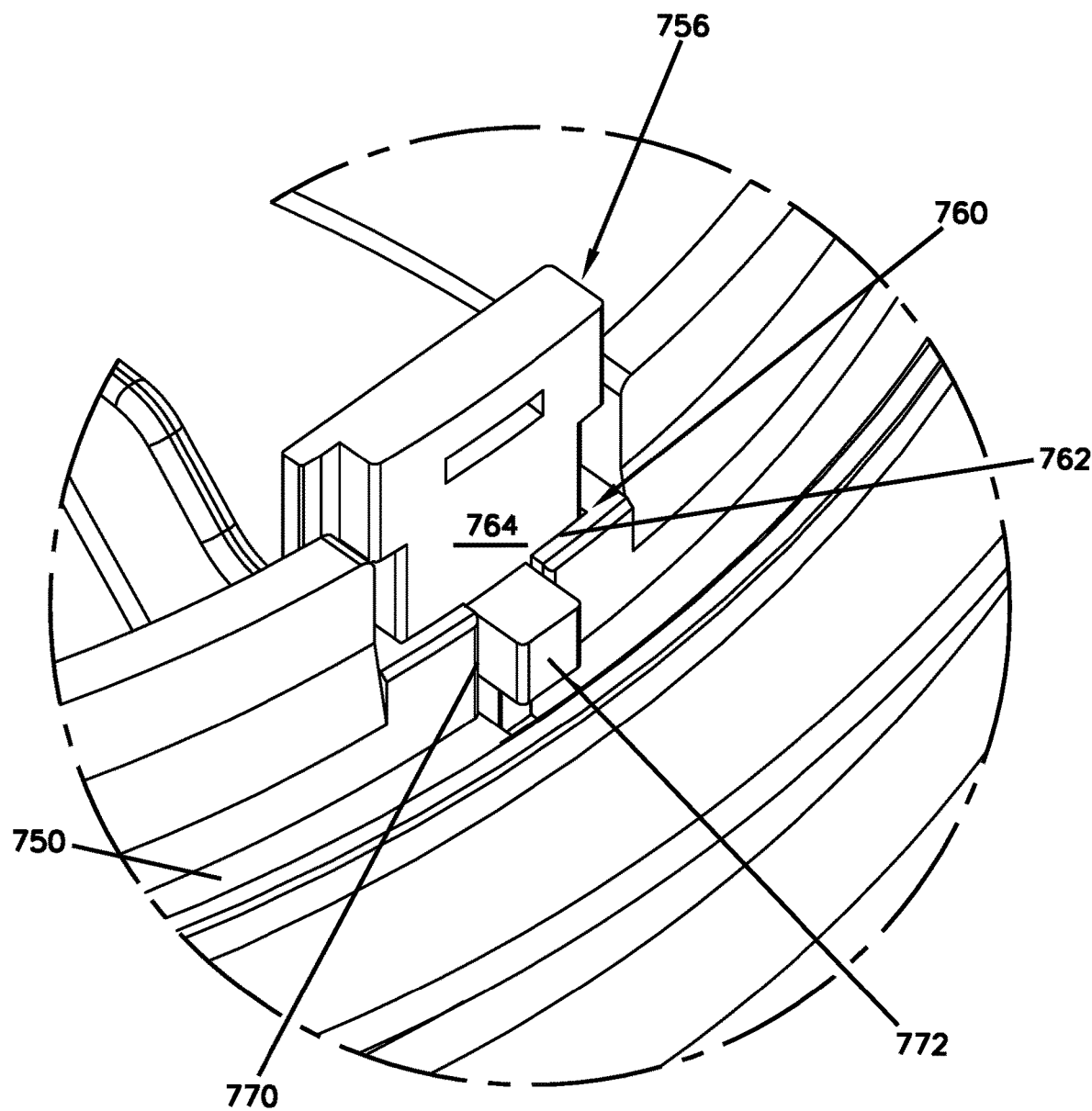
FIG. 88 shows the arrangement of FIG. 85 in a dome blocking position.
Figure 89:
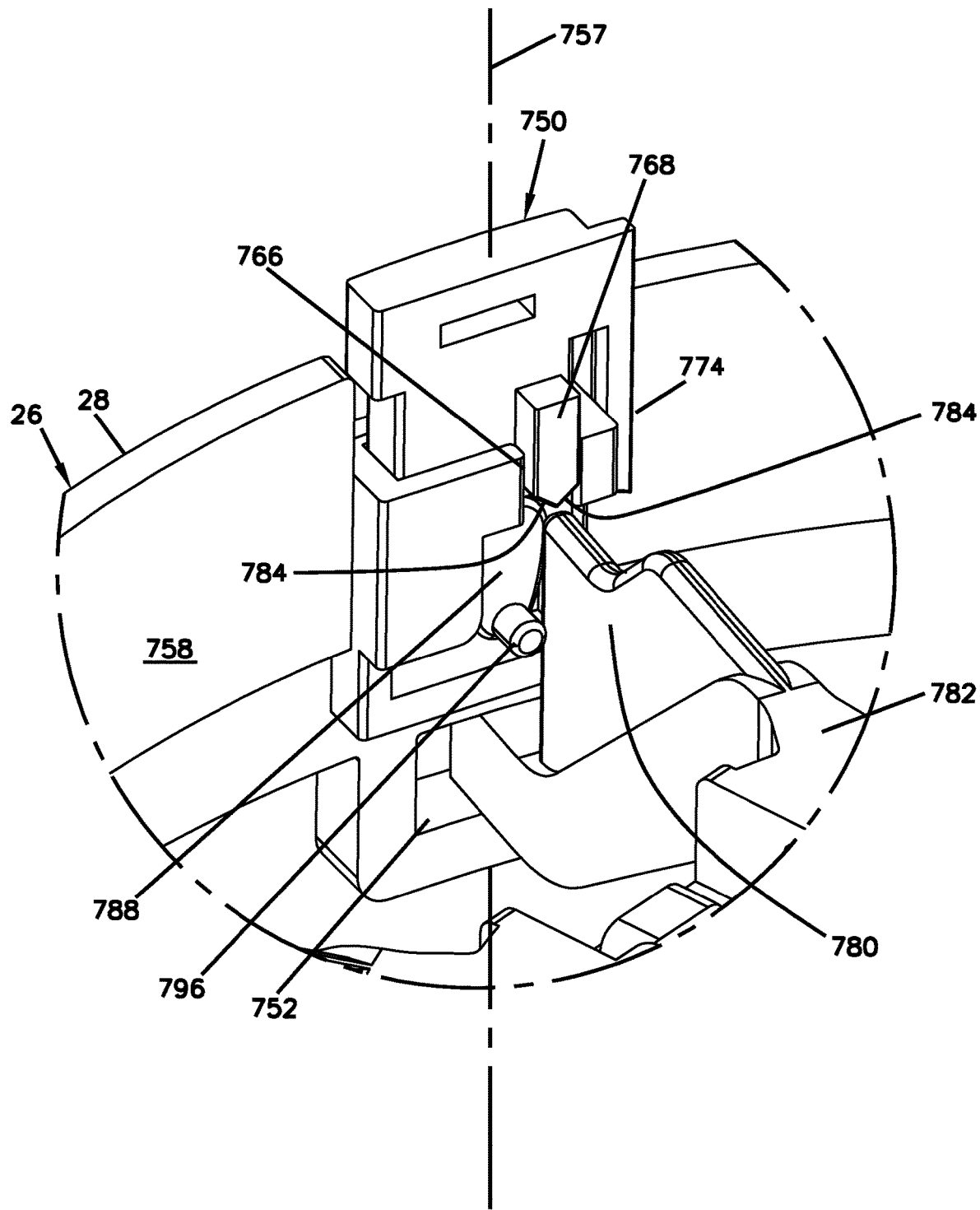
FIG. 89 is another view of the arrangement of FIG. 85 in the dome blocking configuration.
Figure 90:
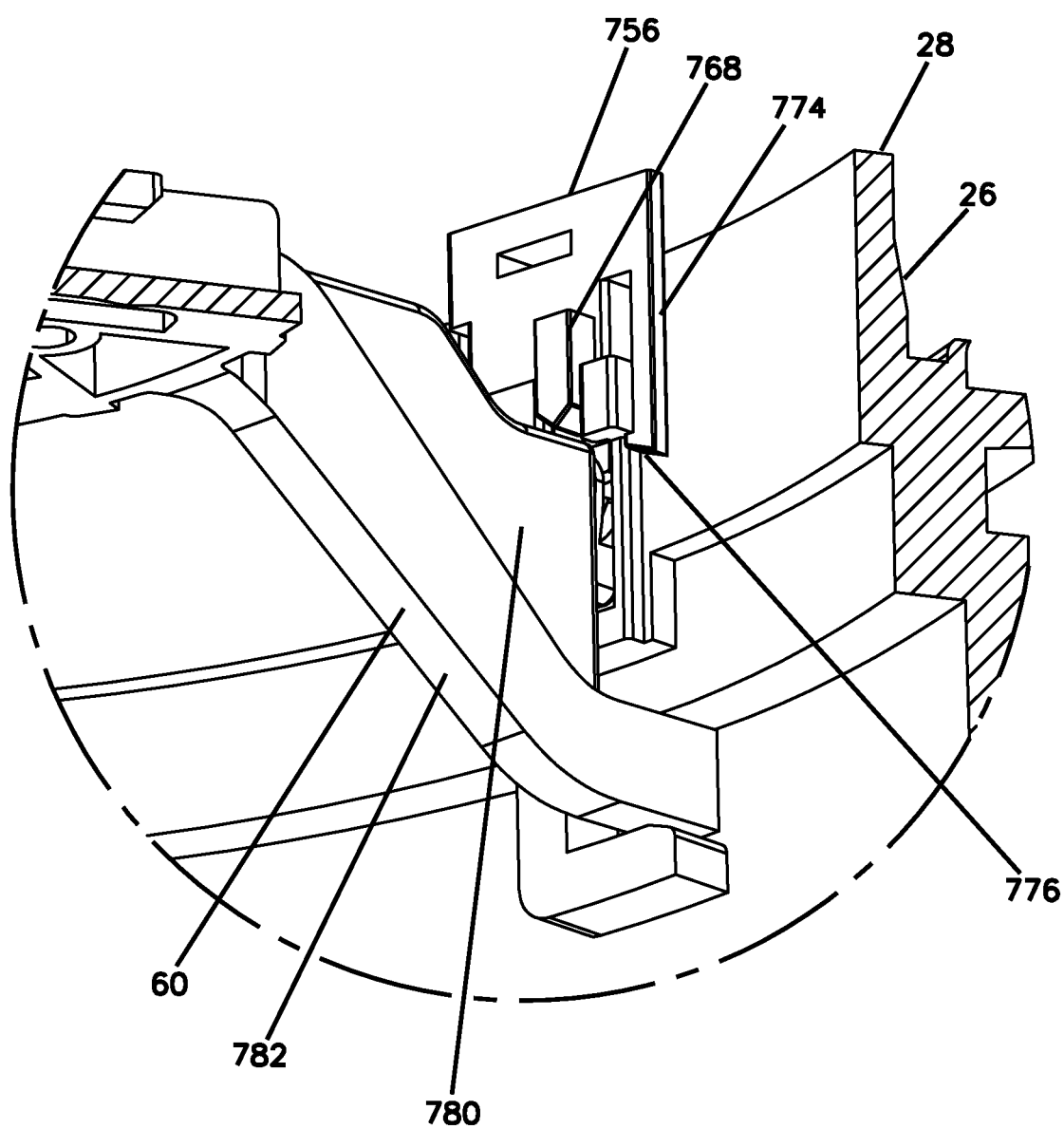
FIG. 90 is still another view of the arrangement of FIG. 85 in the dome blocking configuration.
Figure 91:
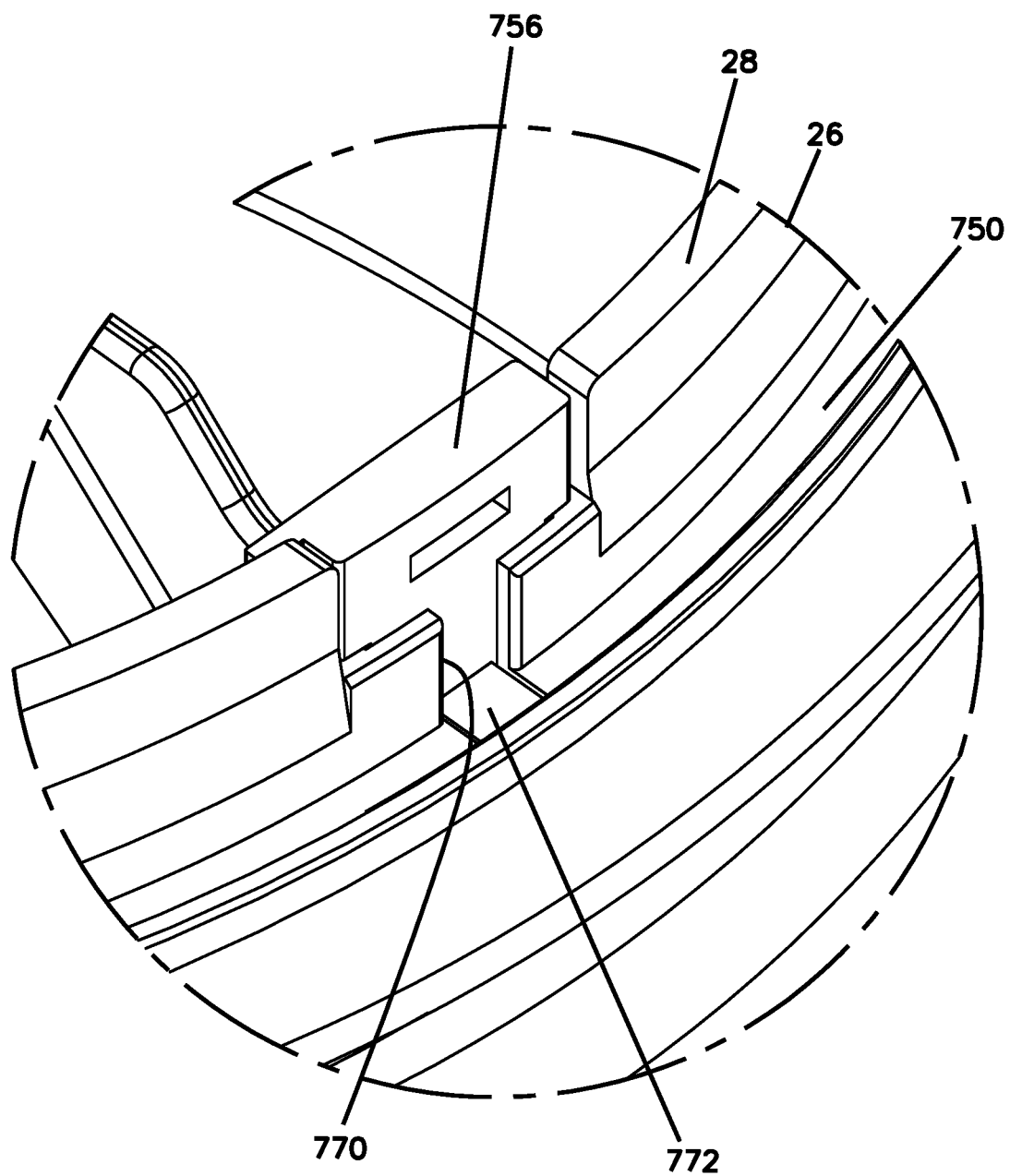
FIG. 91 shows the arrangement of FIG. 85 in a position where the dome is not obstructed from being mounted on the base.

As indicated above, the first end 28 of the base 26 defines the circumferential groove 75 for receiving an end of the dome 24. As shown at FIG. 88, when the slide member 56 is in the dome blocking position, the dome blocking projection 772 is positioned within the circumferential groove 750 so as to provide an obstruction that prevents the bottom end of the dome from being inserted into the groove 750. When the slide member 756 is in the bracket retention position of FIG. 91, the dome blocking projection 768 is recessed relative to the circumferential groove 750 such that the circumferential groove 750 is not obstructed and the end of the dome 24 can readily be inserted therein.

Figure 86:
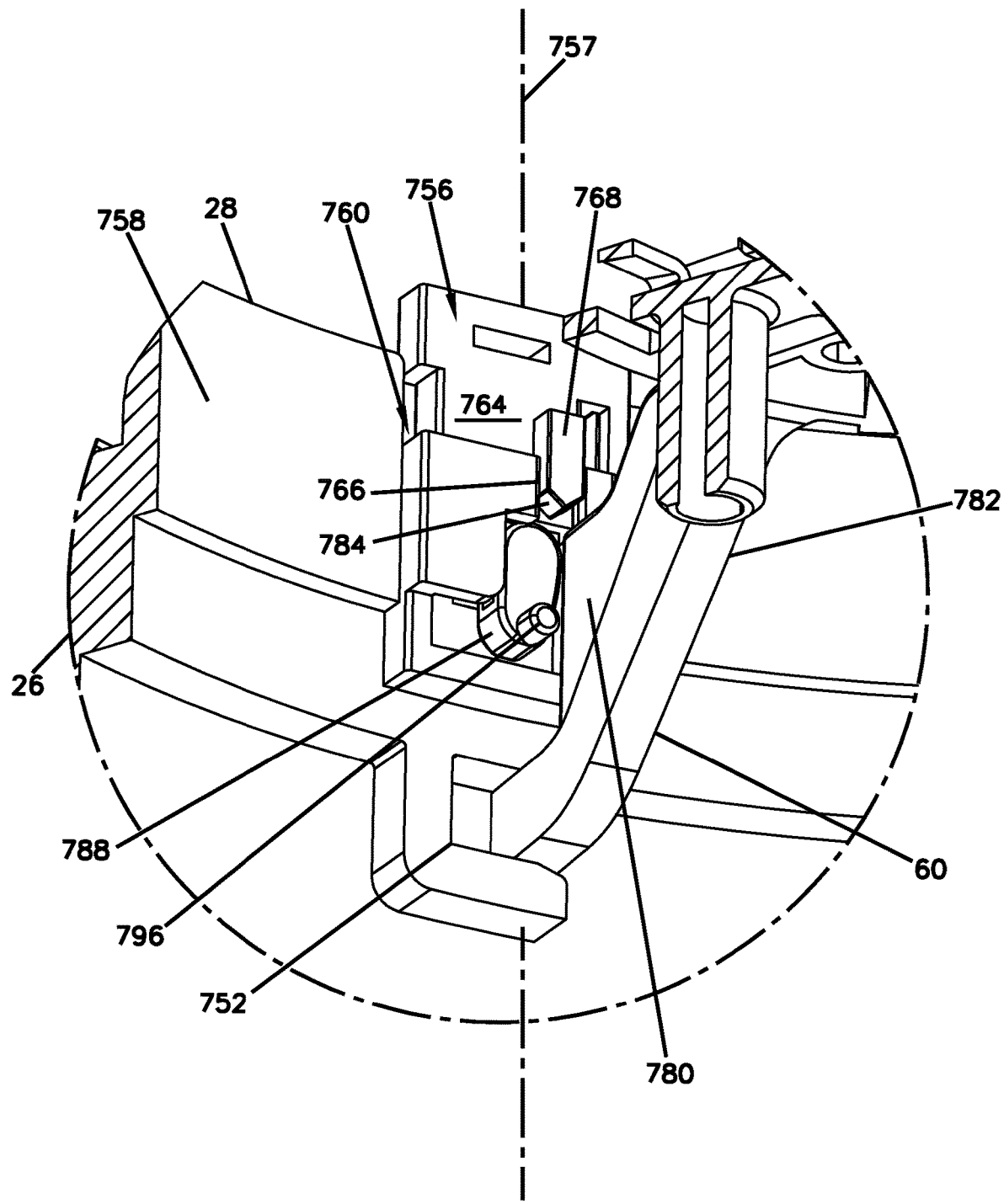
FIG. 86 is an enlarged view of a portion of FIG. 85 with the arrangement in a dome blocking position.
Figure 87:
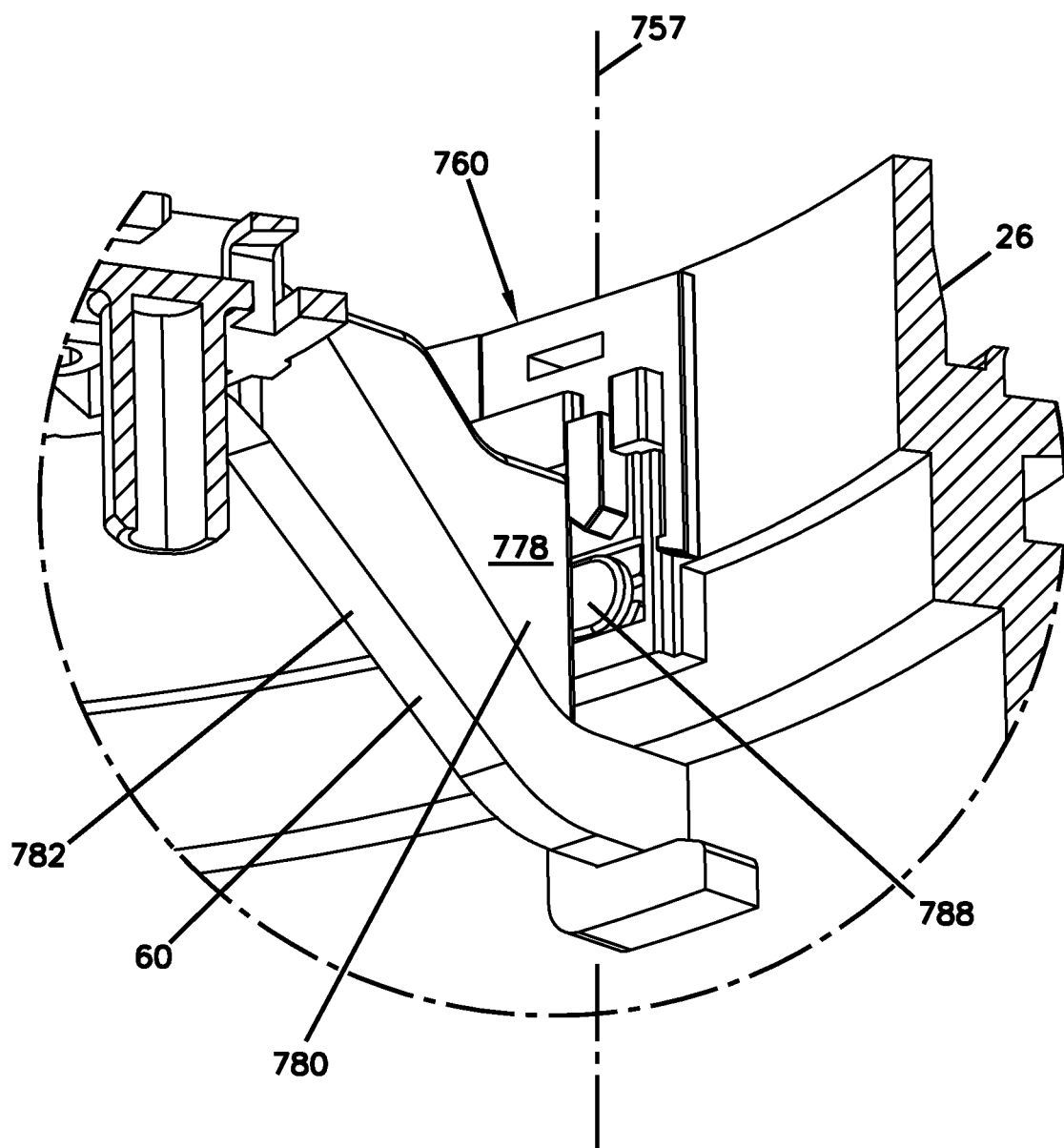
FIG. 87 shows the arrangement of FIG. 85 in a non-dome blocking configuration where a bracket is secured by the arrangement in an anchored configuration.

When the bracket 60 is in the second rotational position and the slide member 756 is in the bracket blocking position (as shown at FIG. 87), the bracket blocking projection 768 of the slide member 756 opposes a stop surface 778 of a flange 780 of one of the radial arms 782 to prevent the anchor bracket 60 from being rotated relative to the base 26 from the second rotational position to the first rotational position. As shown at FIG. 86, when the slide member 756 is in the dome blocking position, the bracket blocking projection 768 is offset from the flange 780 (e.g., positioned above as shown at FIG. 86) so as to not interfere with the ability to rotate the bracket 60 between the first and second rotational positions. The bracket blocking projection 768 can have a lower end having angled surfaces 784 that facilitate moving the bracket blocking portion 768 past the flange 780 when the slide member 756 is moved from the dome blocking position to the bracket blocking position.

Figure 92:
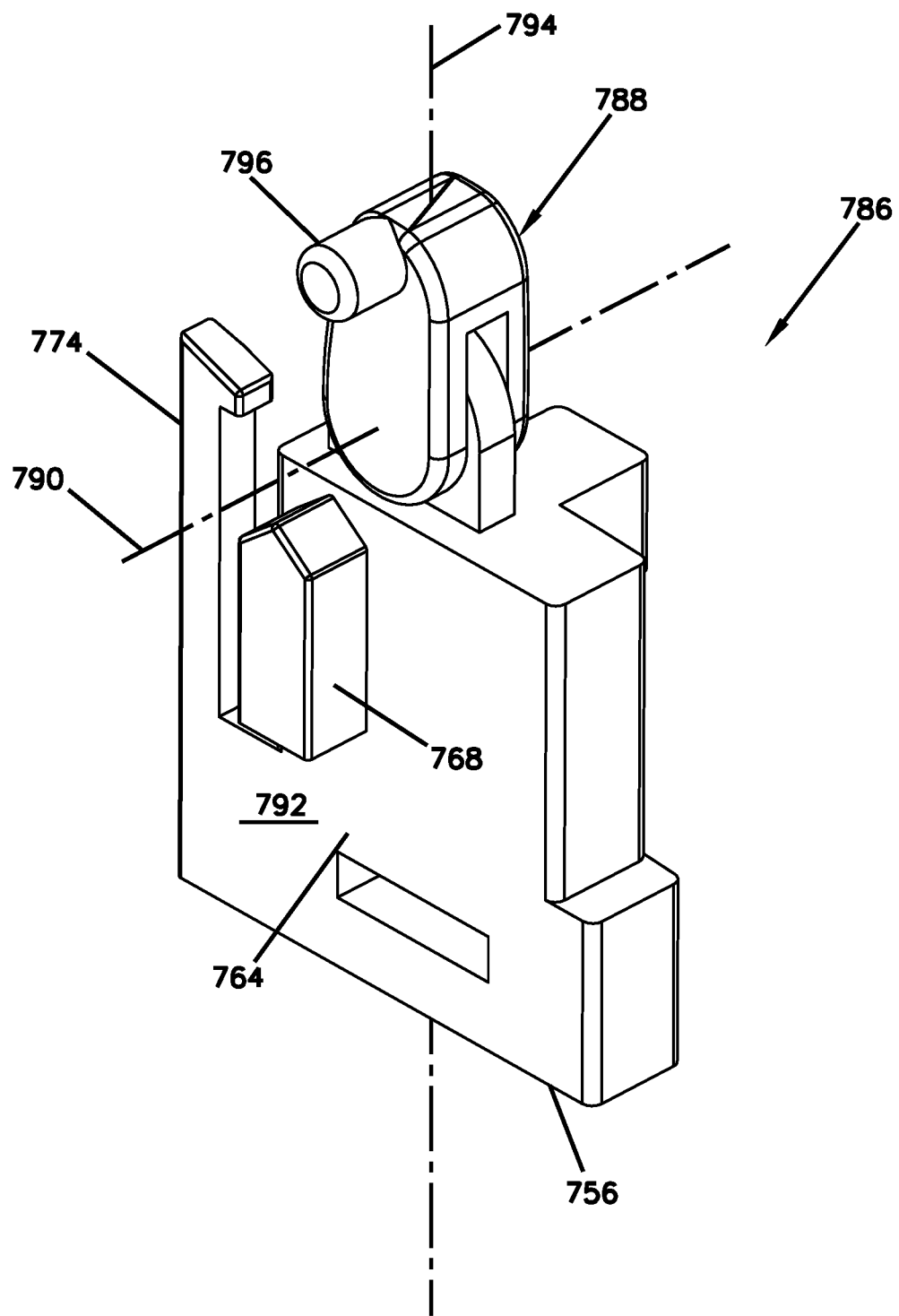
FIG. 92 is a perspective view of a linkage of the arrangement of FIG. 85.
Figure 93:
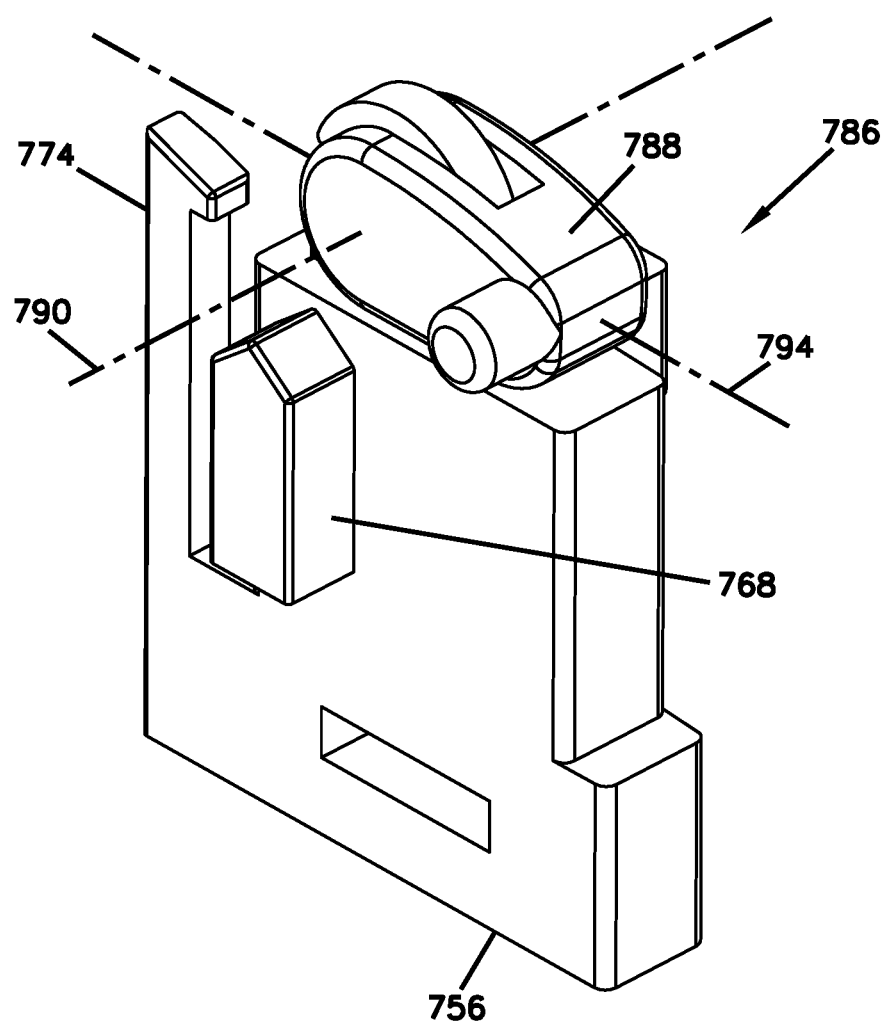
FIG. 93 is another view of the linkage of FIG. 92.

Referring to FIGS. 92 and 93, the assembly prevention arrangement 740 includes a linkage 786 which includes both the slide member 756 and a pivot link 788 pivotally connected to the slide member 756 at a pivot axis 790. The pivot link 788 includes a main link body 792 that pivots about the pivot axis 790 between a first pivot position (see FIGS. 86 and 92) and a second pivot position (see FIGS. 87 and 93) as the slide member is moved between the dome blocking position (see FIG. 86) and the bracket retention position (see FIG. 87). The pivot link 788 is in the first pivot position when the slide member 756 is in the dome blocking position and the pivot link 788 is in the second pivot position when the slide member 756 is in the bracket retention position. The main link body 792 has a lengthwise axis 794 that passes through the pivot axis 790. When the pivot link is in the first pivot position corresponding to the dome blocking position of the slide member 756, the lengthwise axis 794 is parallel to the slide orientation 757 of the slide member 756 such that the pivot link 788 prevents the slide member 756 from being manually moved along the slide orientation 757 by pressing on the slide member 756. In this way, an installer is prevented from pressing the slide member 756 down to allow for installation of the dome 24 on the base prior to the bracket 60 being axially secured within the base 26. The reaction force generated when an installer attempts to press down the slide member 756 passes through the pivot axis 790 in a direction parallel to the lengthwise axis 794 and the slide orientation 757.

Referring still to FIGS. 86, 92, and 93, the pivot link 788 also includes an inwardly projecting pin 796. The pin 796 is positioned such that when the anchoring bracket 60 is rotated from the first rotational position to the second rotational position, the anchoring bracket contacts the inwardly projecting pin 796 causing the pivot link 788 to pivot from the first pivot position toward the second pivot position thereby causing the slide member 756 to move from the dome blocking position toward the anchor bracket retention position. The flange 780 of the arm 782 of the anchoring bracket 60 engages the inwardly projecting pin 796 to initiate movement of the pivot link 788 from the first pivot position toward the second pivot position. The bracket blocking projection 768 of the slide member 756 moves into a position that opposes the stop surface 778 of the flange 780 after the flange 780 has moved past the bracket blocking projection 768 as the anchoring bracket 60 is rotated from the first rotational position toward the second rotational position. FIG. 86 shows the bracket blocking projection 768 offset from the stop surface 778 so as to not obstruct rotational movement of the bracket 60, and FIG. 87 shows the bracket blocking projection 768 in opposition with respect to the stop surface 778. To move the bracket 60 from the second rotational position back to the first rotational position, the slide member 756 can be manually pulled up and the bracket 60 can be rotated from the second rotational position back to the first rotational position. Once the slide member 756 has been manually pulled back to the dome blocking position, the pivot link 788 retains the slide member 756 in the dome blocking position.

Figure 94:
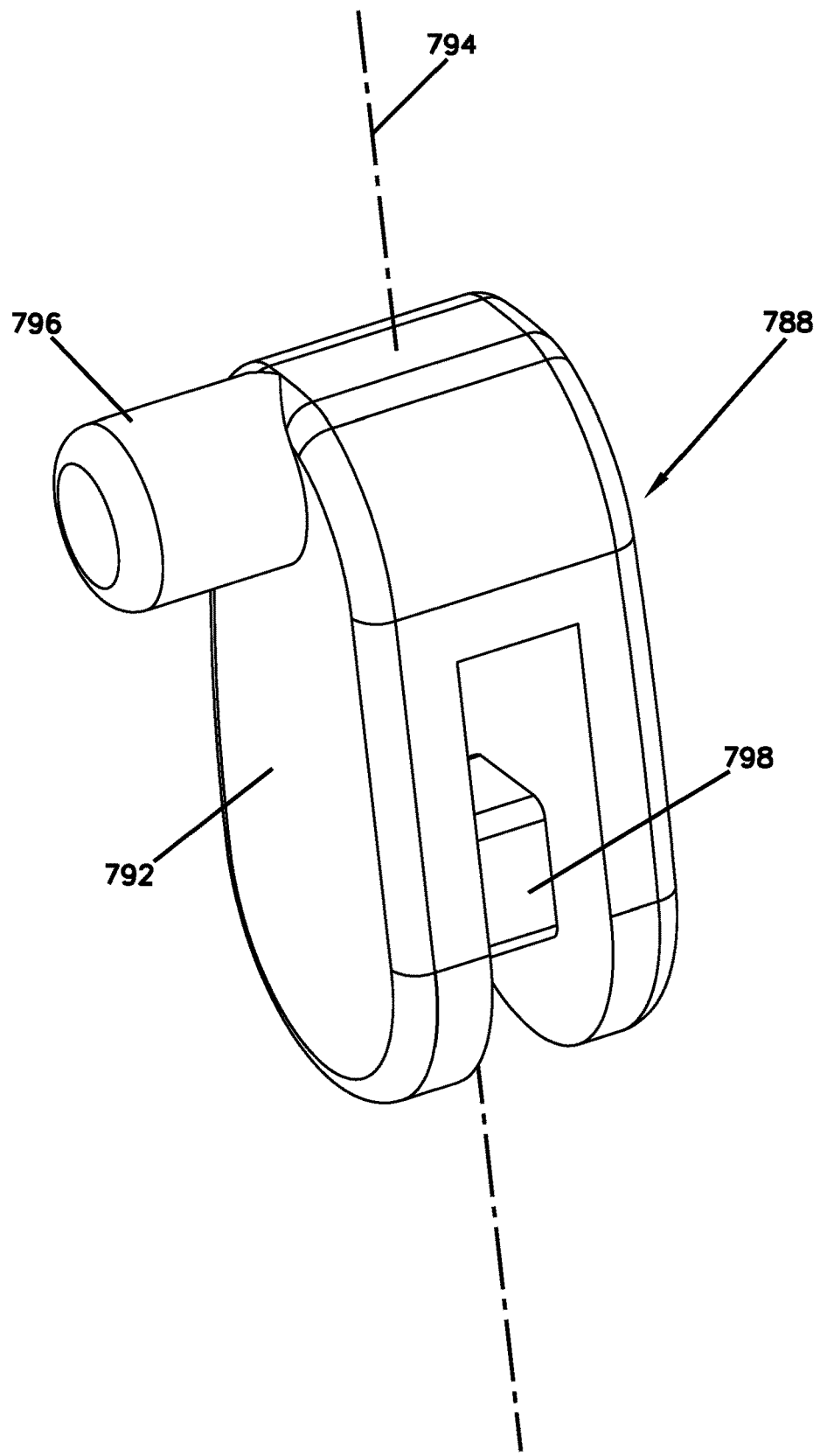
FIG. 94 is a perspective view of a pivot link of the linkage of FIGS. 92 and 93.
Figure 95:
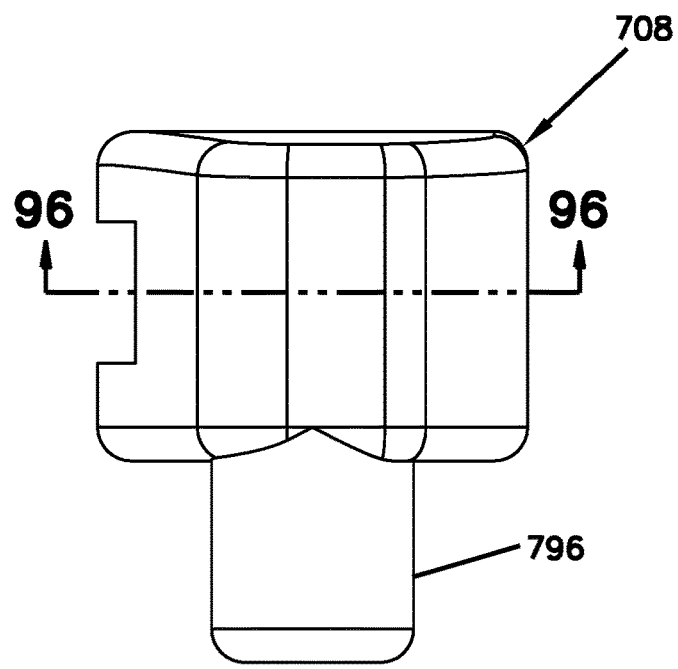
FIG. 95 is a top view of the pivot link of FIG. 94.
Figure 96:
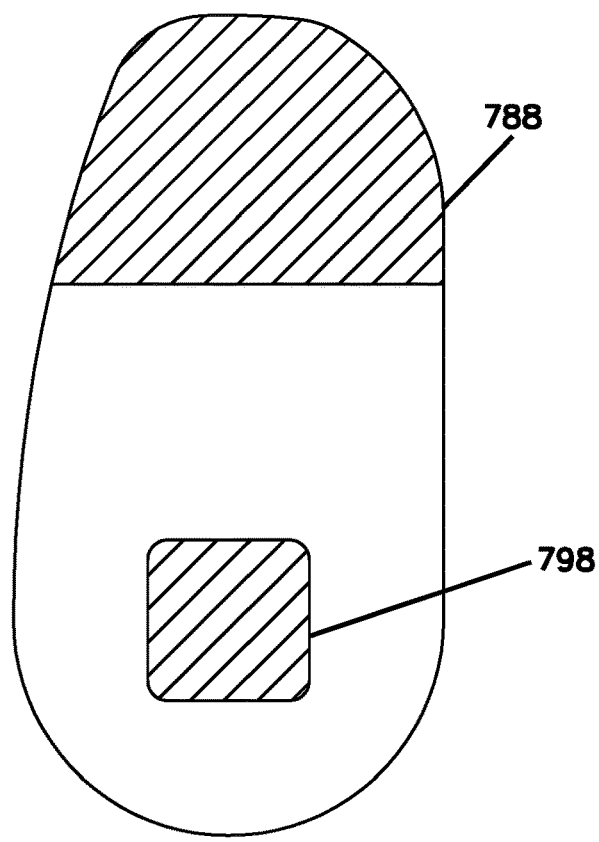
FIG. 96 is a cross-sectional view taken along section line 96-96 of FIG. 95.
Figure 98:
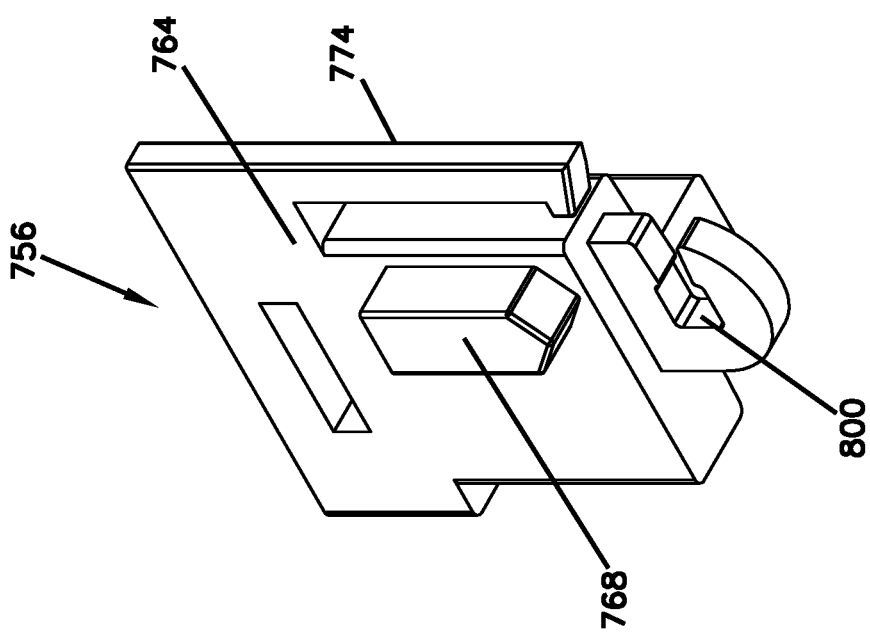
FIG. 98 is another perspective view of the slide member of FIG. 97.
Figure 97:
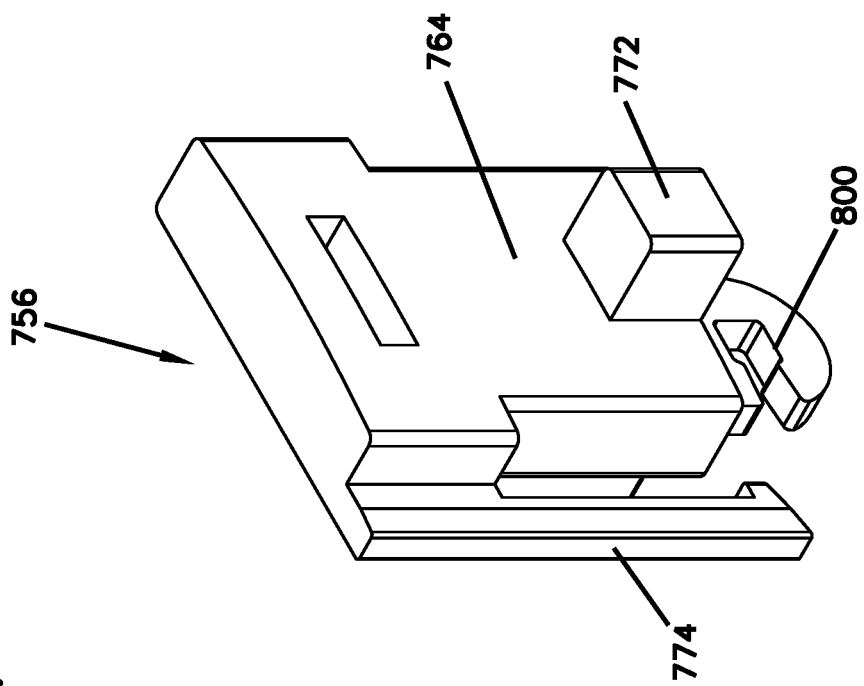
FIG. 97 is a perspective view of a slide member of the linkage of FIGS. 92 and 93.

Referring to FIGS. 94 and 96, the pivot link 788 includes a pivot element 798 through which the pivot axis 790 extends. The pivot element 798 has a polygonal cross-sectional shape. In one example, the polygonal cross-sectional shape is square, but other shapes can be used as well. The slide member 756 has a pivot receiver 800 that receives the pivot element 798. The pivot receiver 800 is best shown at FIGS. 97 and 98. The pivot receiver 800 has a polygonal cross-sectional shape that matches the polygonal cross-sectional shape of the pivot element 798. The pivot element 798 pivots within the pivot receiver 800 when the pivot link 788 is pivoted about the pivot axis 790. The pivot receiver 800 has a resilient construction that elastically deforms or flexes to accommodate pivotal movement between the pivot element 798 and the pivot receiver 800. The matching polygonal cross-sectional shapes of the pivot element 798 and the pivot receiver 800 combined with the resilient, elastic construction of the pivot receiver 800 require a predetermined force to be applied to the pivot link 788 to cause the pivot receiver 800 to elastically flex a sufficient amount to allow the pivot link 788 to be moved from the first pivot position to the second pivot position and vice versa. The pivot receiver 800 retains the pivot link in the first pivot position and the second pivot position until the predetermined force is applied to the linkage so as to overcome the elastic retention force provided by the pivot receiver.

In certain examples, the pivot link 788 pivots about 90 degrees between the first pivot position and the second pivot position. In certain examples, the pivot element 798 and the pivot receiver 800 provide an over-the-center biasing arrangement that elastically biases the pivot link 788 toward the first pivot position when the pivot link 88 is rotationally closer to the first pivot position than the second pivot position and that biases the pivot link 788 toward the second pivot position when the pivot link is rotationally closer to the second pivot position than the first pivot position. In the depicted example, the center position coincides with the pivot link having pivoted about 45 degrees between the first pivot position and the second pivot position.

FIGS. 61-67 show one of the cable anchor unit adapters 64 for receiving a plurality of cable anchor units 62. The adapter 64 includes a rear snap-fit interface 400 including a flexible latch 402 for engaging a mating interface on the bracket 60. The adapter 64 includes receptacles for receiving cable anchors 62. The adapter also include rear reinforcing ribs 404 that fit within slots 406 defined by the pressurization sections 232 of the inner pressurization structure 201.

Figure 72:
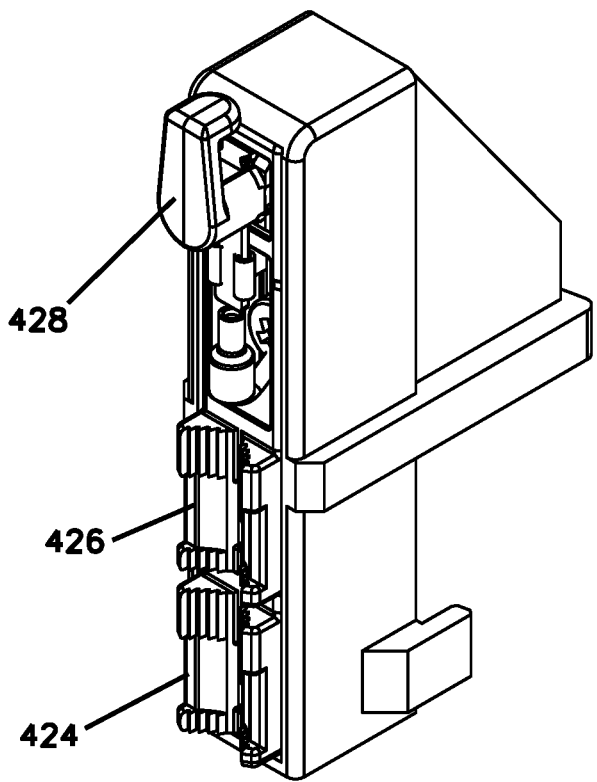
FIG. 72 is a front view showing the cable anchor of FIG. 68 mounted within an adapter.
Figure 73:
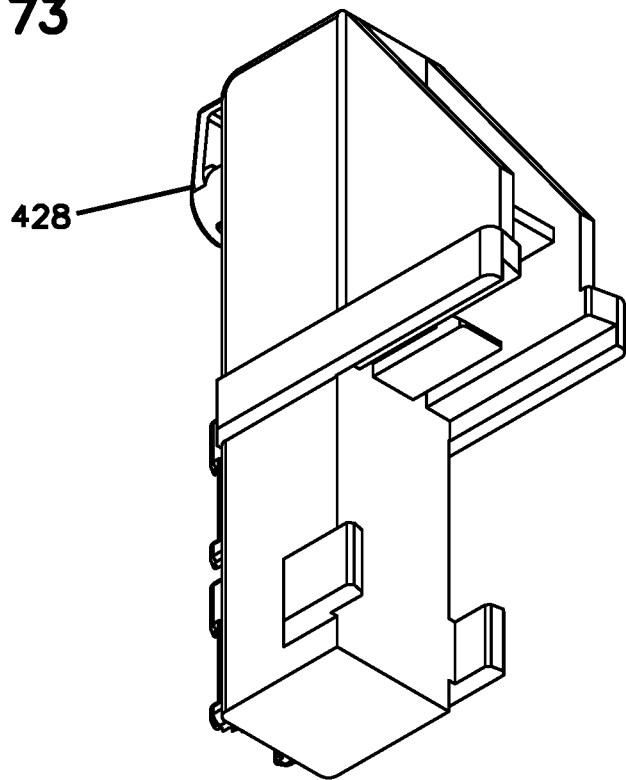
FIG. 73 is a rear view of the adapter of FIG. 72.
Figure 74:
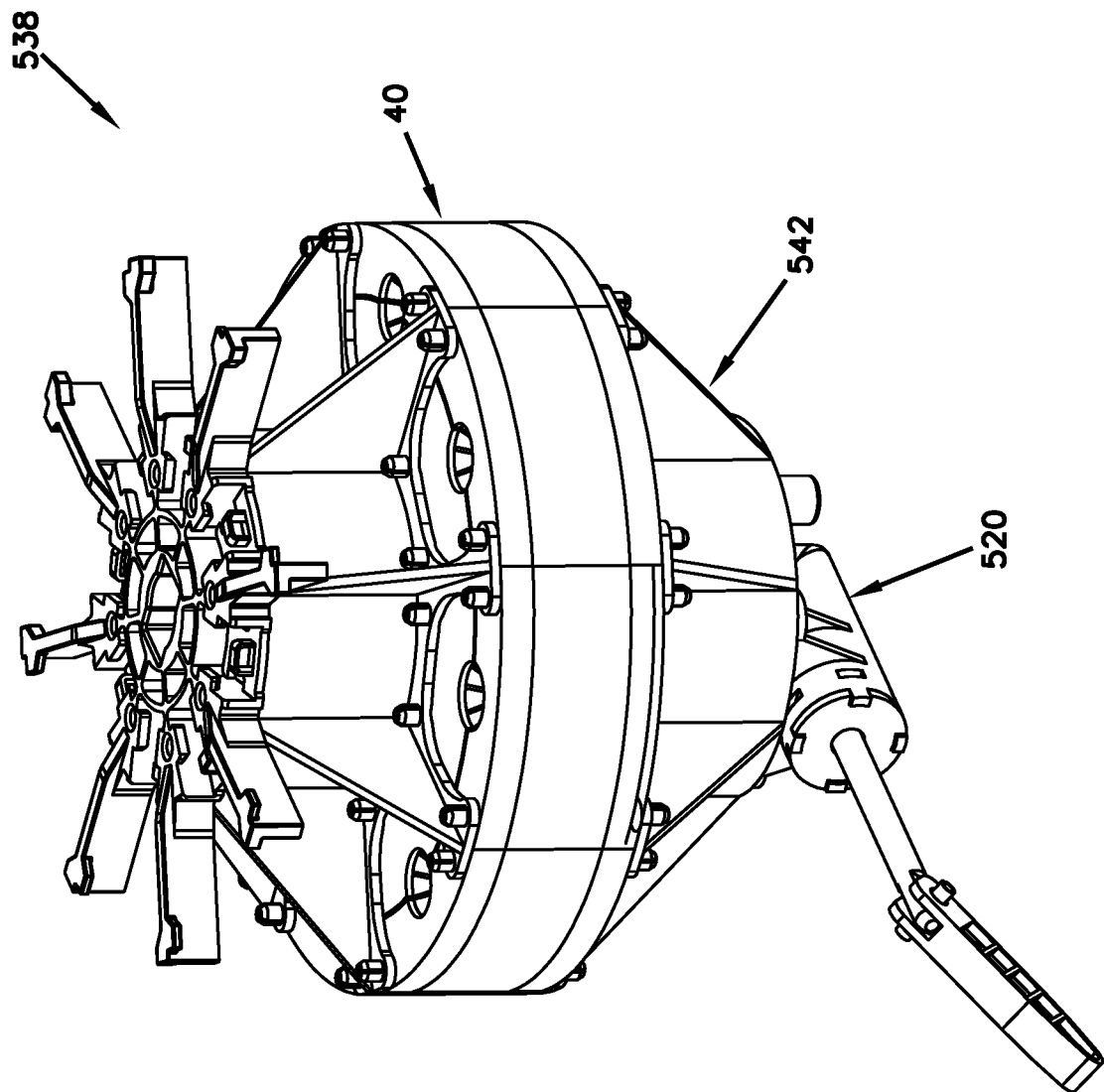
FIG. 74 illustrates another gel sealing unit in accordance with the principles of the present disclosure that can be used with a telecommunications enclosure such as the enclosure of FIG. 1.
Figure 75:
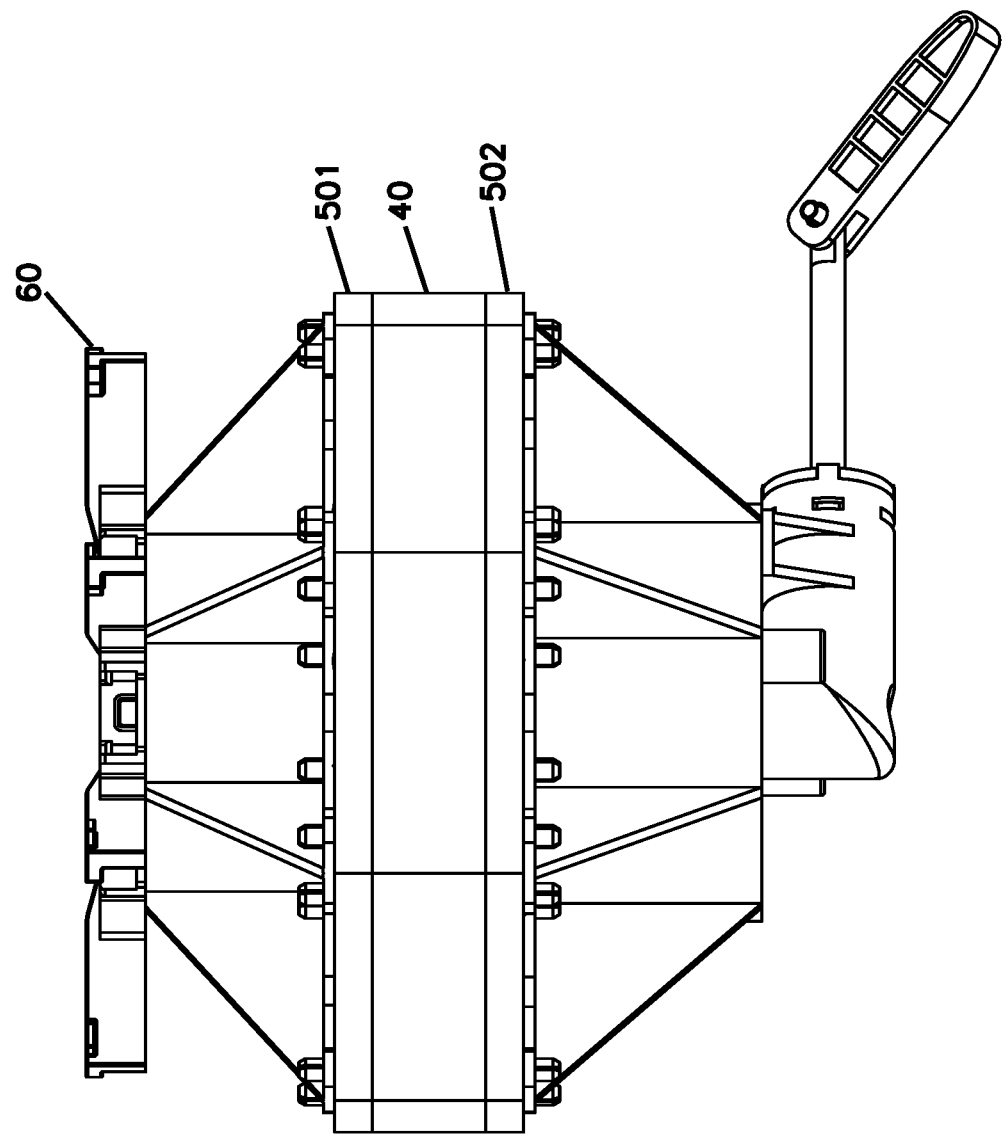
FIG. 75 is a side view of the gel sealing unit of FIG. 74.
Figure 76:
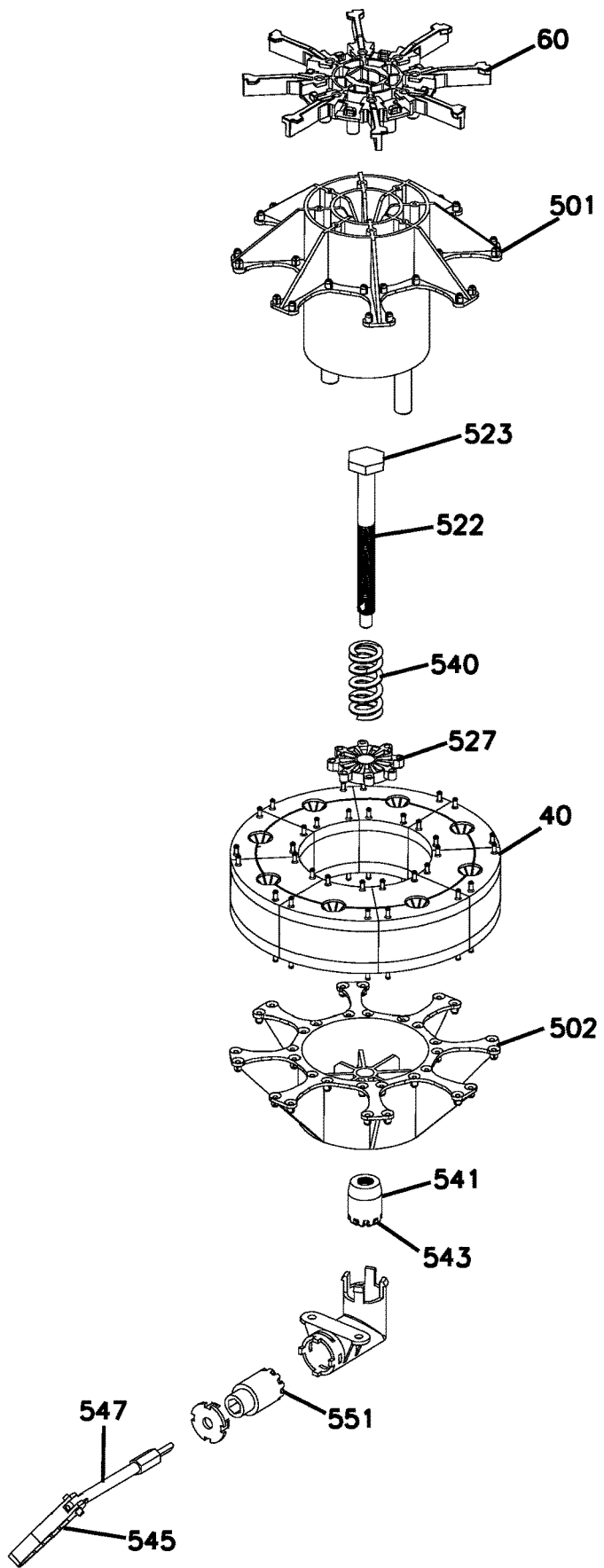
FIG. 76 is an exploded view of the gel sealing unit if FIG. 74.
Figure 77:
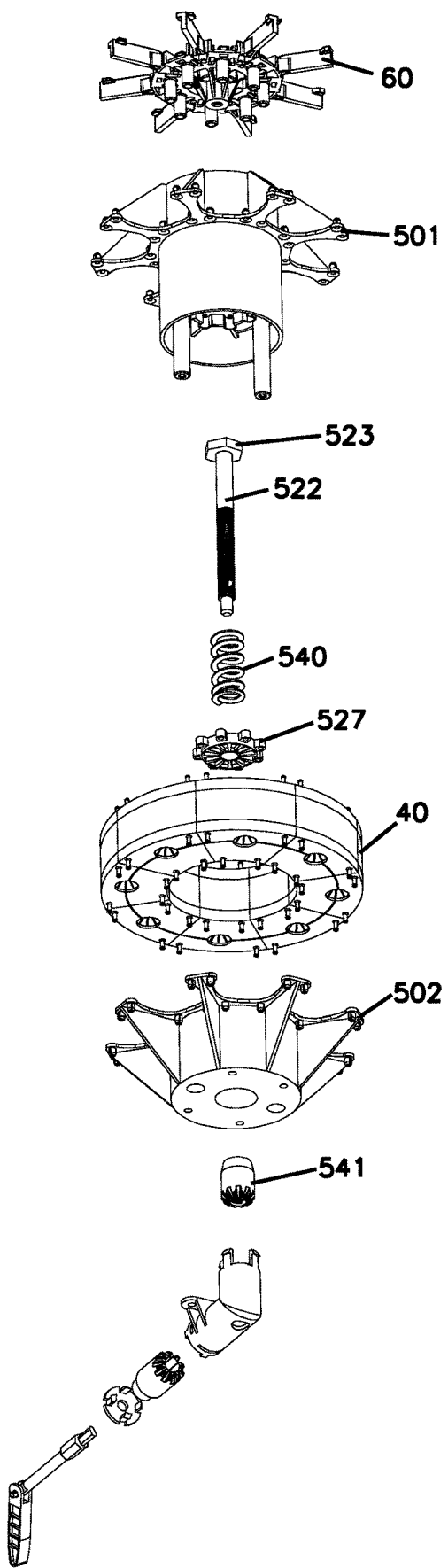
FIG. 77 is another exploded view of the gel sealing unit of FIG. 74.
Figure 78:
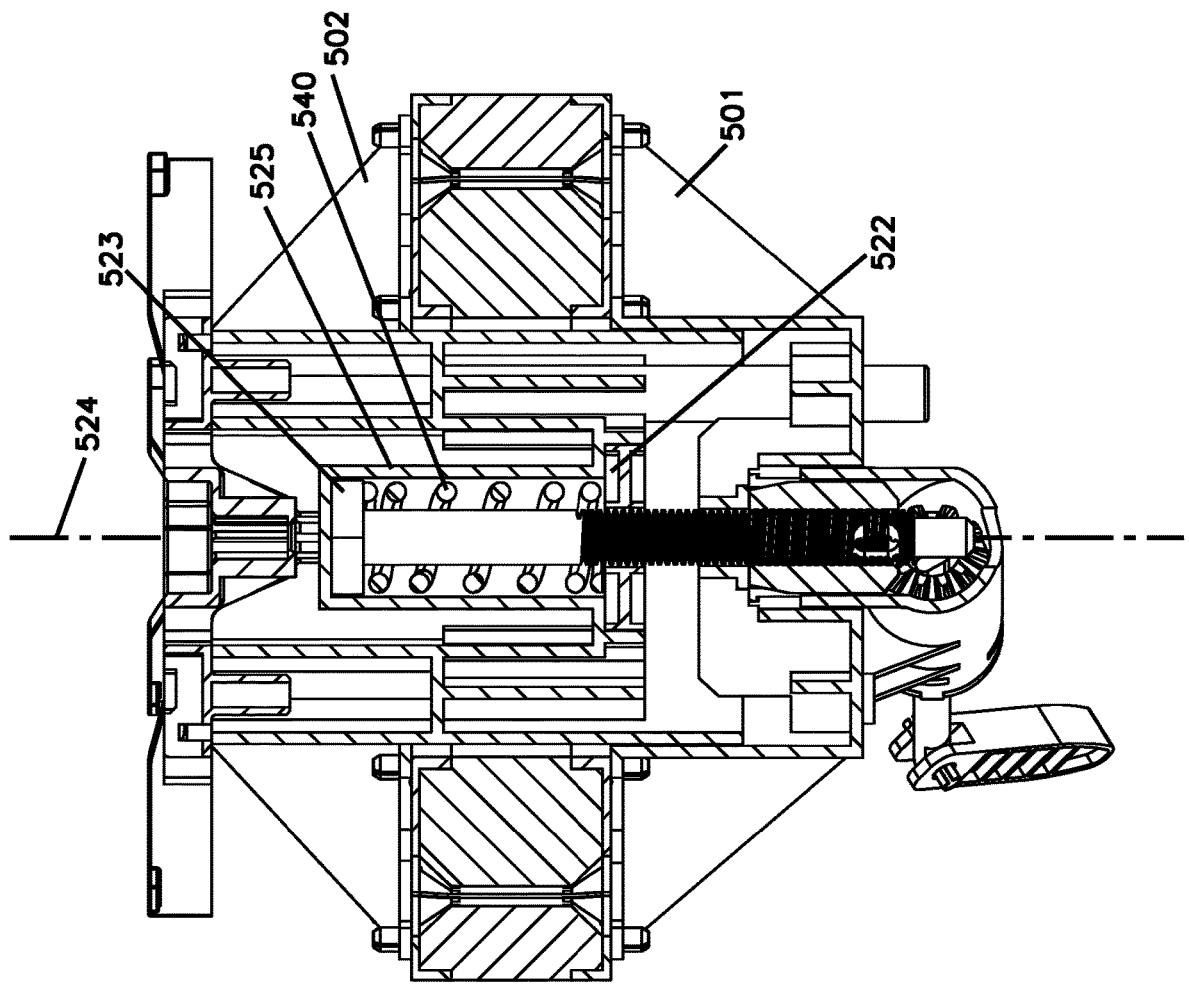
FIG. 78 is a cross-sectional view of the gel sealing unit of FIG. 74.
Figure 79:
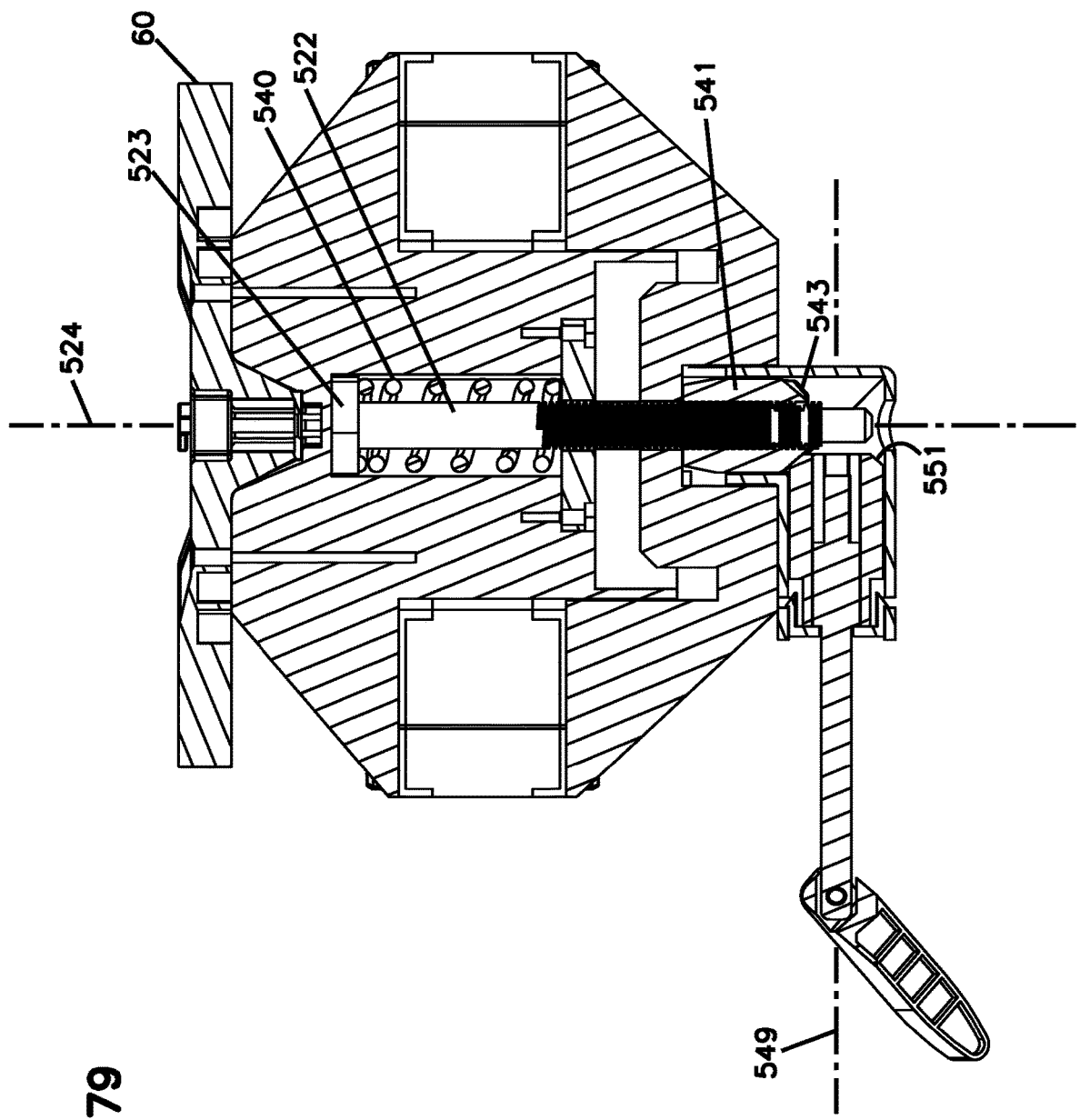
FIG. 79 is another cross-sectional view of the gel sealing unit of FIG. 74.

FIG. 68-71 show an example cable anchoring unit 420 including a rectangular main body 422, a first cradle 424 for clamping a cable jacket with a metal band, a second cradle 426 for clamping a cable shield with a metal band, a strength member or conductor anchor 428 for wrapping aramid yarn of a cable or for securing a rigid member such as a metal member or a glass reinforced polymer rod. An electrical contact 430 is provided at the anchor 428 for grounding purposes. The contact is connected to a grounding screw 432. A cable shield secured at the second cradle 426 can also be connected to the grounding screw, which is between the cradle 426 and the anchor 428. Strap tighteners 434 can be provided within the cradles 424, 426 for receiving the ends of straps inserted though slits 436 in the cradles 424, 426. Fasteners 438 secure the ends of the straps in slots 440 in the tighteners 434. Fasteners 442 move the tighteners downwardly away from the cradles to tighten the straps. The anchoring unit 420 can be secured to a bracket or other structure via an intermediate adapter or other structure that may include snap-fit features. FIGS. 72 and 73 show an alternative cable anchoring unit which is the same as the cable anchoring unit 420, except a rear side of the main body has been equipped with an integrated snap-fit structure for attaching the cable anchoring unit directly to an anchor bracket or other structure without the need for an adapter. The snap-fit structure can include a snap-fit latch, tab, arm or like structure. The rear interface can also include stabilization ribs that can engage an anchoring bracket or a pressurization structure (e.g., the ribs can fit within slots in the inner pressurization structure such as slots 406 defined by the pressurization sections 232 of the inner pressurization structure 201).

Figure 100:
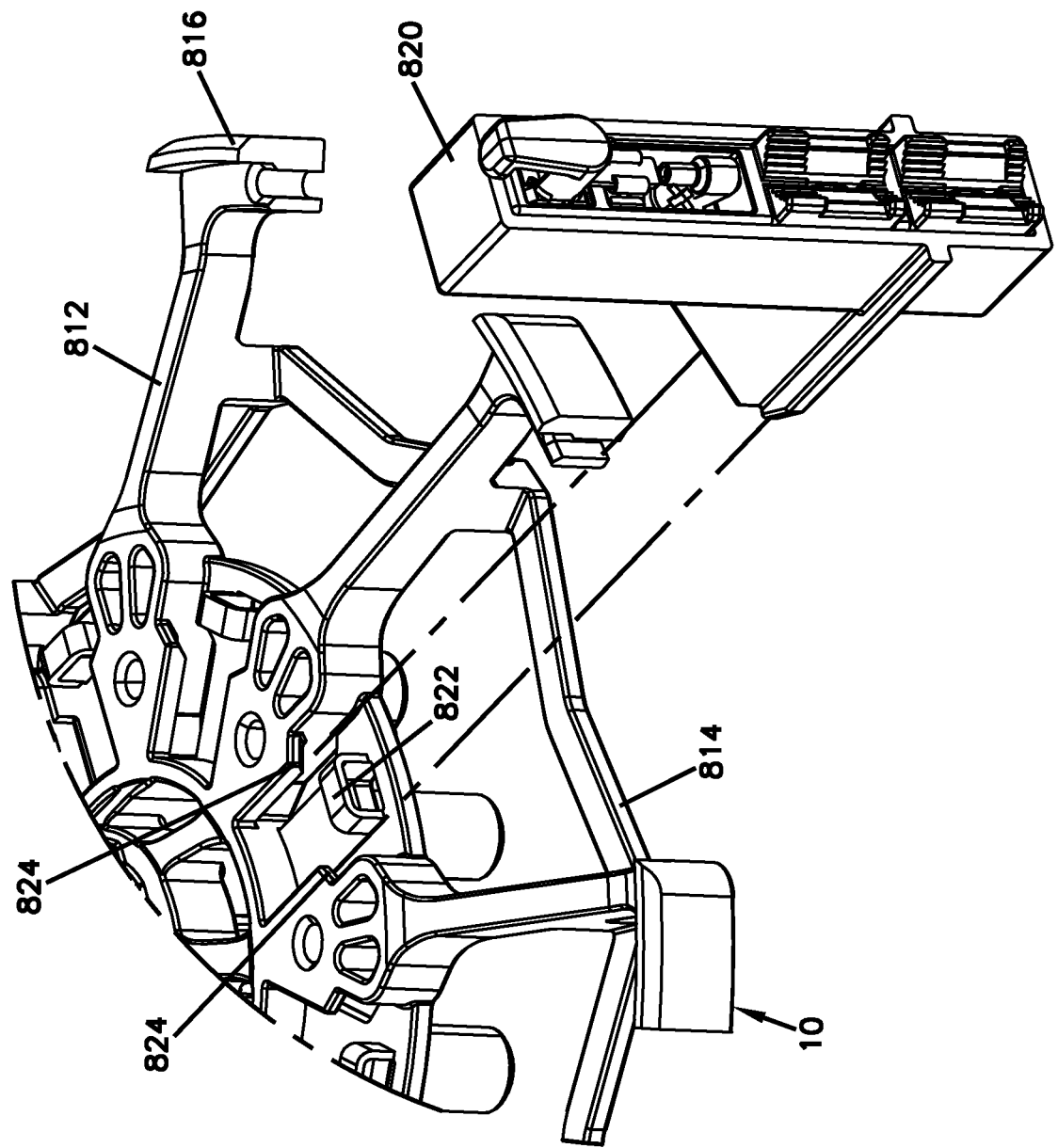
FIG. 100 is an enlarged view of a portion of FIG. 99.
Figure 101:
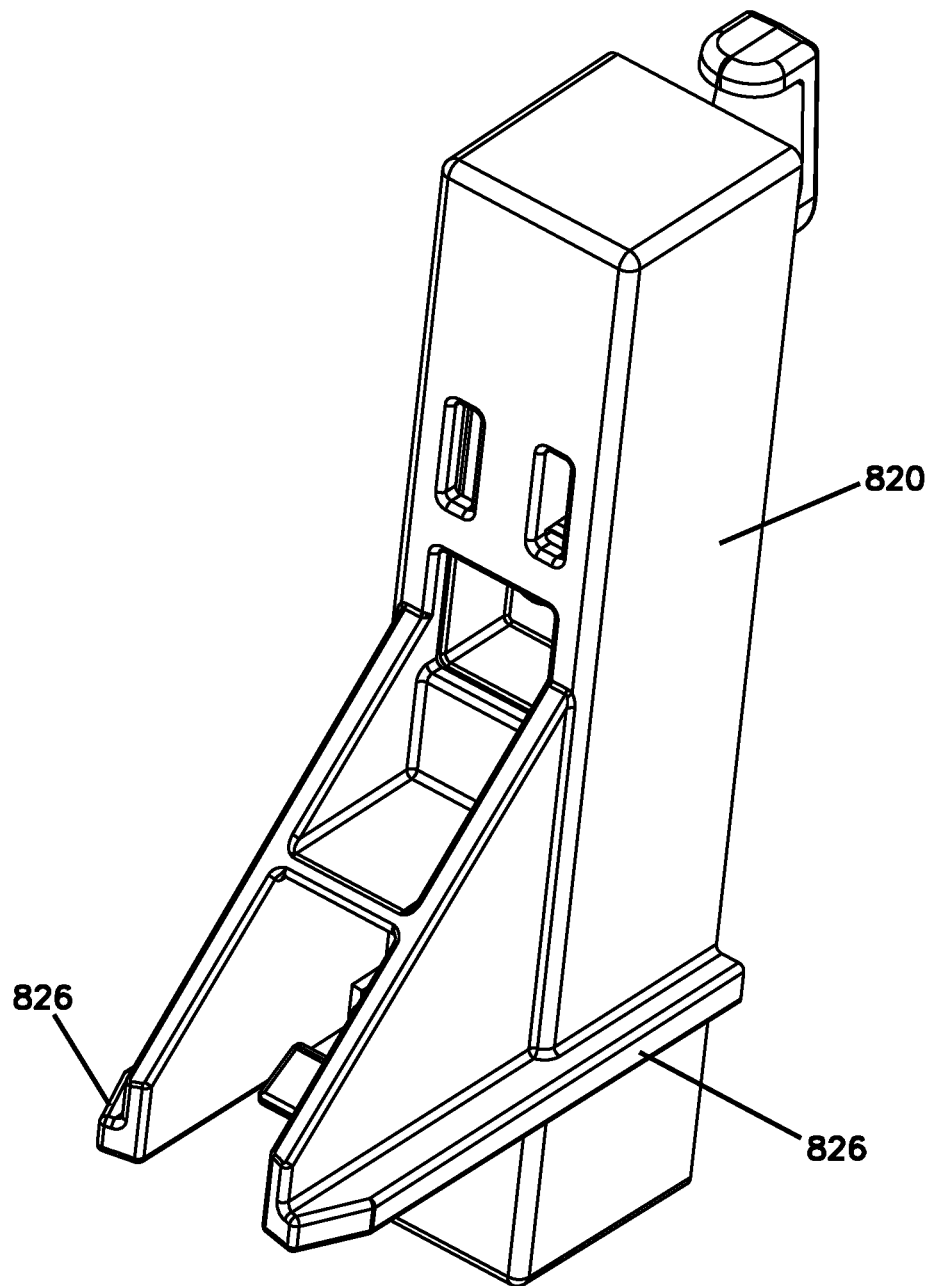
FIG. 101 is a rear view of the cable anchoring unit shown in FIGS. 99 and 100.
Figure 102:
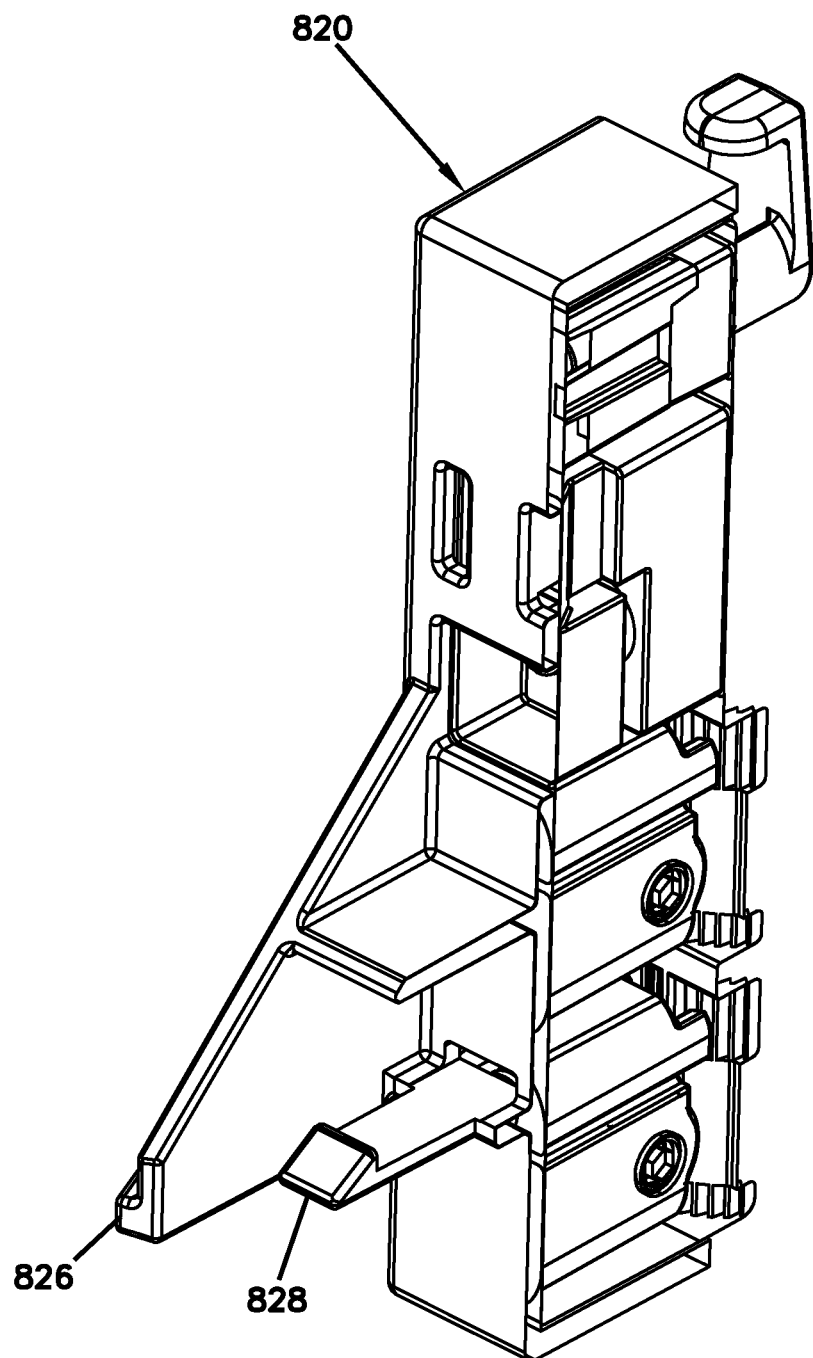
FIG. 102 is a cross-sectional view cut lengthwise through the cable anchoring unit of FIG. 101.

FIGS. 99 and 100 show a configuration where cable anchoring units or cable anchoring unit adapters can be mounted directly to the anchoring bracket at a position completely above the gel sealing unit 38. Preferably, the cable anchoring unit adapters and/or the anchoring units do not engage any portion of the gel sealing unit 38 and are instead secured to and stabilized by the bracket alone. In a preferred example, the cable anchoring units and/or the cable anchoring unit adapters are secured to a hub of the bracket by an interface that includes: a) a groove and rail configuration for stabilizing the cable anchoring device relative to the bracket and for allowing the cable anchoring device to be loaded into the bracket by radially inserting the cable anchoring device into the bracket; and b) a snap-fit connection for releasably retaining the cable anchoring device in an inserted position relative to the bracket. As shown at FIG. 99, a bracket 1060 is shown having a hub 810 and a plurality of radial arms 812 that project radially outwardly from the hub 810. The bracket 1060 also includes a reinforcing ring 814 that couples to the arms 812 at an intermediate location between the hub 810 and outer ends 816 of the radial arms 812. Cable anchoring devices 820 of the type previously described herein are mounted at an upper side of the hub. The mounting locations are located circumferentially between the arms 812 and are provided at the hub 810. Each of the mounting locations can include a snap-fit catch 822 and stabilizing grooves 824. As shown at FIGS. 101 and 102, the cable anchoring device 820 can include rails 826 that fit within the grooves 824 for stabilization, and a snap-fit latch 828 between the rails 826 that fits within the snap-fit catch 822.

FIGS. 74-79 show another gel sealing unit 538 that can be used with an enclosure such as the enclosure of FIG. 1. The gel sealing unit 538 includes the gel sealing block 40 an actuator 542 capable of applying compressive load to the gel sealing block during sealing. The actuator 542 includes inner and outer pressurizations structures 501, 502 between which the gel sealing block 40 mounts. The actuator 542 includes a trigger arrangement 520 for transferring compressive load to the pressurization structures. The trigger arrangement 520 includes a threaded first shaft 522 that extends along a first axis 524 along which the outer pressurization structure 502 can axially move to apply the compressive load to the gel sealing block 40. The threaded first shaft 522 including a head 523 that mounts within a pocket 525 defined by the inner pressurization structure 501. The head 523 is axially slidable within the pocket 525 along the first axis 524 relative to the inner pressurization structure 501, but is prevented from rotating relative to the inner pressurization structure 501 about the first axis 514 (e.g., by one or more opposing flats or other ant-rotation features). The trigger arrangement 520 also including a spring 540 mounted on the threaded first shaft 522 and captured between the head 523 of the threaded first shaft 522 and a spring stop 527 that is axially fixed relative to the inner pressurization structure 501. The threaded first shaft 522 extends through the spring stop 527 and is rotatable relative to the spring stop 527 without threadingly engaging the spring stop 527.

The trigger arrangement 520 also includes a nut 541 threaded on the threaded first shaft 522. The nut 541 is rotatable relative to the outer pressurization structure 502 while also being axially fixed relative to the outer pressurization structure 502 such that the outer pressurization structure 502 is carried with the nut 541 axially along the first axis 524 when the nut 541 is threaded on the threaded first shaft 522. The trigger arrangement 520 further including a first bevel gear 543 integrated with or coupled to the nut 541. The trigger arrangement 520 also including a handle 545 mounted on a second shaft 547 that extends along a second axis 549 angled relative to the first axis 524. The second shaft 547 is coupled to a second bevel gear 551 that intermeshes with the first bevel gear 543 such that when the handle 545 is turned about the second axis 549 the second bevel gear 551 turns the nut 541 about the threaded first shaft 522 causing axial movement of the nut 541 and the outer pressurization structure 502 relative to the first threaded shaft 522.

When the nut 541 is threaded in a first rotational direction about the shaft 522, the shaft 522 is moved axially in a first direction along the first axis 524 relative to the nut 541 and the outer pressurization structure 502 causing the head 523 of the shaft 522 to slide axially within the pocket 525 of the inner pressurization structure 502 in the first direction along the first axis 524 toward the spring stop 527 causing the spring 540 to be compressed between the head 523 and the spring stop 527 which causes the threaded first shaft 522 to be placed in tension such that spring compression load is axially applied to the gel sealing block 40 between the inner and outer pressurization structures 501, 502. The angled configuration of the handle allows the handle to be readily accessed even if the gel block is densely packed with cables.

The gel sealing block 40 is preferably coupled to the inner and outer pressurization structures 501, 502 by a coupling of the type described above that allows the inner and outer pressurization structures 50, 502 to apply a tension load to the gel sealing block 40. When the nut 541 is threaded in a second rotational direction about the shaft 522, the shaft 522 is moved axially in a second direction along the first axis 524 relative to the nut 541 and the outer pressurizations structure 502 causing the head 523 of the shaft 522 to slide axially within the pocket 525 of the inner pressurization structure 501 in the second direction along the first axis 524 away from the spring stop 527 as the spring is de-compressed. Continued threading of the nut 541 in the second direction causes the head 523 to engage a positive stop (e.g., a blind end of the pocket 525) of the inner pressurization structure 501 thereby causing the inner and outer pressurization structures 501, 502 to be positively moved apart by the trigger arrangement 520 such that tension is applied to the gel sealing block 40.

Figure 80B:
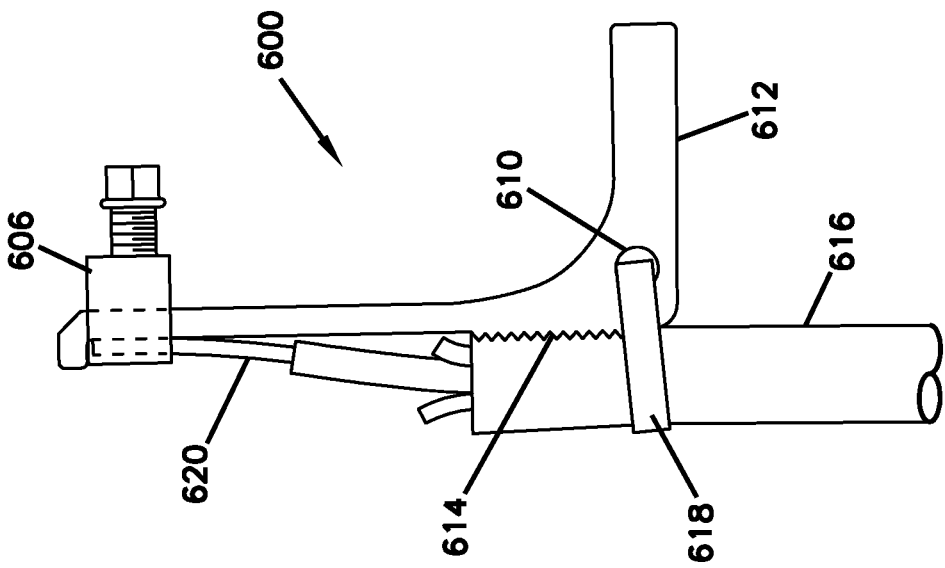
FIG. 80B shows the cable anchor of FIG. 80B in a second pivotal position.
Figure 80A:
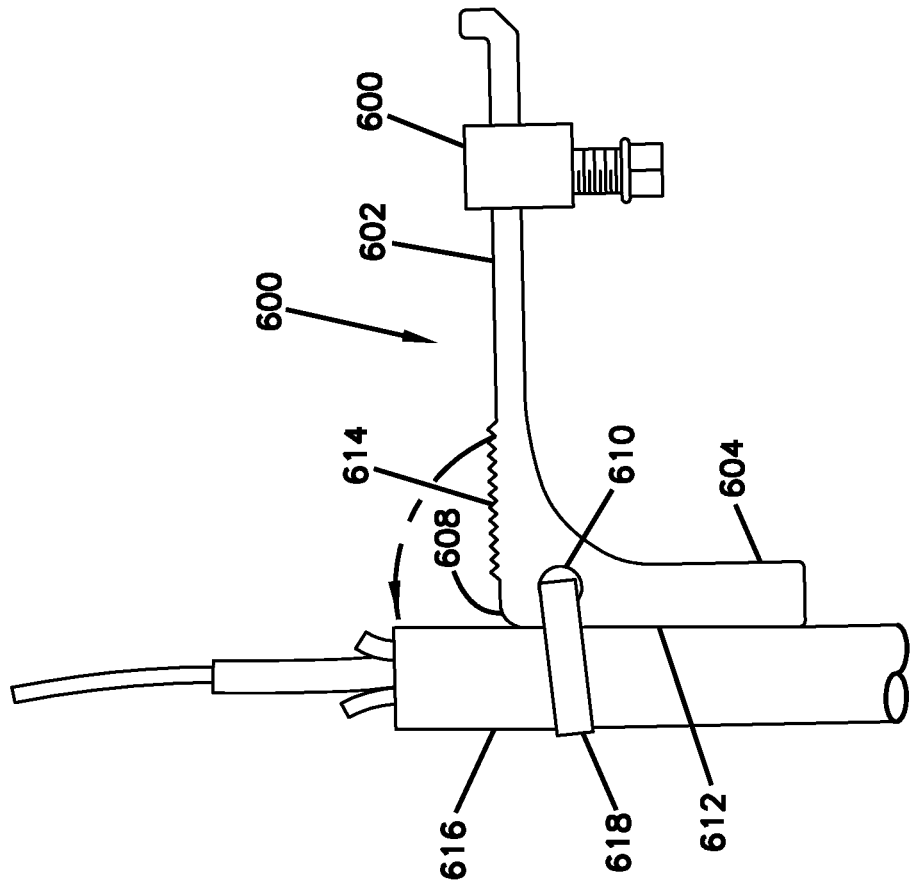
FIG. 80A shows another cable anchor in accordance with the principles of the present disclosure in a first pivotal position.

FIGS. 80A and 80B show another cable anchoring unit 600 that can be attached to a bracket such as the bracket 60 or used in other applications. The anchoring unit 600 includes a member having first leg 602 angled relative to a second leg 604. A strength member fastening element 606 is mounted on the first leg 602. A cam surface 608 is provided at a transition between the first and second legs 602, 604. A cable tie opening 610 is defined though the member. The opening 610 is closer to a surface 612 of the second leg 604 than a surface 614 of the first leg 602. In use, the surface 612 of the second leg 604 is placed against a cable 616 and a cable tie 618 is wrapped in a loop about the cable 616 and through the opening 610. Once the tie 618 is in place, the member is pivoted to a position where the surface 614 is placed against the cable. In the second position the opening 610 is further from the cable than when the anchor was in the first pivotal position. Thus, pivoting the member from the first position to the second position causes tightening of the tie 618. With the member in the second position, a strength member 620 of the cable 616 can be secured to the first leg 602 by the fastening element 606.

EXAMPLES

Illustrative examples of devices, arrangements, systems, and methods of the present disclosure are provided below.

Example 1. An enclosure including: a housing including a gel-block mounting sleeve; a gel sealing unit including: a gel sealing block that mounts within the gel-block mounting sleeve; and an actuator capable of applying compressive load to the gel sealing block during sealing, and capable of applying tensile load to the gel sealing block to facilitate removal of the gel sealing block from the gel-block mounting sleeve.

Example 2. The enclosure of Example 1, wherein the actuator includes at least one spring for applying the compressive load to the gel sealing block in the form of compressive spring pressure.

Example 3. The enclosure of Example 2, wherein the actuator includes pressurization structures between which the gel sealing block mounts, wherein the gel sealing block is pressurized between the pressurization structures during sealing, wherein the gel sealing block is coupled to the pressurization structures by a coupling interface that allows the pressurization structures to apply tension to the gel sealing block prior to removal of the gel sealing block from the gel-block mounting sleeve, and wherein during tensioning positioning of the pressurization structures is absolutely controlled by a trigger arrangement of the actuator without influence from the at least one spring.

Example 4. The enclosure of Example 3, wherein the trigger arrangement applies compressive load for forcing the pressurization structures together through the at least one spring and positively engages the pressurization structures during tensioning such that axial movement of a threaded component of the trigger arrangement is converted into an equal axial increase in a spacing between the pressurization structures.

Example 5. The enclosure of Example 4, wherein the trigger arrangement engages one or more positive stops during tensioning.

Example 6. The enclosure of Example 3, wherein the gel block includes a plurality of individual gel sealing modules that cooperate to define the gel block.

Example 7. The enclosure of Example 6, wherein the gel sealing modules are attached to the pressurization structures by snap-fit connections capable of transferring tensile load from the pressurization structures to the gel sealing modules.

Example 8. The enclosure of Example 7, wherein the snap-fit connections are made by snap-fit interface components which snap together in an axial orientation.

Example 9. The enclosure of Example 8, wherein the snap-fit interface components include posts and snap-fit collars.

Example 10. The enclosure of Example 6, wherein the gel sealing modules are individually and separately removable from between the pressurization structures and at least a plurality of the removable gel sealing modules are cable sealing modules each including:
- at least first and second gel portions that meet at a separable interface at which at least one cable port is defined, the first and second gel portions being capable of being separated from one another at least when the cable sealing module is not between the pressurization structures to allow a cable to be laterally inserted into the cable port; and
- end caps between which the cable port extends, the end caps each including first end cap portions attached to opposite ends of the first gel portion and second end cap portions attached to opposite ends of the second gel portion, the first and second end cap portions separating from one another when the first and second gel portions are separated from one another.

Example 11. The enclosure of Example 10, wherein the end caps include snap-fit structures for coupling in a snap-fit connection with the pressurization structures.

Example 12. The enclosure of Example 1, wherein the housing includes a dome coupled to a base, and wherein the gel-block mounting sleeve is defined within the base.

Example 13. The enclosure of Example 12, wherein the base includes a first end that couples to the dome and an opposite second end, and wherein the gel sealing block can be inserted into the gel-block mounting sleeve through the second end of the base.

Example 14. The enclosure of Example 13, wherein the pressurization structures include inner and outer pressurization structures, wherein the inner pressurization structure is coupled to an anchoring bracket that is carried with the inner pressurization structure when the gel sealing block is inserted into and removed from the base, wherein the anchoring bracket can be axially inserted into the base with the gel sealing block when in a first rotational position relative to the base, and wherein once the gel sealing block and the anchoring bracket have been inserted into the base, the gel sealing block and the anchoring bracket can be rotated relative to the base to a second rotational position where the anchoring bracket is axially fixed within the base.

Example 15. The enclosure of Example 14, wherein the anchoring bracket is prevented from rotating from the second rotational position back to the first rotational position by a fastener, or a snap-fit structure, or a clip, or a latch.

Example 16. The enclosure of Example 14, wherein the gel sealing modules are attached to the inner and outer pressurization structures by intermating rails and grooves capable of transferring tensile load from the pressurization structures to the gel sealing modules.

Example 17. The enclosure of Example 16, wherein the actuator includes a central axis along which relative movement is generated between the pressurization structures to pressurize the gel sealing modules, the gel sealing modules being loaded between the pressurization structures by inserting the gel sealing modules in a radial direction relative to the axis, wherein the rail and grooves slideably engage one another as the gel sealing modules are loaded between the pressurization structures.

Example 18. The method of Example 17, wherein the gel sealing modules each have a truncated wedge shape formed by opposite sides that converge as the opposite sides extend from a major end to a minor end of the gel sealing module, wherein the minor ends have concave curvatures and the major ends have convex curvatures, wherein the sides of adjacent gel sealing modules seal relative to one another, and wherein the major ends of the gel sealing modules are adapted to seal against an interior of the gel-block mounting sleeve when the gel-block is pressurized therein.

Example 19. The method of Example 18, wherein each of the gel sealing modules includes two flexible latches for preventing gel sealing modules from being radially withdrawn from between the pressurization structures, wherein the latches engage catches coupled to at least one of the pressurization structures, wherein the latches are located at the major ends of the gel sealing modules adjacent the opposite sides of the gel sealing modules, and wherein the latches of a given one of the gel sealing modules can be manually pressed toward each other to disengage the latches from the catches.

Example 20. A method for removing a gel block from a gel-block mounting sleeve of a housing, the gel block being moved along an axis relative to the gel-block mounting sleeve during removal of the gel block from the gel-block mounting sleeve, the method comprising:
- placing gel of the gel block in axial tension along the axis while the gel block is in the gel block mounting sleeve to at least partially break or reduce adhesion between a radially outwardly facing surface of the gel and a radially inwardly facing surface of the gel-block mounting sleeve; and
- removing the gel block from the gel-block mounting sleeve by moving the gel block along the axis relative to the gel-block mounting sleeve after the gel has been placed in tension.

Example 21. The method of Example 20, wherein the gel is maintained in tension as the gel block is removed from the gel-block mounting sleeve.

Example 22. The method of Example 20 or 21, wherein the gel is placed in tension by an actuator that is also used to apply axial compressive load to the gel to enhance sealing of the gel within the gel-mounting sleeve.

Example 23. The method of Example 22, wherein the actuator includes at least one spring for applying the axial compressive load to the gel in the form of compressive spring pressure.

Example 24. The method of any of Examples 20-23, wherein the gel defines at least one axially extending cable sealing port.

Example 25. The method of any of Examples 20-23, wherein the gel defines a plurality of axially extending cable ports.

Example 26. The method of any of Examples 20-25, wherein the gel block includes a plurality of individual gel sealing modules that cooperate to define the gel block.

Example 27. The method of Example 26, wherein the actuator includes inner and outer pressurization structures between which the gel block is pressurized during sealing.

Example 28. The method of Example 27, wherein the gel sealing modules are attached to the inner and outer pressurization structures by snap-fit connections capable of transferring tensile load from the pressurization structures to the gel sealing modules.

Example 29. The method of Example 28, wherein the snap-fit connections are made by snap-fit interface components which snap together in an axial orientation.

Example 30. The method of Example 29, wherein the snap-fit interface components include posts and snap-fit collars.

Example 31. The method of Example 28, wherein the gel sealing modules are individually and separately removable from between the inner and outer pressurization structures and at least a plurality of the removable gel sealing modules are cable sealing modules each including:
  at least first and second gel portions that meet at a separable interface at which at least one cable port is defined, the first and second gel portions being capable of being separated from one another at least when the cable sealing module is not between the inner and outer pressurization structures to allow a cable to be laterally inserted into the cable port; and
  end caps between which the cable port extends, the end caps each including first end cap portions attached to opposite ends of the first gel portion and second end cap portions attached to opposite ends of the second gel portion, the first and second end cap portions separating from one another when the first and second gel portions are separated from one another.

Example 32. The method of Example 31, wherein the end caps include snap-fit structures for coupling in a snap-fit connection with the inner and outer pressurization structures.

Example 33. The method of Example 32, wherein the snap-fit structures include axially extending pins with enlarged heads that are received within snap-fit collars carried with the inner and outer pressurization structures.

Example 34. The method of Example 27, wherein the gel sealing modules are attached to the inner and outer pressurization structures by intermating rails and grooves capable of transferring tensile load from the pressurization structures to the gel sealing modules.

Example 35. The method of Example 34, wherein the actuator includes a central axis along which relative movement is generated between the inner and outer pressurization structures to pressurize the gel sealing modules, the gel sealing modules being loaded between the inner and outer pressurization structures by inserting the gel sealing modules in a radial direction relative to the axis, wherein the rail and grooves slideably engage one another as the gel sealing modules are loaded between the inner and outer pressurization structures.

Example 36. The method of Example 35, wherein the gel sealing modules each have a truncated wedge shape formed by opposite sides that converge as the opposite sides extend from a major end to a minor end of the gel sealing module, wherein the minor ends have concave curvatures and the major ends have convex curvatures, wherein the sides of adjacent gel sealing modules seal relative to one another, and wherein the major ends of the gel sealing modules form the radially outwardly facing surface of the gel of the gel block.

Example 37. The method of Example 36, wherein each of the gel sealing modules includes two flexible latches for preventing gel sealing modules from being radially withdrawn from between the inner and outer pressurization structures, wherein the latches engage catches coupled to either the inner or the outer pressurization structure, wherein the latches are located at the major ends of the gel sealing modules adjacent the opposite sides of the gel sealing modules, and wherein the latches of a given one of the gel sealing modules can be manually pressed toward each other to disengage the latches from the catches.

Example 38. An enclosure comprising:
  a housing including a dome coupled to a base, the base including a first end that couples to the dome and an opposite second end, the base defining a gel-block mounting sleeve;
  a gel sealing unit including:
    a gel sealing block that mounts within the gel-block mounting sleeve by inserting the gel block through the second end of the base; and
    an actuator capable of applying compressive load to the gel sealing block during sealing, the actuator including inner and outer pressurizations structures between which the gel sealing block mounts, the inner pressurization structure being coupled to an anchoring bracket that is carried within the inner pressurization structure when the gel sealing block is inserted into and removed from the base, wherein the anchoring bracket can be axially inserted into the base with the gel sealing block when in a first rotational position relative to the base, and wherein once the gel sealing block and the anchoring bracket have been inserted into the base, the gel sealing block and the anchoring bracket can be rotated relative to the base to a second rotational position where the anchoring bracket is axially fixed within the base.

Example 39. The enclosure of Example 38, wherein the anchoring bracket is prevented from rotating from the second rotational position back to the first rotational position by a fastener, or a snap-fit structure, or a clip or a latch.

Example 40. The enclosure of Example 38, wherein a fiber optic organizer is coupled to the anchoring bracket and carried with the gel sealing unit during insertion into the base, the fiber optic organizer including a plurality of pivotal fiber management trays.

Example 41. The enclosure of Example 38, further comprising means for preventing the dome from being coupled to the base before the anchoring bracket is rotated to the second rotational position relative to the base.

Example 42. The enclosure of Example 38, further comprising an assembly error prevention arrangement including a slide member slidable relative to the base along a slide orientation that extends between the first and second ends of the base, the slide member being slidable along the slide orientation between a dome-blocking position and an anchor bracket retention position, the slide member preventing the dome from being installed at the first end of the base when in the dome blocking position, the slide member allowing the anchor bracket to be rotated from the first rotational position to the second rotational position when the slide member in in the dome blocking position, the slide member allowing the dome to be installed at the first end of the base when in the anchor bracket retention position, and the slide member preventing the anchor bracket from being rotated from the second rotational positon to the first rotational position when in the anchor bracket retention position.

Example 43. The enclosure of Example 42, wherein the base includes a side wall including a mounting structure adjacent the first end of the base for slidably receiving the slide member, the mounting structure including a main receptacle for receiving a main body of the slide member, an inner slot for receiving a bracket blocking projection of the slide member, and an outer slot for receiving a dome blocking projection of the slide member, the inner and outer slots having lengths that extend along the slide orientation, the bracket blocking projection sliding along the inner slot and the dome blocking projection sliding along the outer slot as the slide member moves between the dome blocking position and the anchor bracket retention position.

Example 44. The enclosure of any of Examples 42 or 43, wherein the slide member includes a flexible latch that engages a catch of the mounting structure provided inside the base, the flexible latch engaging the catch via a snap-fit connection to retain the slide member within the receptacle while concurrently allowing the slide member to slide between the dome blocking position and the bracket retention position.

Example 45. The enclosure of any of Examples 42-44, wherein the first end of the base defines a circumferential groove for receiving the dome, wherein the dome blocking projection is positioned in the circumferential groove when the slide member is in the dome blocking position, and wherein the dome blocking projection is recessed relative to the circumferential groove when the slide member is in the anchor bracket retention position.

Example 46. The enclosure of any of Examples 42-45, wherein the base defines a plurality of circumferential bracket anchoring slots for axially anchoring the anchoring bracket relative to the base when the anchoring bracket is in the second rotational position relative to the base, wherein the anchoring bracket includes a plurality of radial arms, and wherein end portions of the radial arms slide within the bracket anchoring slots when the bracket is rotated to the second rotational position.

Example 47. The enclosure of any of Examples 42-46, wherein the bracket blocking projection of the slide member opposes a stop surface of a flange of one of the radial arms when the slide member is in the anchor bracket retention position to prevent the anchor bracket from being rotated relative to the base from the second rotational position to the first rotational positon.

Example 48. The enclosure of any of Examples 42-47, wherein a lower end of the bracket blocking projection includes angled guide surfaces.

Example 49. The enclosure of any of Examples 42-48, wherein the assembly prevention arrangement includes a linkage which includes the slide member and also includes a pivot link pivotally connected to the slide member, the pivot link including a main link body that pivots between a first pivot position and a second pivot position as the slide member is moved between the dome blocking position and the bracket retention position, the pivot link being in the first pivot position when the slide member is in the dome blocking position and the pivot link being in the second pivot position when the slide member is in the anchor bracket retention position.

Example 50. The enclosure of any of Examples 42-49, wherein the main link body has a lengthwise axis that passes through a pivot axis about which the pivot link pivots relative to the slide member, and wherein the lengthwise axis is parallel to the slide orientation of the slide member when the pivot link is in the first pivot positon such that the pivot link prevents the slide member from being manually moved along the slide orientation by pressing on the slide member.

Example 51. The enclosure of any of Examples 42-50, wherein the pivot link includes an inwardly projecting pin, wherein when the anchoring bracket is rotated from the first rotational position to the second rotational position the anchoring bracket contacts the inwardly projecting pin causing the pivot link to pivot from the first pivot position toward the second pivot position which causes the slide member to move from the dome blocking positon toward the anchor bracket retention position.

Example 52. The enclosure of any of Examples 42-51, wherein the inwardly projecting pin slides along the mounting structure as the pivot link pivots between the first and second pivot positions, wherein the flange of the arm of the anchoring bracket engages the inwardly projecting pin to initiate movement of the pivot link from the first pivot position toward the second pivot positon, and wherein the bracket blocking projection of the slide member moves into a position that opposes the stop surface of the flange after the flange has moved past the bracket blocking projection as the anchoring bracket is rotated toward the second rotational position.

Example 53. The enclosure of any of Examples 42-52, wherein the pivot link includes a pivot element through which a pivot axis of the pivot link extends, the pivot link pivoting about the pivot axis relative to the slide member when the pivot link pivots between the first pivot position and the second pivot position, the pivot element having a polygonal cross-sectional shape, the slide member having a pivot receiver that receives the pivot element, the pivot receiver having a polygonal cross-sectional shape that matches the polygonal cross-sectional shape of the pivot element, the pivot element pivoting within the pivot receiver when the pivot link is pivoted about the pivot axis, the pivot receiver having a resilient construction that elastically deforms or flexes to accommodate pivotal movement between the pivot element and the pivot receiver, wherein the matching polygonal cross-sectional shapes of the pivot element and the pivot receiver combined with the resilient construction of the pivot receiver require a predetermined force to be applied to the pivot link to cause the pivot receiver to elastically flex a sufficient amount to allow the pivot link to be moved from the first pivot position to the second pivot position and vice-versa, and wherein the pivot receiver retains the pivot link in the first pivot position and the second pivot position until the predetermined force is applied to the linkage so as to overcome the elastic retention force provide by the pivot receiver.

Example 54. The enclosure of any of Examples 42-53, wherein the matching polygonal cross-sectional shapes are square.

Example 55. The enclosure of any of Examples 42-54, wherein the pivot element and the pivot receiver provide an over-the-center biasing arrangement that elastically biases the pivot link forward the first pivot position when the pivot link is closer to the first pivot position than the second pivot position and that biases the pivot link toward the second pivot position when the pivot link is closer to the second pivot position than the first pivot position.

Example 56. The enclosure of Example 55, wherein the pivot link pivots about 90 degrees between the first pivot position and the second pivot position, and wherein a center position is at about 45 degrees.

Example 57. A cable sealing module for mounting between pressurization structures of an actuator of a sealing unit, the cable sealing module comprising:
at least first and second gel portions that meet at a separable interface at which at least one cable port is defined, the first and second gel portions being capable of being separated from one another when the cable sealing module is not between the pressurization structures to allow a cable to be laterally inserted into the cable port; and end caps between which an axis of the cable port extends, the end caps each including first end cap portions attached to opposite ends of the first gel portion and second end cap portions attached to opposite ends of the second gel portion, the first and second end cap portions separating from one another when the first and second gel portions are separated from one another; and snap-fit structures integrated with the end caps for coupling in a snap-fit connection with the pressurization structures.

Example 58. The cable sealing module of Example 57, wherein the snap-fit structures include posts or collars.

Example 59. The cable sealing module of Example 58, wherein the snap-fit structures include posts having enlarged heads, the posts projecting outwardly from the end caps in an orientation parallel to the axis of the cable port.

Example 60. The cable sealing module of Example 57, wherein the cable sealing module has a truncated wedge shape formed by opposite sides that converge as the opposite sides extend from a major end to a minor end of the cable sealing module, wherein the minor end has a concave curvature and the major end has a convex curvature, wherein the cable sealing module includes two flexible latches for preventing gel sealing modules from being withdrawn from between the pressurization structures, wherein the latches are located at the major ends of the gel sealing modules adjacent the opposite sides of the gel sealing modules, and wherein the latches can be manually pressed toward each other to allow the cable sealing module to be withdrawn from between the pressurization structures.

Example 61. A gel sealing unit comprising:
a gel sealing block;
an actuator capable of applying compressive load to the gel sealing block during sealing, the actuator including pressurizations structures between which the gel sealing block mounts, the actuator including a trigger arrangement for transferring compressive load to the pressurization structures, at least one of the pressurization structures being axially moved along a first axis relative to the other of the pressurization structures when the trigger arrangement is actuated, the trigger arrangement including a handle that is rotated about a second axis angled relative to the first axis to cause relative movement between the pressurizations structures along the first axis.

Example 62. The gel sealing unit of Example 61, wherein the first and second axes are perpendicular.

Example 63. The gel sealing unit of Example 61, wherein the trigger arrangement includes an angled gear arrangement for transferring torque from the handle to a rotatable component of the trigger arrangement that rotates about the first axis.

Example 64. The gel sealing unit of Example 63, wherein the angled gear arrangement includes angled bevel gears.

Example 65. The gel sealing unit of Example 64, wherein the angled bevel gears include right angle bevel gears.

Example 66. The gel sealing unit of Example 63, wherein the rotatable component includes a nut threaded on a threaded first shaft of the trigger arrangement, wherein the threaded first shaft is aligned along the first axis and is configured to be placed in tension when compressive load is applied to the pressurizations structures by the trigger arrangement, wherein a first angled bevel gear is integrated with or coupled to the nut, wherein the handle is mounted on a second shaft aligned along the second axis and is rotated about the second axis by turning the handle, and wherein the second shaft is coupled to a second angled bevel gear that intermeshes with the first angled bevel gear.

Example 67. A gel sealing unit comprising:
a gel sealing block;
an actuator capable of applying compressive load to the gel sealing block during sealing, the actuator including inner and outer pressurizations structures between which the gel sealing block mounts, the actuator including a trigger arrangement for transferring compressive load to the pressurization structures, the trigger arrangement including a threaded first shaft that extends along a first axis along which the outer pressurization structure can axially move to apply the compressive load to the gel sealing block, the threaded first shaft including a head that mounts within a pocket defined by the inner pressurization structure, the head being axially slidable within the pocket along the first axis relative to the inner pressurization structure but being prevented from rotating relative to the inner pressurization structure about the first axis, the trigger arrangement also including a spring mounted on the threaded first shaft and captured between the head of the threaded first shaft and a spring stop that is axially fixed relative to the inner pressurization structure, the threaded first shaft extending through the spring stop and being rotatable relative to the spring stop without threadingly engaging the spring stop, the trigger arrangement also including a nut threaded on the threaded first shaft, the nut being rotatable relative to the outer pressurization structure while also being axially fixed relative to the outer pressurization structure such that the outer pressurization structure is carried with the nut axially along the first axis when the nut is threaded on the threaded first shaft, the trigger arrangement further including a first bevel gear integrated with or coupled to the nut, the trigger arrangement also including a handle mounted on a second shaft that extends along a second axis angled relative to the first axis, the second shaft being coupled to a second bevel gear that intermeshes with the first bevel gear such that when the handle is turned about the second axis the second bevel gear turns the nut about the threaded first shaft causing axial movement of the nut and the outer pressurization structure relative to the first threaded shaft, wherein when the nut is threaded in a first rotational direction about the shaft the shaft is moved axially in a first direction along the first axis relative to the nut and the outer pressurization structure causing the head of the shaft to slide axially within the pocket of the inner pressurization structure in the first direction along the first axis toward the spring stop causing the spring to be compressed between the head and the spring stop which causes the threaded first shaft to be placed in tension such that spring compression load is axially applied to the gel sealing block between the inner and outer pressurization structures.

Example 68. The gel sealing unit of Example 67, wherein the gel sealing block is coupled to the inner and outer pressurization structures by a coupling that allows the inner and outer pressurization structures to apply a tension load to the gel sealing block, and wherein when the nut is threaded in a second rotational direction about the shaft the shaft is moved axially in a second direction along the first axis relative to the nut and the outer pressurizations structure causing the head of the shaft to slide axially within the pocket of the inner pressurization structure in the second direction along the first axis away from the spring stop as the spring is de-compressed, and wherein continued threading of the nut in the second direction causes the head to engage a positive stop of the inner pressurization structure thereby causing the inner and outer pressurization structures to be positively moved apart by the trigger arrangement such that tension is applied to the gel sealing block.

Example 69. The gel sealing unit of Example 68, wherein the gel sealing block includes a plurality of separate gel sealing modules, wherein the gel sealing modules are individually and separately removable from between the pressurization structures and at least a plurality of the removable gel sealing modules are cable sealing modules each including:
- at least first and second gel portions that meet at a separable interface at which at least one cable port is defined, the first and second gel portions being capable of being separated from one another when the cable sealing module is not between the pressurization structures to allow a cable to be laterally inserted into the cable port; and end caps between which the cable port extends, the end caps each including first end cap portions attached to opposite ends of the first gel portion and second end cap portions attached to opposite ends of the second gel portion, the first and second end cap portions separating from one another when the first and second gel portions are separated from one another.

Example 70. The gel sealing unit of Example 69, wherein the end caps include snap-fit structures for coupling in a snap-fit connection with the pressurization structures the gel sealing block including a plurality of individual gel sealing modules that cooperate to define the gel block Example 71. A gel sealing unit comprising:
- a gel sealing block;
- an actuator capable of applying compressive load to the gel sealing block during sealing, the actuator including inner and outer pressurizations structures between which the gel sealing block mounts, the actuator including a trigger arrangement for transferring compressive load to the pressurization structures, the trigger arrangement including a threaded first shaft that extends along a first axis along which the outer pressurization structure can axially move to apply the compressive load to the gel sealing block, the trigger arrangement including a nut threaded on the shaft, the nut being rotatable about the first axis relative to the outer pressurization structure and being axially fixed relative to the outer pressurization structure, the nut being integrated or coupled to a handle for turning the nut relative to the outer pressurization structure and the threaded first shaft, the trigger arrangement also including a pressurization structure mount for mounting the inner pressurization structure, the inner pressurization structure including a plurality of separate pressurization sections that are independently slidable relative to the pressurizations structure mount along the first axis, the trigger arrangement including separate springs corresponding to each of the separate pressurization sections, the spring being captured between first spring stops on the pressurizations structures and second spring stops on the pressurization structure mount, the threaded first shaft having an upper end that is axially and rotatably fixed relative to the pressurization structure mount, the gel sealing block being coupled to the inner and outer pressurization structures by a coupling that allows the inner and outer pressurization structures to apply a tension load to the gel sealing block, the gel sealing block including a plurality of individual gel sealing modules that cooperate to define the gel block with each gel sealing module corresponding to one of the separate pressurization sections of the inner pressurization structure, wherein when the nut is threaded in a first rotational direction about threaded first shaft the nut and outer pressurization structure move axially in a first direction along the threaded first shaft toward the inner pressurization structure causing the gel block to be forced against the inner pressurization structure and the inner pressurization structure to be forced against the springs causing the springs to be compressed and spring compression load to be axially applied to the gel sealing block, and wherein when the nut is threaded in a second rotational direction about the first shaft the nut and the outer pressurization structure move axially in a second direction along the threaded first shaft away from the inner pressurization structure causing the gel block and the inner pressurization structure to be pulled away from springs such that the spring de-compress, and wherein continued threading of the nut in the second direction causes the inner pressurization structure to be pulled by the outer pressurization structure and the gel block into engagement with a positive stop of the pressurization structure mount causing the inner and outer pressurization structure to be positively moved apart as the outer pressurization structure and the nut continue to move in the second direction thereby causing tension is applied to the gel sealing block.

Example 72. The gel sealing unit of Example 71, wherein the gel sealing modules are individually and separately removable from between the pressurization structures and at least a plurality of the removable gel sealing modules are cable sealing modules each including:
- at least first and second gel portions that meet at a separable interface at which at least one cable port is defined, the first and second gel portions being capable of being separated from one another when the cable sealing module is not between the pressurization structures to allow a cable to be laterally inserted into the cable port; and
- end caps between which the cable port extends, the end caps each including first end cap portions attached to opposite ends of the first gel portion and second end cap portions attached to opposite ends of the second gel portion, the first and second end cap portions separating from one another when the first and second gel portions are separated from one another.

Example 73. The enclosure of Example 72, wherein the end caps include snap-fit structures for coupling in a snap-fit connection with the pressurization structures.

Example 74. A telecommunications assembly comprising:
- a gel sealing unit defining a central axis;
- a fiber manager mounted above the gel sealing unit along the central axis, the fiber manager including a tower having opposite first and second major sides at which fiber management trays are pivotally mounted; and
- tube mounting structures between adjacent a lower end of the tower above the gel sealing unit, the tube mounting structures including first and second tube mounting structures corresponding respectively to the first and second major sides, the tube mounting structures having bodies with lengths that extend across widths of the major sides, the bodies defining tube holders spaced side-by-side along the lengths, the bodies being curved along their lengths along curvatures that curve about the central axis.

Example 75. The telecommunications assembly of Example 74, wherein the tube holders include open sided grooves.

Example 76. The telecommunications assembly of Example 74, wherein the tube holders include closed channels.

Example 77. The telecommunications assembly of Example 74, wherein telecommunications assembly mounts within a housing having a cylindrical base.

Example 78. A telecommunications assembly comprising
a gel sealing unit including a gel sealing block that mounts between inner and outer pressurization structures of an actuator for pressurizing the gel sealing block;
a bracket attached to the inner pressurization structure for axially fixing the gel sealing unit within a housing; and
a cable anchoring device that mounts to the bracket by a snap-fit connection, the cable anchoring device including at least one stabilization rib that fits within a slot defined by the inner pressurization structure.

Example 79. The telecommunications assembly of Example 78, wherein the cable anchoring device includes a rear side having a snap-fit interface for engaging the bracket, and wherein the stabilization rib projects from the rear side.

Example 80. The telecommunications assembly of Example 78, wherein the cable anchoring device includes two parallel stabilization ribs that fit within corresponding slots defined by the inner pressurization structure.

Example 81. The telecommunications assembly of Example 78, wherein the cable anchoring device is an adapter for mounting plurality of cable anchoring units Example 82. The telecommunications assembly of Example 78, wherein the cable anchoring device is a cable anchoring unit.

Example 83. A cable anchoring unit comprising:
a first cradle for clamping a cable jacket with a band;
a second cradle for clamping a cable shield with a band;
a strength member or conductor anchor for wrapping aramid yarn of a cable or for securing a rigid member such as a metal member or a glass reinforced polymer rod; and
an electrical contact at the anchor for grounding, the contact being connected to a grounding screw on the anchoring unit.

Example 84. A cable anchoring unit comprising:
a member having a first leg and a second leg angled relative to the first leg, the member defining a cable tie opening that is closer to a first outside surface of the first leg than a second outside surface of the second leg, wherein a cable tie is inserted the cable tie opening and secured to a cable while the member is in a first position in which a first side of the first leg engages the cable, and wherein the member is pivoted to a second position in which the second side of the second leg engages the cable to tighten the cable tie.

Example 85. A telecommunications assembly comprising
a gel sealing unit including a gel sealing block that mounts between inner and outer pressurization structures of an actuator for pressurizing the gel sealing block;
a bracket attached to the inner pressurization structure for axially fixing the gel sealing unit within a housing; and
a cable anchoring device that mounts to the bracket;
wherein an interface between the cable anchoring device and the bracket includes: a) a groove and rail configuration for stabilizing the cable anchoring device relative to the bracket and for allowing the cable anchoring device to be loaded into the bracket by radial inserting into the bracket; and b) a snap-fit connection for releasable retaining the cable anchoring device in an inserted position relative to the bracket.

Example 86. The telecommunications assembly of Example 85, wherein the cable anchoring device mounts to the bracket at a location where the cable anchoring device is fully above and not in contact with the gel sealing unit.

Example 87. The telecommunications assembly of Example 85, wherein the bracket includes a hub and a plurality of arms that project radially outwardly from the hub, and wherein the bracket also includes a reinforcing ring that couples to the arms at an intermediate location between the hub and outer ends of the arms.

Example 88. The telecommunications assembly of Example 87, wherein the cable anchoring device mounts at an upper side of the hub.

Example 89. A telecommunications assembly comprising
a gel sealing unit including a gel sealing block that mounts between inner and outer pressurization structures of an actuator for pressurizing the gel sealing block, the outer pressurization structure including an outer snap-fit sleeve;
a threaded member for drawing the first and second pressurizations structures together to pressurize the gel sealing block; and
an external handle including a nut that threads on the threaded member, wherein the handle is turned to thread the nut on the threaded member to pressurize the gel sealing block, the external handle having an end that snaps within the outer snap-fit sleeve and that is free to rotate relative to the snap-fit sleeve.

Example 90. The telecommunications assembly of Example 89, wherein the end of the handle is axially snapped into the snap-fit sleeve.

Example 91. A telecommunications assembly comprising
a gel sealing unit including a gel sealing block that mounts between inner and outer pressurization structures of an actuator for pressurizing the gel sealing block, the outer pressurization structure including an outer sleeve;
a threaded member for drawing the first and second pressurizations structures together to pressurize the gel sealing block; and
an external handle including a nut that threads on the threaded member, wherein the handle is turned to thread the nut on the threaded member to pressurize the gel sealing block, the external handle having a flanged end that laterally slides into the outer sleeve and that is free to rotate relative to the sleeve.

What is claimed is:

1. A cable sealing module for mounting between pressurization structures of an actuator of a sealing unit, the cable sealing module comprising:
at least first and second gel portions that meet at a separable interface at which at least one cable port is defined, the first and second gel portions being capable of being separated from one another when the cable sealing module is not between the pressurization structures to allow a cable to be laterally inserted into the cable port;
end caps between which an axis of the cable port extends, the end caps each including first end cap portions attached to opposite ends of the first gel portion and second end cap portions attached to opposite ends of the second gel portion, the first and second end cap portions separating from one another when the first and second gel portions are separated from one another;

snap-fit structures integrated with the end caps for coupling in a snap-fit connection with the pressurization structure; and Wherein the pressurization structure is configured to apply tension to the first and second gel portions though the snap-fit structures when forced apart.

2. The cable sealing module of claim 1, wherein the snap-fit structures include posts or collars.

3. The cable sealing module of claim 2, wherein the snap-fit structures include posts having enlarged heads, the posts projecting outwardly from the end caps in an orientation parallel to the axis of the cable port.

4. The cable sealing module of claim 1, wherein the cable sealing module has a truncated wedge shape formed by opposite sides that converge as the opposite sides extend from a major end to a minor end of the cable sealing module, wherein the minor end has a concave curvature and the major end has a convex curvature, wherein the cable sealing module includes two flexible latches for preventing cable sealing modules from being withdrawn from between the pressurization structures, wherein the latches are located at the major ends of the cable sealing modules adjacent the opposite sides of the cable sealing modules, and wherein the latches can be manually pressed toward each other to allow the cable sealing module to be withdrawn from between the pressurization structures.

5. A gel sealing unit comprising:
a gel sealing block;
an actuator capable of applying compressive load to the gel sealing block during sealing, the actuator including pressurizations structures between which the gel sealing block mounts, the actuator including a trigger arrangement for transferring compressive load to the pressurization structures, at least one of the pressurization structures being axially moved along a first axis relative to the other of the pressurization structures when the trigger arrangement is actuated, the trigger arrangement including a handle that is rotated about a second axis angled relative to the first axis to cause relative movement between the pressurizations structures along the first axis; and wherein the trigger arrangement includes an angled gear arrangement for transferring torque from the handle to a rotatable component of the trigger arrangement that rotates about the first axis.

6. The gel sealing unit of claim 5, wherein the first and second axes are perpendicular.

7. The gel sealing unit of claim 5, wherein the angled gear arrangement includes angled bevel gears.

8. The gel sealing unit of claim 7, wherein the angled bevel gears include right angle bevel gears.

9. The gel sealing unit of claim 5, wherein the rotatable component includes a nut threaded on a threaded first shaft of the trigger arrangement, wherein the threaded first shaft is aligned along the first axis and is configured to be placed in tension when compressive load is applied to the pressurizations structures by the trigger arrangement, wherein a first angled bevel gear is integrated with or coupled to the nut, wherein the handle is mounted on a second shaft aligned along the second axis and is rotated about the second axis by turning the handle, and wherein the second shaft is coupled to a second angled bevel gear that intermeshes with the first angled bevel gear.

10. A telecommunications assembly comprising
a gel sealing unit including a gel sealing block that mounts between inner and outer pressurization structures of an actuator for pressurizing the gel sealing block;
a bracket attached to the inner pressurization structure for axially fixing the gel sealing unit within a housing; and
a cable anchoring device that mounts to the bracket by a snap-fit connection, the cable anchoring device including at least one stabilization rib that fits within a slot defined by the inner pressurization structure.

11. The telecommunications assembly of claim 10, wherein the cable anchoring device includes a rear side having a snap-fit interface for engaging the bracket, and wherein the stabilization rib projects from the rear side.

12. The telecommunications assembly of claim 10, wherein the cable anchoring device includes two parallel stabilization ribs that fit within corresponding slots defined by the inner pressurization structure.

13. The telecommunications assembly of claim 10, wherein the cable anchoring device is an adapter for mounting plurality of cable anchoring units.

14. The telecommunications assembly of claim 10, wherein the cable anchoring device is a cable anchoring unit.

* * * * *